United States Patent
Yang et al.

(10) Patent No.: US 10,362,371 B2
(45) Date of Patent: Jul. 23, 2019

(54) BROADCASTING SIGNAL TRANSMITTING APPARATUS, BROADCASTING SIGNAL RECEIVING APPARATUS, BROADCASTING SIGNAL TRANSMITTING METHOD, AND BROADCASTING SIGNAL RECEIVING METHOD

(71) Applicant: LG ELECTRONICS INC., Seoul (KR)

(72) Inventors: Seungryul Yang, Seoul (KR); Kyoungsoo Moon, Seoul (KR); Woosuk Ko, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/576,575

(22) PCT Filed: May 25, 2016

(86) PCT No.: PCT/KR2016/005537
§ 371 (c)(1),
(2) Date: Nov. 22, 2017

(87) PCT Pub. No.: WO2016/190662
PCT Pub. Date: Dec. 1, 2016

(65) Prior Publication Data
US 2018/0152768 A1    May 31, 2018

Related U.S. Application Data

(60) Provisional application No. 62/166,156, filed on May 26, 2015, provisional application No. 62/167,286, (Continued)

(51) Int. Cl.
*H04N 7/173*    (2011.01)
*H04N 21/858*   (2011.01)
(Continued)

(52) U.S. Cl.
CPC ........ *H04N 21/8586* (2013.01); *H04H 20/42* (2013.01); *H04H 20/59* (2013.01);
(Continued)

(58) Field of Classification Search
CPC .............. H04N 21/8586; H04N 21/44; H04N 21/47217; H04N 21/234; H04N 21/2387;
(Continued)

(56) References Cited

U.S. PATENT DOCUMENTS 5,991,799 A * 11/1999 Yen .................. G06F 17/30867
707/E17.109
7,299,275 B2 * 11/2007 Tsukidate ........... H04N 7/17354
348/E7.075
(Continued)

FOREIGN PATENT DOCUMENTS

WO  WO 2011/136581 A2  11/2011
WO  WO 2013/061525 A1   5/2013
(Continued)

*Primary Examiner* — Michael B. Pierorazio
(74) *Attorney, Agent, or Firm* — Birch, Stewart, Kolasch & Birch, LLP

(57) ABSTRACT

The present invention proposes a method for transmitting a broadcasting signal. The method for transmitting a broadcasting signal according to the present invention proposes a system capable of supporting a next generation broadcasting service in an environment which supports next generation hybrid broadcasting that uses a terrestrial broadcasting network and an Internet network. Also, the present invention proposes an effective signaling scheme that can cover both the terrestrial broadcasting network and the Internet network in the environment that supports the next hybrid broadcasting.

20 Claims, 58 Drawing Sheets

Related U.S. Application Data filed on May 28, 2015, provisional application No. 62/169,556, filed on Jun. 2, 2015, provisional application No. 62/170,145, filed on Jun. 3, 2015, provisional application No. 62/180,065, filed on Jun. 16, 2015.

(51) Int. Cl.

| | | |
|---|---|---|
| *H04H 20/59* | (2008.01) | |
| *H04N 21/258* | (2011.01) | |
| *H04N 21/233* | (2011.01) | |
| *H04N 21/234* | (2011.01) | |
| *H04N 21/2387* | (2011.01) | |
| *H04N 21/239* | (2011.01) | |
| *H04N 21/439* | (2011.01) | |
| *H04N 21/44* | (2011.01) | |
| *H04N 21/472* | (2011.01) | |
| *H04H 20/42* | (2008.01) | |
| *H04H 20/93* | (2008.01) | |
| *H04H 60/40* | (2008.01) | |
| *H04H 60/72* | (2008.01) | |
| *H04H 60/73* | (2008.01) | |

(52) U.S. Cl.
CPC ............ *H04H 20/93* (2013.01); *H04H 60/40* (2013.01); *H04H 60/72* (2013.01); *H04H 60/73* (2013.01); *H04N 21/233* (2013.01); *H04N 21/234* (2013.01); *H04N 21/2387* (2013.01); *H04N 21/2393* (2013.01); *H04N 21/258* (2013.01); *H04N 21/439* (2013.01); *H04N 21/44* (2013.01); *H04N 21/47217* (2013.01)

(58) Field of Classification Search
CPC ............ H04N 21/2393; H04N 21/439; H04N 21/233; H04N 21/258
USPC ........................................................ 725/112
See application file for complete search history.

(56) References Cited

U.S. PATENT DOCUMENTS

| | | | | | |
|---|---|---|---|---|---|
| 7,603,683 | B2* | 10/2009 | Reto | ................. | H04L 29/06027 709/204 |
| 7,653,921 | B2* | 1/2010 | Herley | ................. | H04N 7/16 382/100 |
| 7,712,125 | B2* | 5/2010 | Herigstad | ............... | H04N 7/163 725/141 |
| 7,734,579 | B2* | 6/2010 | White | ................. | H04N 5/76 707/609 |
| 7,908,625 | B2* | 3/2011 | Robertson | ........... | H04L 12/2838 348/552 |
| 8,307,395 | B2* | 11/2012 | Issa | .................. | G06F 17/30817 709/219 |
| 2003/0061206 | A1* | 3/2003 | Qian | ................. | G06F 17/30035 |
| 2003/0063217 | A1* | 4/2003 | Smith | .................... | H04N 7/088 348/460 |
| 2004/0103426 | A1* | 5/2004 | Ludvig | .................. | H04H 20/86 725/9 |
| 2004/0148571 | A1* | 7/2004 | Lue | .................. | G06F 17/30905 715/239 |
| 2004/0215718 | A1* | 10/2004 | Kazmi | ............... | H04L 65/4084 709/203 |
| 2005/0144455 | A1* | 6/2005 | Haitsma | ............ | G06F 17/30743 713/176 |
| 2005/0262542 | A1* | 11/2005 | DeWeese | ............ | H04L 12/1818 725/106 |
| 2006/0031883 | A1* | 2/2006 | Ellis | ....................... | H04N 7/163 725/58 |
| 2006/0031889 | A1* | 2/2006 | Bennett | ............. | H04L 29/06027 725/80 |
| 2006/0190966 | A1* | 8/2006 | McKissick | ............. | G06Q 30/02 725/61 |
| 2007/0124756 | A1* | 5/2007 | Covell | .............. | G06F 17/30743 725/18 |
| 2007/0157281 | A1* | 7/2007 | Ellis | .................... | H04N 7/17309 725/134 |
| 2008/0027953 | A1* | 1/2008 | Morita | ..................... | G11B 27/11 |
| 2008/0059532 | A1* | 3/2008 | Kazmi | .................... | G06F 21/10 |
| 2008/0060036 | A1* | 3/2008 | Cox | .................. | G06F 17/30017 725/110 |
| 2008/0235733 | A1* | 9/2008 | Heie | ....................... | H04N 7/163 725/46 |
| 2009/0320058 | A1* | 12/2009 | Wehmeyer | ......... | H04N 7/17336 725/31 |
| 2009/0320073 | A1* | 12/2009 | Reisman | ........... | G06F 17/30873 725/51 |
| 2010/0121936 | A1* | 5/2010 | Liu | .................... | H04N 5/44543 709/217 |
| 2010/0131385 | A1* | 5/2010 | Harrang | ................. | G06Q 30/00 705/26.1 |
| 2010/0251292 | A1* | 9/2010 | Srinivasan | ............. | H04H 20/57 725/37 |
| 2010/0296487 | A1* | 11/2010 | Karaoguz | ........... | H04W 84/045 370/332 |
| 2011/0066744 | A1* | 3/2011 | Del Sordo | ........... | H04N 21/235 709/231 |
| 2011/0068899 | A1* | 3/2011 | Ioffe | ....................... | G05B 15/02 340/8.1 |
| 2011/0086619 | A1* | 4/2011 | George | ............. | H04M 1/72533 455/414.1 |
| 2011/0191439 | A1* | 8/2011 | Dazzi | ..................... | G06F 15/16 709/217 |
| 2011/0191446 | A1* | 8/2011 | Dazzi | ..................... | G06F 15/16 709/219 |
| 2012/0278725 | A1* | 11/2012 | Gordon | ............. | H04N 21/2665 715/738 |
| 2012/0291079 | A1* | 11/2012 | Gordon | ............. | H04N 21/2665 725/109 |
| 2013/0254806 | A1 | 9/2013 | Alam et al. | | |
| 2014/0013342 | A1* | 1/2014 | Swan | ................... | H04N 21/2343 725/5 |
| 2014/0137165 | A1* | 5/2014 | Yamagishi | ......... | H04N 21/2143 725/78 |

FOREIGN PATENT DOCUMENTS

| | | |
|---|---|---|
| WO | WO 2015/041494 A1 | 3/2015 |
| WO | WO 2015/065149 A1 | 5/2015 |

* cited by examiner

FIG. 3

| Syntax | No. of Bits | Format |
|---|---|---|
| LLS_table() { | | |
|    LLS_table_id | 8 | uimsbf |
|    provider_id | 8 | uimsbf |
|    LLS_table_version | 8 | uimsbf |
|    switch (LLS_table_id) { | | |
|      case 0x01: | | |
|        SLT | var | Sec. 6.3 |
|        break; | | |
|      case 0x02: | | |
|        RRT | var | See Annex F |
|        break; | | |
|      case 0x03: | | |
|        System Time | var | Sec. 6.4 |
|        break; | | |
|      case 0x04: | | |
|        CAP | var | Sec. 6.5 |
|        break; | | |
|      default: | | |
|        reserved | var | |
|    } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1...999 |
|     @minorChannelNo | 0..1 | 1...999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcCignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

FIG. 4

| Element or Attribute Name | | | | Use | Data Type |
|---|---|---|---|---|---|
| bundleDescription | | | | | |
| | userServiceDescription | | | | |
| | | @globalServiceID | | 1 | anyURL |
| | | @serviceID | | 1 | unsignedShort |
| | | @serviceStatus | | 0..1 | boolean |
| | | @fullMPDUri | | 1 | anyURL |
| | | @sTSIDUri | | 1 | anyURL |
| | | name | | 0..N | string |
| | | | @lang | 1 | language |
| | | serviceLanguage | | 0..N | language |
| | | capabilityCode | | 0..1 | string |
| | | deliveryMethod | | 1..N | |
| | | | broadcastAppService | 1..N | |
| | | |   basePattern | 1..N | string |
| | | | unicastAppService | 0..N | |
| | | |   basePattern | 1..N | string |

— t4010

| Element or Attribute Name | | Use | Data Type |
|---|---|---|---|
| S-TSID | | | |
| | @serviceID | 1 | unsignedShort |
| | RS | 1..N | |
| |   @bsid | 0..1 | unsignedShort |
| |   @sIpAddr | 0..1 | string |
| |   @dIpAddr | 0..1 | string |
| |   @dport | 0..1 | unsignedShort |
| |   @PLPID | 0..1 | unsignedByte |
| |   LS | 1..N | |
| |     @tsi | 1 | unsignedInt |
| |     @PLPID | 0..1 | unsignedByte |
| |     @bw | 0..1 | unsignedInt |
| |     @startTime | 0..1 | dateTime |
| |     @endTime | 0..1 | dateTime |
| |     ScrFlow | 0..1 | scrFlowType |
| |     RepairFlow | 0..1 | rprFlowType | t4020

FIG. 5

| Element or Attribute Name | | | | | | Use |
|---|---|---|---|---|---|---|
| bundleDescription | | | | | | |
| | userServiceDescription | | | | | |
| | | @globalServiceID | | | | M |
| | | @serviceID | | | | M |
| | | Name | | | | 0..N |
| | | | @lang | | | CM |
| | | serviceLanguage | | | | 0..N |
| | | contentAdvisoryRating | | | | 0..1 |
| | | Channel | | | | 1 |
| | | | @serviceGenre | | | 0..1 |
| | | | @serviceIcon | | | 1 |
| | | | ServiceDescription | | | 0..N |
| | | | | @serviceDescrText | | 1 |
| | | | | @serviceDescrLang | | 0..1 |
| | | mpuComponent | | | | 0..1 |
| | | | @mmtPackageId | | | 1 |
| | | | @nextMmtPackageId | | | 0..1 |
| | | routeComponent | | | | 0..1 |
| | | | @sTSIDUri | | | 1 |
| | | | @sTSIDDestinationIpAddress | | | 0..1 |
| | | | @sTSIDDestinationUdpPort | | | 1 |
| | | | @sTSIDSourceIpAddress | | | 1 |
| | | | @sTSIDMajorProtocolVersion | | | 0..1 |
| | | | @sTSIDMinorProtocolVersion | | | 0..1 |
| | | broadbandComponent | | | | 0..1 |
| | | | @fullMPDUri | | | 1 |
| | | ComponentInfo | | | | 1..N |
| | | | @ComponentType | | | 1 |
| | | | @ComponentRole | | | 1 |
| | | | @ComponentProtectedFlag | | | 0..1 |
| | | | @ComponentId | | | 1 |
| | | | @ComponentName | | | 0..1 |

FIG. 6
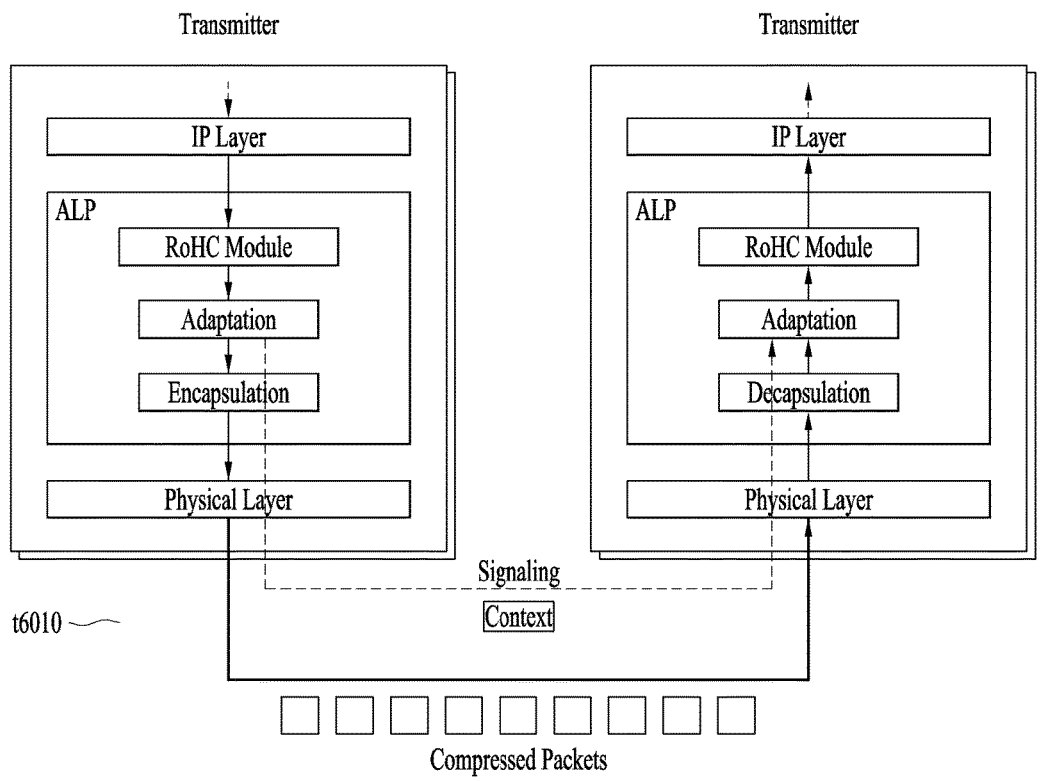
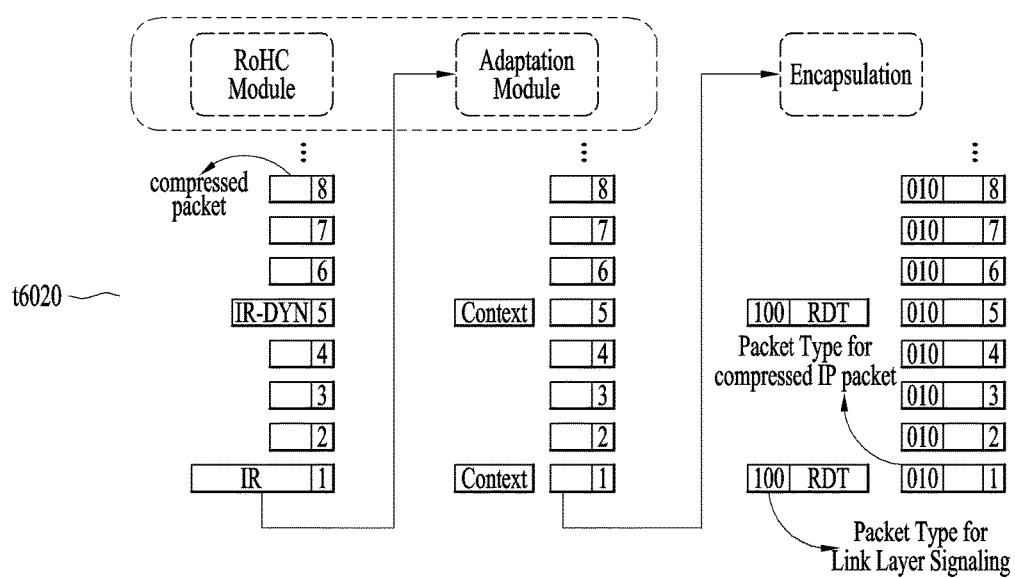

FIG. 7

| Syntax | Number of bits | Format |
|---|---|---|
| Link_Mapping_Table() { | | |
|     signaling_type | 8 | 0x01 |
|     PLP_ID | 6 | uimsbf |
|     reserved | 2 | "11" |
|     num_session | 8 | uimsbf |
|     for(i = 0 ; i < num_session ; i++) { | | |
|         src_IP_add | 32 | uimsbf |
|         dst_IP_add | 32 | uimsbf |
|         src_UDP_port | 16 | uimsbf |
|         dst_UDP_port | 16 | uimsbf |
|         SID_flag | 1 | bslbf |
|         compressed_flag | 1 | bslbf |
|         reserved | 6 | '111111' |
|         if (SID_flag == "1") { | | |
|             SID | 8 | uimsbf |
|         } | | |
|         if (compressed_flag == "1') { | | |
|             context_id | 8 | uimsbf |
|         } | | |
|     } | | |
| } | | |

| Variable Name | R/A | Data Type | Allowed Value | Default Value | Evented? |
|---|---|---|---|---|---|
| ServiceTimeInfo | R | string | XML, JASON etc | | Yes |
| UpdateDuration | R | integer | Integer in seconds (ex: 120 is every 120 seconds) | Implementation dependent | No |
| A_ARG_TYPE_UpdateDuration | R | integer | Integer in seconds (ex: 120 is every 120 seconds) | | No |

FIG. 12

| Element/Attribute | | | Cardinality | Data Type | Description and Value |
|---|---|---|---|---|---|
| ServiceTimeInfo | | | | | |
| | @serviceId | | 1 | unsignedShort | Unique id of the service |
| | @programId | | 1 | unsignedShort | Unique id of the program |
| | mediaTime | | 1 | string or dateTime | Media time of program |
| | | @mediaTimeProtocol | 1 | string | Protocol used for representing mediaTime |
| | currentTime | | 1 | string or dateTime | Current wall clock time |
| | | @currentTimeProtocol | 1 | string | Protocol used for representing currentTime |

```
<?xml version="1.0" encoding="UTF-8"?>
<ServiceTimeInfo serviceId="11" programId="1008">
   <mediaTime mediaTimeProtocol="timestamp">77ee</mediaTime>
   <currentTime currentTimeProtocol="NTP">88ee</currentTime>
</ServiceTimeInfo>
```

FIG. 28

```
NOTIFY * HTTP/1.1
HOST: 239.255.255.250:1900
CACHE-CONTROL: max-age = seconds until advertisement expires
LOCATION: URL for UPnP description for root device
NT: search target (for example, urn:atsc:device:atsccompanion:3)
NTS: ssdp:alive
SERVER: OS/version UPnP/1.0 product/version
USN: advertisement UUID
```
— t413010

```
M-SEARCH * HTTP/1.1
HOST: 239.255.255.250:1900
MAN: "ssdp:discover"
MX: seconds to delay response
ST: search target (for example, urn:atsc:device:atsccompanion:3)
```
— t413020

```
HTTP/1.1 200 OK
CACHE-CONTROL: max-age = seconds until advertisement expires
DATE: when response was generated
EXT:
LOCATION: URL for UPnP description for root device
SERVER: OS/version UPnP/1.0 product/version
ST: search target (for example, urn:atsc:device:atsccompanion:3)
USN: advertisement UUID
```
— t413030

FIG. 30

```
GET path to description HTTP/1.1
HOST: host for IP address:port for description          ~t418010
ACCEPT-LANGUAGE: language preferred by control point
```

```
<?xml version="1.0"?>
<root xmlns="urn:schemas-upnp-org:device-1-0">
  <specVersion>
    <major>1</major>
    <minor>0</minor>
  </specVersion>
  <URLBase>base URL for all relative URLs</URLBase>
  <device>
    <deviceType>urn: atsc: device: atsccompanion: 3</deviceType>
    <friendlyName>short user-friendly title</friendlyName>
    <manufacturer>manufacturer name</manufacturer>
    .....
    <serviceList>                                       ~t418020
      <service>
        <serviceType>urn: atsc: service: atsccompanion: 3</serviceType>
        <serviceId> urn: atsc: serviceId: atsccompanion</serviceId>
        <SCPDURL>URL to service description</SCPDURL>
        <controlURL>URL for control</controlURL>
        <eventSubURL>URL for eventing</eventSubURL>
        .....
      </service>
    </serviceList>
  </device>
</root>
```

FIG. 31 t419010

```
<?xml version="1.0"?>
<root xmlns="urn:schemas-upnp-org:device-1-0">
    .....
    <device>
        <deviceType>urn:atsc:device:atsccompanion:3</deviceType>
        <X_ATSC_ServiceIdentification>Address of Service and Content Identification
        Endpoint</X_ATSC_ServiceIdentification>
        <X_ATSC_ESG>Address of ESG Information Endpoint</X_ATSC_ESG>
        <X_ATSC_Data>Address of Service, Show and Segment Data Endpoint</X_ATSC_Data>
        <X_ATSC_MediaTimeline>Address of Media Timeline Endpoint</X_ATSC_MediaTimeline>
        <X_ATSC_MediaPlaybackState>Address of Media Playback State
        Endpoint</X_ATSC_MediaPlaybackState>
        <X_ATSC_EAS>Address of Emergency Alert Messages Endpoint</X_ATSC_EAS>
        <X_ATSC_ApptoApp>Address of App-to-App Endpoint</X_ATSC_ApptoApp>
        .....
    </device>
</root>
``` t419020

```
<?xml version="1.0"?>
<root xmlns="urn:schemas-upnp-org:device-1-0">
    .....
    <service>
        <serviceType>urn:atsc:service:atsccompanion:3</serviceType>
        <X_ATSC_ServiceIdentification>Address of Service and Content Identification
        Endpoint</X_ATSC_ServiceIdentification>
        <X_ATSC_ESG>Address of ESG Information Endpoint</X_ATSC_ESG>
        <X_ATSC_Data>Address of Service, Show and Segment Data Endpoint</X_ATSC_Data>
        <X_ATSC_MediaTimeline>Address of Media Timeline Endpoint</X_ATSC_MediaTimeline>
        <X_ATSC_MediaPlaybackState>Address of Media Playback State
        Endpoint</X_ATSC_MediaPlaybackState>
        <X_ATSC_EAS>Address of Emergency Alert Messages Endpoint</X_ATSC_EAS>
        <X_ATSC_ApptoApp>Address of App-to-App Endpoint</X_ATSC_ApptoApp>
        .....
    </service>
    .....
</root>
```

FIG. 32

```
<?xml version="1.0"?>
<root xmlns="urn:schemas-upnp-org:device-1-0">
   .....
   <device>
      <deviceType>urn:atsc:device:atsccompanion:3</deviceType>
      <X_ATSC_Companion>Address of a WebSocket Endpoint for all
      Companion functions</X_ATSC_Companion>
      .....
   </device>
</root>
```
— t420010

```
<root xmlns="urn:schemas-upnp-org:device-1-0">
   .....
   <service>
      <serviceType>urn:atsc:device:atsccompanion:3</deviceType>
      <X_ATSC_Companion>Address of a WebSocket Endpoint for all
      Companion functions</X_ATSC_Companion>
      .....
   </service>
   ...
</root>
```
— t420020

```
<?xml version="1.0"?>
<root xmlns="urn:schemas-upnp-org:device-1-0">
   .....
   <device>
      <deviceType>urn:atsc:device:atsccompanion:3</deviceType>
      <X_ATSC_ApptoApp>Address of App-to-App
      Endpoint</X_ATSC_ApptoApp>
      <X_ATSC_Companion>Address of a WebSocket Endpoint for all other
      Companion functions</X_ATSC_Companion>
      .....
   </device>
</root>
```
— t420030

```
<?xml version="1.0"?>
<root xmlns="urn:schemas-upnp-org:device-1-0">
   .....
   <service>
      <serviceType>urn:atsc:device:atsccompanion:3</deviceType>
      <X_ATSC_ApptoApp>Address of App-to-App
      Endpoint</X_ATSC_ApptoApp>
      <X_ATSC_Companion>Address of a WebSocket Endpoint for all other
      Companion functions</X_ATSC_Companion>
      .....
   </service>
   .....
</root>
```
— t420040

FIG. 34

```
GET path to description HTTP/1.1
HOST: host for description:port for description
ACCEPT-LANGUAGE: language preferred by control point
```
— t422010

```
HTTP/1.1 200 OK
CONTENT-LANGUAGE: language used in description
CONTENT-LENGTH: Bytes in body
CONTENT-TYPE: text/xml
ServiceIdentification-WSEndpoint-URL: Address of Service and Content Identification Endpoint
ESG-WSEndpoint-URL: Address of ESG Information Endpoint
Data-WSEndpoint-URL: Address of Service, Show and Segment Data Endpoint
MediaTimeline-WSEndpoint-URL: Address of Media Timeline Endpoint
MediaPlaybackState-WSEndpoint-URL: Address of Media Playback State Endpoint
EAS-WSEndpoint-URL: Address of Emergency Alert Messages Endpoint
ApptoApp-WSEndpoint-URL: Address of App-to-App Endpoint
DATE: when responded
```
— t422020

```
HTTP/1.1 200 OK
CONTENT-LANGUAGE: language used in description
CONTENT-LENGTH: Bytes in body
CONTENT-TYPE: text/xml
Companion-WSEndpoint-URL: Address of a WebSocket Endpoint for all Companion functions
DATE: when responded
```
— t422030

```
HTTP/1.1 200 OK
CONTENT-LANGUAGE: language used in description
CONTENT-LENGTH: Bytes in body
CONTENT-TYPE: text/xml
ApptoApp-WSEndpoint-URL: Address of App-to-App Endpoint
Companion-WSEndpoint-URL: Address of a WebSocket Endpoint for all other Companion functions
DATE: when responded
```
— t422040

FIG. 36

GET path to description HTTP/1.1
HOST: host for description:port for description
ACCEPT-LANGUAGE: language preferred by control point
— t424010

HTTP/1.1 200 OK
CONTENT-LANGUAGE: language used in description
CONTENT-LENGTH: Bytes in body
CONTENT-TYPE: text/xml
WSEndpoint-URL: URL for WebSocket Endpoints
DATE: when responded
— t424020

GET path to WebSocket Endpoints HTTP/1.1
HOST: host for IP address:port for WebSocket Endpoints
ACCEPT-LANGUAGE: language preferred by control point
— t424030

GET /WSEndpoints HTTP/1.1
HOST: 192.168.1.10:8080
ACCEPT-LANGUAGE: language preferred by control point
— t424040

FIG. 37

```
<?xml version="1.0"?>
    .....
    <additionalData>
        <X_ATSC_ServiceIdentification>Address of Service and Content Identification
        Endpoint</X_ATSC_ServiceIdentification>
        <X_ATSC_ESG>Address of ESG Information Endpoint</X_ATSC_ESG>
        <X_ATSC_Data>Address of Service, Show and Segment Data Endpoint</X_ATSC_Data>
        <X_ATSC_MediaTimeline>Address of Media Timeline Endpoint</X_ATSC_MediaTimeline>
        <X_ATSC_MediaPlaybackState>Address of Media Playback State
        Endpoint</X_ATSC_MediaPlaybackState>
        <X_ATSC_EAS>Address of Emergency Alert Messages Endpoint</X_ATSC_EAS>
        <X_ATSC_ApptoApp>Address of App-to-App Endpoint</X_ATSC_ApptoApp>
        .....
    </additionalData >
</root>
```
~ t425010

```
<?xml version="1.0"?>
    .....
    <additionalData>
        <X_ATSC_Companion>Address of a WebSocket Endpoint for all
        Companion functions</X_ATSC_Companion>     .....
    </additionalData >
</root>
```
~ t425020

```
<?xml version="1.0"?>
    .....
    <additionalData>
    <X_ATSC_ApptoApp>Address of App-to-App
    Endpoint</X_ATSC_ApptoApp>
    <X_ATSC_Companion>Address of a WebSocket Endpoint for all other
    Companion functions</X_ATSC_Companion>
    .....
        </additionalData >
</root>
```
~ t425030

FIG. 46

| CD Application to PD Communication | Required Messaging Property | Appropriate Protocol |
|---|---|---|
| Service and Content Identification Communication (Subscription-based) | Notification | WebSocket |
| ESG Information Communication | Req/Resp | HTTP |
| Service, Show and Segment Data Communication | Req/Resp | HTTP |
| Media Timeline Communication (Req/Res-based & Subscription-based) | Notification, Req/Resp | WebSocket, HTTP |
| Media Playback State Communication (Subscription-based) | Notification | WebSocket |
| Emergency Alert Messages Communication (Subscription-based) | Notification | WebSocket |

FIG. 47

HTTP Request (a)
```
<CDRequest>
    <Feature>feature name</Feature>
    <Argument>...</Argument>
</CDRequest>
```

(b) Using HTTP GET method with a following URL:
CDHttpReqURL/featurename (c) Via HTTP-GET method with a URL of
ATSCCS-PDURL/ServiceName (d) Via HTTP-GET method with a URL of
ATSCCS-PDURL/ServiceName?<param1=val1&..>

| ServiceName | Description |
|---|---|
| atsc3:csservices:eam:1 | Emergency Alert Service |
| atsc3:csservices:esg:1 | Electronic Service Guide |
| atsc3:csservices:mps:1 | Media Playback State |
| atsc3.csservices.mt.1 | Media Timeline |
| ...... | ... |
|  |  |

FIG. 48

| | HTTP Response & WebSocket Response | | Examples |
|---|---|---|---|

(a)
```
<CDResponse>
    <Feature>feature name</Feature>
    Message Content for the feature
</CDResponse>
```

(b)
```
<CDResponse>
    <FeatureName>
    Message Content for the feature
    </FeatureName>
</CDResponse>
```

(c)
```
<CDResponse feature="feature name">
    Message Content for the feature
</CDResponse>
```

(d)
```
<CDResponse>
    <MediaPlaybackState>
        <SubscriptionID>aaa</SubscriptionID>
        <MPState>PLAYING</MPState>
        <MPSpeed>1</MPSpeed>
        <MediaURL>...</MediaURL>
        <MediaID>...</MediaID>
        <PDDevID>...</PDDevID>
        <PDVersion>...</PDVersion>
    </MediaPlaybackState>
</CDResponse>
```

(e)
```
<CDResponse feature="PlaybackState">
    <SubscriptionID>aaa</SubscriptionID>
    <MPState>PLAYING</MPState>
    <MPSpeed>1</MPSpeed>
    <MediaURL>...</MediaURL>
    <MediaID>...</MediaID>
    <PDDevID>...</PDDevID>
    <PDVersion>...</PDVersion>
</CDResponse>
```

FIG. 49

WebSocket Subscription Request

```
<CDSubRequest feature="feature name">
    <SubCallbackURL>...</SubCallbackURL>
    <SubDuration>...</SubDuration>
    <CDDevID>... </CDDevID>
    <CDAppID>... </CDAppID>
    <CDAppVersion>... </CDAppVersion>
    <!- additional info for the feature--!>
</CDSubRequest>
```

(a)

WebSocket Subscription Response

```
<CDSubResponse feature="feature name">
    <StatusCode>...</StatusCode>
    <StatusString>...</StatusString>
    // if successful //
    <SubID>... </SubID>
    <SubTimeoutDuration>... </SubTimeoutDuration>
    <PDDevID>... </PDDevID>
    <PDVersion>... </PDVersion>
    <!- additional info for the feature--!>
</CDSubResponse>
```

WebSocket Subscription Renewal Request (a)
```
<CDSubRequest feature="feature name">
    <SubID>... </SubID>
    <SubDuration>...</SubDuration>
    <CDDevID>... </CDDevID>
    <CDAppID>... </CDAppID>
    <CDAppVersion>... </CDAppVersion>
    <!-- additional info for the feature-->
</CDSubRequest>
```

(b)
```
<CDSubRenewRequest feature="feature name">
    <SubID>... </SubID>
    <SubDuration>...</SubDuration>
    <CDDevID>... </CDDevID>
    <CDAppID>... </CDAppID>
    <CDAppVersion>... </CDAppVersion>
</CDSubRenewRequest>
```

WebSocket Subscription Renewal Response (c)
```
<CDSubResponse feature="feature name">
    <StatusCode>...</StatusCode>
    <StatusString>...</StatusString>
    // if successful //
    <SubID>... </SubID>
    <SubTimeoutDuration>... </SubTimeoutDuration>
    <PDDevID>... </PDDevID>
    <PDVersion>... </PDVersion>
    <!-- additional info for the feature-->
</CDSubResponse>
```

(d)
```
<CDSubRenewResponse feature="feature name">
    <StatusCode>...</StatusCode>
    <StatusString>...</StatusString>
    // if successful //
    <SubID>... </SubID>
    <SubTimeoutDuration>... </SubTimeoutDuration>
    <PDDevID>... </PDDevID>
    <PDVersion>... </PDVersion>
</CDSubRenewResponse>
```

FIG. 51

WebSocket Subscription Cancel Request (a)
```
<CDSubRequest feature="feature name">
    <SubID>... </SubID>
    <CDDevID>... </CDDevID>
    <CDAppID>... </CDAppID>
    <CDAppVersion>... </CDAppVersion>
    <!-- additional info for the feature--!>
</CDSubRequest>
```

(b)
```
<CDSubCancelRequest feature="feature name">
    <SubID>... </SubID>
    <CDDevID>... </CDDevID>
    <CDAppID>... </CDAppID>
    <CDAppVersion>... </CDAppVersion>
</CDSubCancelRequest>
```

WebSocket Subscription Cancel Response (c)
```
<CDSubResponse feature="feature name">
    <StatusCode>...</StatusCode>
    <StatusString>...</StatusString>
</CDSubResponse>
```

(d)
```
<CDSubCancelResponse feature="feature name">
    <StatusCode>...</StatusCode>
    <StatusString>...</StatusString>
</CDSubCancelResponse>
```

FIG. 52

HTTP Response Format

```
<ATSCCSMessage>
    <ServiceName>...</ServiceName>
    <MessageBody>
    ......
    </MessageBody>
</ATSCCSMessage>
```

(a)

Example

```
HTTP/1.1 200 OK
CONTENT-TYPE: text/xml; charset="utf-8"
DATE: when response was generated
SERVER: OS/version
CONTENT-LENGTH: bytes in body
<ATSCCSMessage>
    <ServiceName>atsc3:ssservices:mps:1</ServiceName>
        <MessageBody>
        ...... (Message Content, TBD)
        </MessageBody>
</ATSCCSMessage>
```

(b)

HTTP Response Format

```
"ATSCCSMessage": {
  "ServiceName": "...",
  "MessageBody": {}
}
```

(c)

Example

```
HTTP/1.1 200 OK
CONTENT-TYPE: text/xml; charset="utf-8"
DATE: when response was generated
SERVER: OS/version
CONTENT-LENGTH: bytes in body
"ATSCCSMessage": {
    "ServiceName": "atsc3.csservices.esg.1",
    "MessageBody": {
        ...... (Message Content, TBD)
    }
}
```

WebSocket Message Format (a)
```
<ATSCCS_WSMessage>
    <StatusCode>...</StatusCode>
    <StatusString>...</StatusString>
    <ServiceName>...</ServiceName>
    <MessageType>...</MessageType>
    <SubID>...</SubID>
    <SubDuration>...</SubDuration>
    <MessageBody>...</MessageBody>
</ATSCCS_WSMessage>
```

(b)
```
"ATSCCS_WSMessage": {
    "ServiceName": "...",
    "MessageType":"...",
    "StatusCode": ...,
    "StatusString": "...",
    "SubID": "...",
    "SubDuration": ...,
    "MessageBody": {}
}
```

FIG. 54

Example (a)
```
<ATSCCS_WSMessage>
    <ServiceName>atsc3:csservices:mps:1</ServiceName>
    <MessageType>Sub</MessageType>
    <SubDuration>10000</SubDuration>
</ATSCCS_WSMessage>
```

(b)
```
<ATSCCS_WSMessage>
    <StatusCode>200</StatusCode>
    <StatusString>OK</StatusString>
    <ServiceName>atsc3:csservices:mps:1</ServiceName>
    <MessageType>SubRsp</MessageType>
    <SubID>abc001</SubID>
    <SubDuration>3600</SubDuration>
</ATSCCS_WSMessage>
```

(c)
```
<ATSCCS_WSMessage>
    <ServiceName>atsc3:csservices:mps:1</ServiceName>
    <MessageType>Renew</MessageType>
    <SubID>abc001</SubID>
    <SubDuration>1000</SubDuration>
</ATSCCS_WSMessage>
```

(d)
```
<ATSCCS_WSMessage>
    <StatusCode>200</StatusCode>
    <StatusString>OK</StatusString>
    <ServiceName>atsc3:csservices:mps:1</ServiceName>
    <MessageType>RenewRsp</MessageType>
    <SubID>abc001</SubID>
    <SubDuration>1000</SubDuration>
</ATSCCS_WSMessage>
```

(e)
```
<ATSCCS_WSMessage>
    <ServiceName>atsc3:csservices:mps:1</ServiceName>
    <MessageType>Noti</MessageType>
    <SubID>abc001</SubID>
    <MesseageBody>
    ...
    </MessageBody>
</ATSCCS_WSMessage>
```

(f)
```
<ATSCCS_WSMessage>
    <StatusCode>200</StatusCode>
    <StatusString>OK</StatusString>
    <ServiceName>atsc3:csservices:mps:1</ServiceName>
    <MessageType>NotiRsp</MessageType>
    <SubID>abc001</SubID>
</ATSCCS_WSMessage>
```

FIG. 55

Example (a)
```
"ATSCCS_WSMessage": {
    "ServiceName": "atsc3.csservices.mps.1",
    "MessageType": "Sub",
    "SubDuration": 1000
}
```

(b)
```
"ATSCCS_WSMessage": {
    "ServiceName": "atsc3.csservices.mps.1",
    "MessageType": "SubRsp",
    "StatusCode": 200,
    "StatusString": "OK",
    "SubID": "abc001",
    "SubDuration": 1000
}
```

(c)
```
"ATSCCS_WSMessage": {
    "ServiceName": "atsc3.csservices.mps.1",
    "MessageType": "Renew",
    "SubID": "abc001",
    "SubDuration": 1000
}
```

(d)
```
"ATSCCS_WSMessage": {
    "ServiceName": "atsc3.csservices.mps.1",
    "MessageType": "RenewRsp",
    "StatusCode": 200,
    "StatusString": "OK",
    "SubID": "abc001",
    "SubDuration": 1000
}
```

(e)
```
"ATSCCS_WSMessage": {
    "ServiceName": "atsc3.csservices.mps.1",
    "MessageType": "Notify",
    "SubID": "abc001",
    "MessageBody": {...}
}
```

(f)
```
"ATSCCS_WSMessage": {
    "ServiceName": "atsc3.csservices.mps.1",
    "MessageType": "NotifyRsp",
    "StatusCode": 200,
    "StatusString": "OK",
    "SubID": "abc001",
}
```

FIG. 56

WebSocket Subscription Message Format

```
"ATSCCS_WSSubMessage": {
   "ServiceName": "...",
   "MessageType":"...",
   "SubID":"...",
   "SubDuration": ...,
}
```

(a)

WebSocket Notification Message Format

```
"ATSCCS_WSMessage": {
   "ServiceName": "...",
   "SubID": "...",
   "MessageBody": {}
}
```

Example (a) "ATSCCS_WSSubMessage": {
    "ServiceName": "atsc3.csservices.mps.1",
    "MessageType": "Sub",
    "SubDuration": 1000
    }

(b) "ATSCCS_WSSubMessage": {
    "ServiceName": "atsc3.csservices.mps.1",
    "MessageType": "SubRsp",
    "SubID": "abc001",
    "SubDuration": 1000
    }

(c) "ATSCCS_WSSubMessage": {
    "ServiceName": "atsc3.csservices.mps.1",
    "MessageType": "Renew",
    "SubID": "abc001",
    "SubDuration": 1000
    }

(d) "ATSCCS_WSSubMessage": {
    "ServiceName": "atsc3.csservices.mps.1",
    "MessageType": "RenewRsp",
    "SubID": "abc001",
    "SubDuration": 1000
    }

(e) "ATSCCS_WSMessage": {
    "ServiceName": "atsc3.csservices.mps.1",
    "SubID": "abc001",
    "MessageBody": {...}
    }

(f) "ATSCCS_WSSubMessage": {
    "ServiceName": "atsc3.csservices.mps.1",
    "MessageType": "Cancel",
    "SubID": "abc001",
    }

(g) "ATSCCS_WSSubMessage": {
    "ServiceName": "atsc3.csservices.mps.1",
    "MessageType": "CancelRsp",
    "SubID": "abc001",
    }

FIG. 58

WebSocket Subscription Message Format

```
"ATSCCS_WSMessage": {
  "ServiceName": "...",
  "MessageType":"...",
  "RespCode":"...",
  "SubDuration": ...
}
```

(a)

WebSocket Notification Message Format

```
"ATSCCS_Message": {
  "ServiceName": "...",
  "MessageBody": {}
}
```

Example (a) "ATSCCS_WSMessage": {
    "ServiceName": "atsc3.csservices.mps.1",
    "MessageType": "Sub",
    "SubDuration": 1000
}

(b) "ATSCCS_WSMessage": {
    "ServiceName": "atsc3.csservices.mps.1",
    "MessageType": "SubRsp",
    "RespCode": 200,
    "SubDuration": 1000
}

(c) "ATSCCS_WSMessage": {
    "ServiceName": "atsc3.csservices.mps.1",
    "MessageType": "Renew",
    "SubDuration": 1000
}

(d) "ATSCCS_WSMessage": {
    "ServiceName": "atsc3.csservices.mps.1",
    "MessageType": "RenewRsp",
    "RespCode": 200,
    "SubDuration": 1000
}

(e) "ATSCCS_Message": {
    "ServiceName": "atsc3.csservices.mps.1",
    "MessageBody": {...}
}

(f) "ATSCCS_WSMessage": {
    "ServiceName": "atsc3.csservices.mps.1",
    "MessageType": "Cancel",
}

(g) "ATSCCS_WSMessage": {
    "ServiceName": "atsc3.csservices.mps.1",
    "MessageType": "CancelRsp",
    "RespCode": 200,
}

FIG. 60

WebSocket Subscription Message Format

```
"ATSCCS_WSMessage": {
    "ServiceName": "atsc3.csservices.mps.1",
    "MessageType":"...",
    "RespCode":"...",
    "SubDuration": ...
}
```

(a)

WebSocket Notification Message Format

```
"ATSCCS_Message": {
    "ServiceName": "atsc3.csservices.mps.1 ",
    "MessageBody": {
        "MPState": "...",
        "MPSpeed":"...",
        "MediaURL":"...",
        "MediaID":"...",
        "PDDevID":"...",
        "PDVersion":"..."
    }
}
```

(b)

BROADCASTING SIGNAL TRANSMITTING APPARATUS, BROADCASTING SIGNAL RECEIVING APPARATUS, BROADCASTING SIGNAL TRANSMITTING METHOD, AND BROADCASTING SIGNAL RECEIVING METHOD

CROSS REFERENCE TO RELATED APPLICATIONS

This application is the National Phase of PCT International Application No. PCT/KR2016/005537, filed on May 25, 2016, which claims priority under 35 U.S.C. 119(e) to U.S. Provisional Application No. 62/166,156, filed on May 26, 2015, No. 62/167,286, May 28, 2015, No. 62/169,556, filed on Jun. 2, 2015, No. 62/170,145, filed on Jun. 3, 2015, and No. 62/180,065, filed on Jun. 16, 2015, all of which are hereby expressly incorporated by reference into the present application.

TECHNICAL FIELD

The present invention relates to an apparatus for transmitting a broadcast signal, an apparatus for receiving a broadcast signal and methods for transmitting and receiving a broadcast signal.

BACKGROUND ART

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

DISCLOSURE

Technical Problem

That is, a digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

Technical Solution

The present invention provides a system capable of effectively supporting future broadcast services in an environment supporting future hybrid broadcasting using terrestrial broadcast networks and the Internet and related signaling methods.

Advantageous Effects

The present invention proposes a method for efficiently providing hybrid broadcast using both broadcast networks and the Internet.

The present invention proposes app-based enhancement on the basis of applications for basic broadcast services.

The present invention proposes a method for providing app-based enhancement in synchronization with a broadcast service.

The present invention proposes architectures according to various protocols between a PD and a CD and a method for communication between the PD and the CD and between applications according to architectures.

The present invention proposes architectures and signaling methods for effectively delivering information such as an ESG and an EAS from a PD to a CD.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a diagram showing a low level signaling (LLS) table and a service list table (SLT) according to one embodiment of the present invention;

FIG. 4 is a diagram showing a USBD and an S-TSID delivered through ROUTE according to one embodiment of the present invention;

FIG. 5 is a diagram showing a USBD delivered through an MMT according to one embodiment of the present invention;

FIG. 6 is a diagram showing link layer operation according to one embodiment of the present invention;

FIG. 7 is a diagram showing a link mapping table (LMT) according to one embodiment of the present invention;

FIG. 9 is a writing operation of a time interleaver according to an embodiment of the present invention;

FIG. 11 illustrates state variables for delivery of service time information according to an embodiment of the present invention;

FIG. 12 illustrates service time information according to an embodiment of the present invention;

FIG. 28 illustrates formats of messages used for discovery of a PD (Primary Device) according to an embodiment of the present invention;

FIG. 30 illustrates a DDD request message and a DDD format in a process for discovering a Websocket endpoint or an HTTP service URL using a DDD according to an embodiment of the present invention;

FIG. 31 illustrates DDD formats in a process for discovering a Websocket endpoint or an HTTP service URL using a DDD according to an embodiment of the present invention;

FIG. 32 illustrates DDD formats in a process for discovering a Websocket endpoint or an HTTP service URL using a DDD according to another embodiment of the present invention;

FIG. 34 illustrates response header formats in a process for discovering a Websocket endpoint or an HTTP service URL using a response header to a DDD request according to an embodiment of the present invention;

FIG. 36 illustrates a GET request and formats of response messages thereto in a process for discovering a Websocket endpoint or an HTTP service URL using a URL of a response header to a DDD request according to an embodiment of the present invention;

FIG. 37 illustrates a format of a response message delivering address information in a process for discovering a Websocket endpoint or an HTTP service URL using a URL of a response header to a DDD request according to another embodiment of the present invention;

FIG. 46 is a diagram illustrating a protocol applied to features according to an embodiment of the present invention;

FIG. 47 is a diagram illustrating a message structure format for an HTTP request according to an embodiment of the present invention;

FIG. 48 is a diagram illustrating a message structure format for an HTTP response and/or WebSocket response according to an embodiment of the present invention;

FIG. 49 is a diagram illustrating a message structure format for WebSocket subscription according to an embodiment of the present invention;

FIG. 50 is a diagram illustrating a message structure format for WebSocket subscription renewal according to an embodiment of the present invention;

FIG. 51 is a diagram illustrating a message structure format for WebSocket subscription cancellation according to an embodiment of the present invention;

FIG. 52 is a diagram illustrating a message structure format for an HTTP response according to an embodiment of the present invention;

FIG. 53 is a diagram illustrating a message structure format for a WebSocket message according to an embodiment of the present invention;

FIG. 54 is a diagram illustrating an ATSCCS_WSMessage element with an XML format according to an embodiment of the present invention;

FIG. 55 is a diagram illustrating an ATSCCS_WSMessage element with a JSON format according to an embodiment of the present invention;

FIG. 56 is a diagram illustrating a WebSocket subscription message format and a WebSocket notification message format according to an embodiment of the present invention;

FIG. 57 is a diagram illustrating an ATSCCS_WSSubMessage element and an ATSCCS_WSMessage message with a JSON format according to an embodiment of the present invention;

FIG. 58 is a diagram illustrating a WebSocket subscription message format and a WebSocket notification message format according to another embodiment of the present invention;

FIG. 59 is a diagram illustrating an ATSCCS_WSSubMessage element and an ATSCCS_WSMessage message with a JSON format according to an embodiment of the present invention;

FIG. 60 is a diagram illustrating a WebSocket subscription message format and a WebSocket notification message format for media playback state communication according to another embodiment of the present invention;

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

Figure 1:
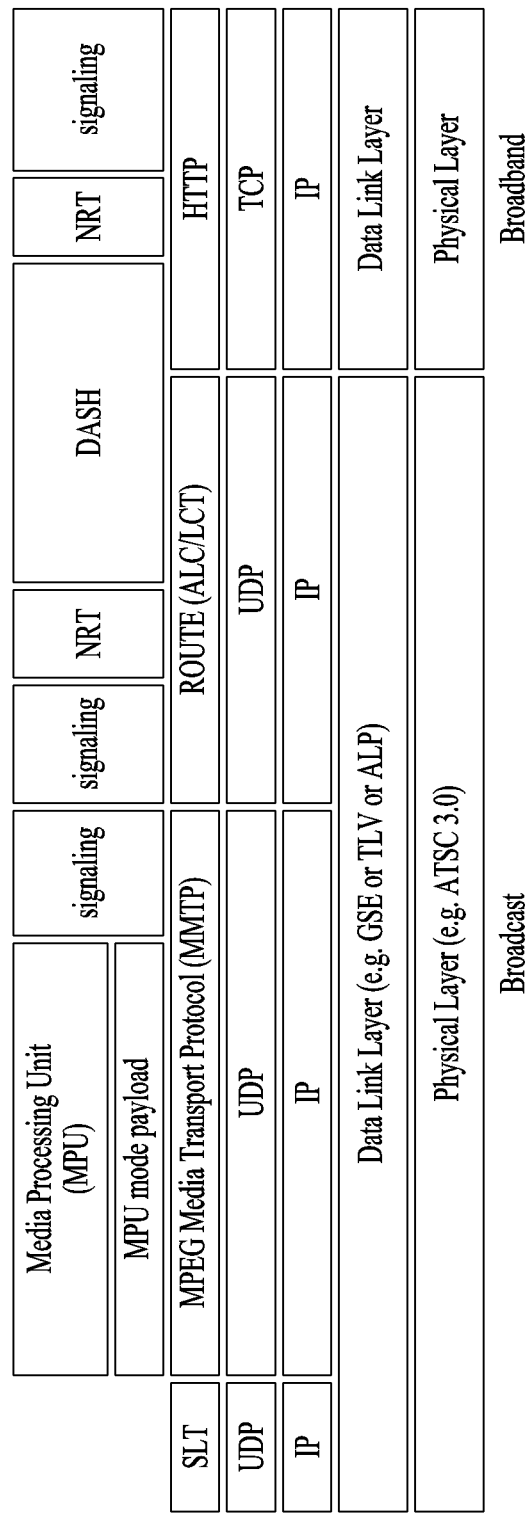
FIG. 1 is a diagram showing a protocol stack according to an embodiment of the present invention.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

Figure 2:
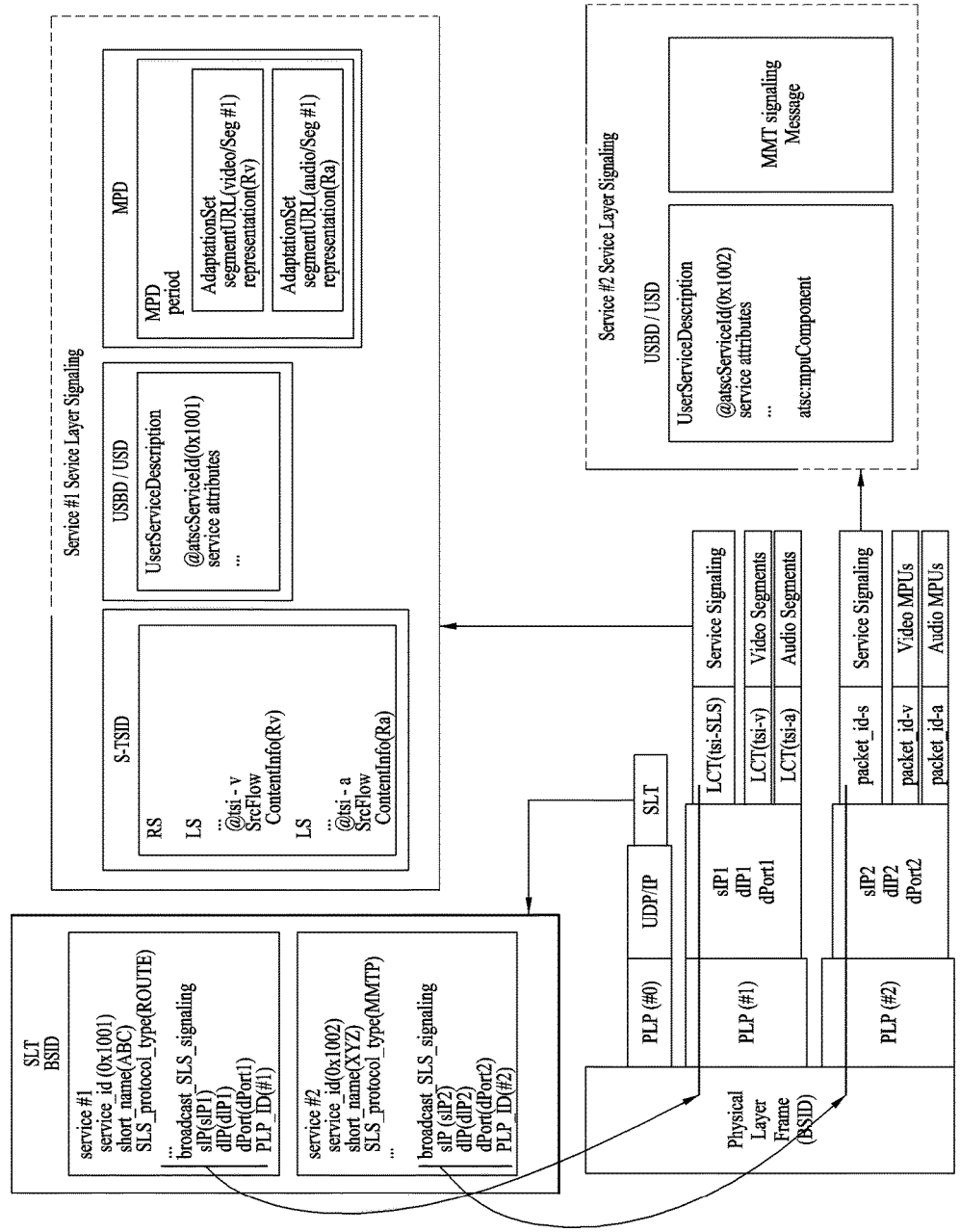
FIG. 2 is a diagram showing a service discovery procedure according to one embodiment of the present invention.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @short- ServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPIpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPIpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT.

The @service Status attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMPDUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @sTSIDDe stinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSID-SourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may include a header compressor/decompressor and/or an adaptation module. The IP header compressor (RoHC compressor) may reduce the size of each IP packet based on a RoHC method. Then, adaptation module may extract context information and generate signaling information from each packet stream. A receiver may parse signaling information related to a corresponding packet stream and attach the context information to the packet stream. The RoHC decompressor may recover a packet header to reconfigure an original IP packet. Hereinafter, IP header compression may refer to only IP header compressor via header compressor and may be a concept that combines IP header compression and the adaptation procedure by the adaptation module. This may be the same as in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may construct link layer signaling using context information and/or configuration parameters. The adaptation function may periodically transmit link layer signaling through each physical frame using a previous configuration parameter and/or context information.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. Here, the RDT may be context information (static chain and/or dynamic chain) and/or signaling information including information associated with header compression. In some embodiments, the RDT may be transmitted whenever context information is changed. In some embodiments, the RDT may be transmitted in every physical frame. To transmit the RDT in every physical frame, a previous RDT may be re-used.

The receiver may select a first PLP and first acquire signaling information of the SLT, the RDT, etc., prior to acquisition of a packet stream. Upon acquring the signaling information, the receiver may combine the information to acquire mapping of service—IP information—context information—PLP. That is, the receiver may recognize IP streams through which a service is transmitted, IP streams transmitted through a PLP, and so on and acquire corresponding context information of the PLPs. The receiver may select a PLP for delivery of a specific packet stream and decode the PLP. The adaptation module may parse the context information and combine the context information with the compressed packets. Thereby, the packet stream may be recovered and transmitted to the RoHC de compressor. Then, decompression may be started. In this case, the receiver may detect an IR packet and start decompression from a first received IR packet according to an adaptation mode (mode 1), may detect an IR-DYN packet and start decompression from a first received IR-DYN packet (mode 2), or may start decompression from any general compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be pre-defined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions. Here, the higher layer session may be referred to as multicast. Information on IP streams or transport sessions transmitted through one PLP may be acquired through the LMT. In contrast, information on through which PLP a specific transport session is delivered may be acquired.

The LMT may be transmitted through any PLP identified to deliver the LLS. Here, the PLP for delivering the LLS may be identified by an LLS flag of L1 detail signaling information of a physical layer. The LLS flag may be a flag field indicating whether the LLS is transmitted through a corresponding PLP with respect to each PLP. Here, the L1 detail signaling information may be correspond to PLS2 data which will be described later.

That is, the LMT may also be transmitted through the same PLP along with the LLS. Each LMT may describe mapping between PLPs and IP address/port as described above. As described above, the LLS may include an SLT and, in this regard, the IP address/ports described by the LMT may be any IP address/ports related to any service, described by the SLT transmitted through the PLP such as a corresponding LMT.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling_type field, a PLP_ID field, a num_session field and/or information on each session. Although the LMT of the shown embodiment describes IP streams transmitted through one PLP, a PLP loop may be added to the LMT to describe information on a plurality of PLPs in some embodiments. In this case, as described above, the LMT may describe PLPs of all IP addresses/ports related to all service described by the SLT transmitted together using a PLP loop.

The signaling_type field may indicate the type of signaling information delivered by the table. The value of signaling_type field for the LMT may be set to 0x01. The signaling_type field may signaling_type field may be omitted. The PLP_ID field may identify a target PLP to be described. When the PLP loop is used, each PLP_ID field may identify each target PLP. Fields from the PLP_ID field may be included in the PLP loop. Here, the below-described PLP_ID field may be an identifier of one PLP of the PLP loop and the following fields may be fields corresponding to the corresponding PLP.

The num_session field may indicate the number of higher layer sessions delivered through the PLP identified by the PLP_ID field. According to the number indicated by the num_session field, information on each session may be included. This information may include a src_IP_add field, a dst_IP_add field, a src_UDP_port field, a dst_UDP_port field, an SID_flag field, a compressed_flag field, an SID field, and/or a context_id field.

The src_IP_add field, the dst_IP_add field, the src_UDP_port field, and the dst_UDP_port field may indicate the source IP address, the destination IP address, the source UDP port and the destination UDP port of the transport session among the higher layer sessions delivered through the PLP identified by the PLP_ID field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. When header compression is applied (compressed_flag=1), the RDT may be present and the PLP ID field of the RDT may have the same value as the corresponding PLP_ID field related to the present compressed_flag field.

The SID field may indicate a sub stream ID (SID) of link layer packets for delivering a corresponding transfer session. The link layer packets may include the SID having the same value as the present SID field in the optional header. Thereby, the receiver may filter link layer packets using information of the LMT and SID information of a link layer packet header without parsing of all link layer packets.

The context_id field may provide a reference for a context id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of the present invention, bootstrapping of an ESG service may be performed by a broadcast or broadband network. By acquiring the ESG over broadband, URL information of the SLT may be used. ESG information may be requested using this URL.

In another embodiment of the present invention, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver can confirm a segment to be requested from the broadband service and a segment to be detected in a broadcast stream.

In another embodiment of the present invention, scalable coding of a service may be performed. The USBD may have all capability information necessary to render the service. For example, when one service is provided in HD or UHD, the capability information of the USBD may have a value of "HD or UHD". The receiver may check which component is reproduced in order to render the UHD or HD service using the MPD.

In another embodiment of the present invention, through a TOI field of the LCT packets delivered through the LCT channel delivering the SLS, which SLS fragment is delivered using the LCT packets (USBD, S-TSID, MPD, etc.) may be identified.

In another embodiment of the present invention, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present invention, a CAP message may be included and provided in the above-described LLS table for emergency alert. Rich media content for emergency alert may also be provided. Rich media may be signaled by a CAP message and, if rich media is present, the rich media may be provided as an EAS service signaled by the SLT.

In another embodiment of the present invention, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present invention, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

Figure 8:
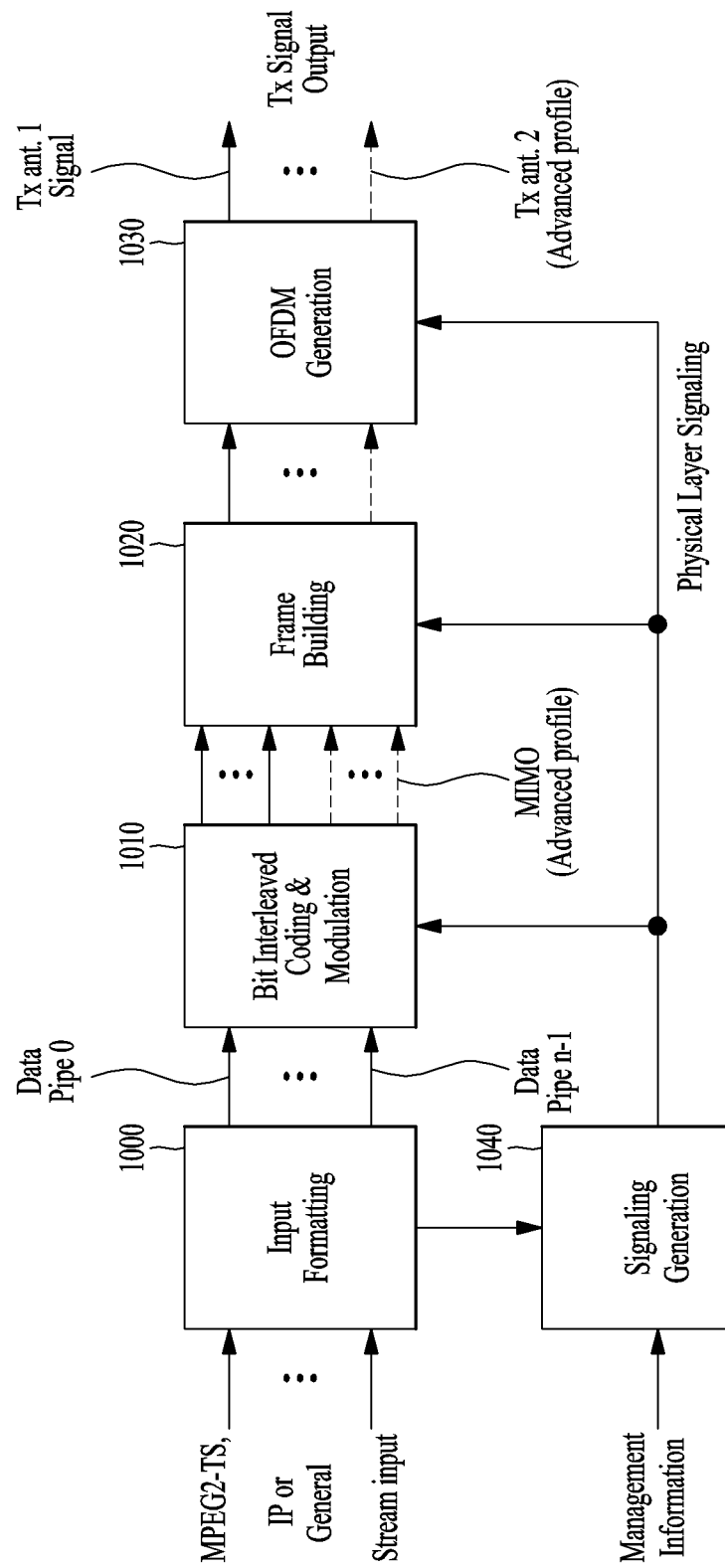
FIG. 8 is a diagram showing a structure of a broadcast signal transmission device of a next-generation broadcast service according to an embodiment of the present invention.

FIG. 8 is a diagram showing a structure of a broadcast signal transmission device of a next-generation broadcast service according to an embodiment of the present invention.

The broadcast signal transmission device of the next-generation broadcast service according to an embodiment of the present invention may include an input format block 1000, a bit interleaved coding & modulation (BICM) block 1010, a frame building block 1020, an orthogonal frequency division multiplexing (OFDM) generation block 1030, and a signaling generation block 1040. An operation of each block of the broadcast signal transmission device will be described.

According to an embodiment of the present invention, input data may use IP stream/packet and MPEG2-TS as main input format and other stream types may be handled as a general stream.

The input format block 1000 may demultiplex each input stream using one or more data pipes to which independent coding and modulation are applied. The data pipe may be a basic unit for robustness control and may affect quality of service (QoS). One or more services or service components may affect one data pipe. The data pipe may be a logical channel in a physical layer for delivering service data or metadata for delivering one or more services or service components.

Since QoS is dependent upon the characteristics of a service provided by the broadcast signal transmission device of the next-generation broadcast service according to an embodiment of the present invention, data corresponding to each service needs to be processed via different methods.

The BICM block 1010 may include a processing block applied to a profile (or system) to which MIMO is not applied and/or a processing block of a profile (or system) to which MIMO is applied and may include a plurality of processing blocks for processing each data pipe.

The processing block of the BICM block to which MIMO is not applied may include a data FEC encoder, a bit interleaver, a constellation mapper, a signal space diversity (SSD) encoding block, and a time interleaver. The processing block of the BICM block to which MIMO is applied is different from the processing block of the BICM to which MIMO is not applied in that a cell word demultiplexer and an MIMO encoding block are further included.

The data FEC encoder may perform FEC encoding on an input BBF to generate a FECBLOCK procedure using external coding (BCH) and internal coding (LDPC). The external coding (BCH) may be a selective coding method. The bit interleaver may interleave output of the data FEC encoder to achieve optimized performance using a combination of the LDPC code and a modulation method. The constellation mapper may modulate cell word from a bit interleaver or a cell word demultiplexer using QPSK, QAM-16, irregular QAM (NUQ-64, NUQ-256, NUQ-1024), or irregular constellation (NUC-16, NUC-64, NUC-256, NUC-1024) and provide a power-normalized constellation point. NUQ has an arbitrary type but QAM-16 and NUQ have a square shape. All of the NUQ and the NUC may be particularly defined with respect to each code rate and signaled by parameter DP MOD of PLS2 data. The time interleaver may be operated at a data pipe level. A parameter of the time interleaving may be differently set with respect to each data pipe.

The time interleaver according to the present invention may be positioned between the BICM chain and the frame builder. In this case, the time interlever according to the present invention may selectively use a convolution interleaver (CI) and a block interleaver (BI) according to a physical layer pipe (PLP) mode or may use all. The PLP according to an embodiment of the present invention may be a physical path used using the same concept as the aforementioned DP and its term may be changed according to designer intention. The PLP mode according to an embodiment of the present invention may include a single PLP mode or a multiple PLP mode according to the number of PLPs processed by the broadcast signal transmitter or the broadcast signal transmission device. Time interleaving using different time interleaving methods according to a PLP mode may be referred to as hybrid time interleaving.

A hybrid time interleaver may include a block interleaver (BI) and a convolution interleaver (CI). In the case of PLP_NUM=1, the BI may not be applied (BI off) and only the CI may be applied. In the case of PLP_NUM>1, both the BI and the CI may be applied (BI on). The structure and operation of the CI applied in the case of PLP_NUM>1 may be different from those of the CI applied in the case of PLP_NUM=1. The hybrid time interleaver may perform an operation corresponding to a reverse operation of the aforementioned hybrid time interleaver.

The cell word demultiplexer may be used to divide a single cell word stream into a dual cell word stream for MIMO processing. The MIMO encoding block may process output of the cell word demultiplexer using a MIMO encoding method. The MIMO encoding method according to the present invention may be defined as full-rate spatial multiplexing (FR-SM) for providing increase in capacity via relatively low increase in complexity at a receiver side. MIMO processing may be applied at a data pipe level. When a pair of constellation mapper outputs, NUQ $e_{1,i}$ and $e_{2,i}$ is input to a MIMO encoder, a pair of MIMO encoder outputs, g1,i and g2,i may be transmitted by the same carrier k and OFDM symbol 1 of each transmission antenna.

The frame building block 1020 may map a data cell of an input data pipe in one frame to an OFDM symbol and perform frequency interleaving for frequency domain diversity.

According to an embodiment of the present invention, a frame may be divided into a preamble, one or more frame signaling symbols (FSS), and a normal data symbol. The preamble may be a special symbol for providing a combination of basic transmission parameters for effective transmission and reception of a signal. The preamble may signal a basic transmission parameter and a transmission type of a frame. In particular, the preamble may indicate whether an emergency alert service (EAS) is currently provided in a current frame. The objective of the FSS may be to transmit PLS data. For rapid synchronization and channel estimation and rapid decoding of PLS data, the FSS may have a pipe pattern with higher density than a normal data symbol.

The frame building block may include a delay compensation block for adjusting timing between a data pipe and corresponding PLS data to ensure co-time between a data pipe and corresponding PLS data at a transmitting side, a cell mapper for mapping a PLS, a data pipe, an auxiliary stream, a dummy stream, and so on to an active carrier of an OFDM symbol in a frame, and a frequency interleaver.

The frequency interleaver may randomly interleave a data cell received from the cell mapper to provide frequency diversity. The frequency interleaver may operate with respect to data corresponding to an OFDM symbol pair including two sequential OFDM symbols or data corresponding to one OFDM symbol using different interleaving seed orders in order to acquire maximum interleaving gain in a single frame.

The OFDM generation block 1030 may modulate an OFDM carrier by the cell generated by the frame building block, insert a pilot, and generate a time domain signal for transmission. The corresponding block may sequentially insert guard intervals and may apply PAPR reduction processing to generate a last RF signal.

The signaling generation block 1040 may generate physical layer signaling information used in an operation of each functional block. The signaling information according to an embodiment of the present invention may include PLS data.

The PLS may provide an element for connecting a receiver to a physical layer data pipe. The PLS data may include PLS1 data and PLS2 data.

The PLS1 data may be a first combination of PLS data transmitted to FSS in a frame with fixed size, coding, and modulation for transmitting basic information on a system as well as a parameter required to data PLS2 data. The PLS1 data may provide a basic transmission parameter including a parameter required to receive and decode PLS2 data. The PLS2 data may be a second combination of PLP data transmitted to FSS for transmitting more detailed PLS data of a data pipe and a system. PLS2 signaling may further include two types of parameters of PLS2 static data (PLS2-STAT data) and PLS2 dynamic data (PLS2-DYN data). The PLS2 static data may be PLS2 data that is static during duration of a frame group and the PLS2 dynamic data may be PLS2 data that is dynamically changed every frame.

The PLS2 data may include FIC_FLAG information. A fast information channel (FIC) may be a dedicated channel for transmitting cross-layer information for enabling fast service acquisition and channel scanning. The FIC_FLAG information may indicate whether a fast information channel (FIC) is used in a current frame group via a 1-bit field. When a value of the corresponding field is set to 1, the FIC may be provided in the current frame. When a value of the corresponding field is set to 0, the FIC may not be transmitted in the current frame. The BICM block 1010 may include a BICM block for protecting PLS data. The BICM block for protecting the PLS data may include a PLS FEC encoder, a bit interleaver, and a constellation mapper.

The PLS FEC encoder may include a scrambler for scrambling PLS1 data and PLS2 data, a BCH encoding/zero inserting block for performing external encoding on the scrambled PLS 1 and 2 data using a BCH code shortened for PLS protection and inserting a zero bit after BCH encoding, a LDPC encoding block for performing encoding using an LDPC code, and an LDPC parity puncturing block. Only the PLS1 data may be permutated before an output bit of zero insertion is LDPC-encoded. The bit interleaver may interleave each of the shortened and punctured PLS1 data and PLS2 data, and the constellation mapper may map the bit-interleaved PLS1 data and PLS2 data to constellation.

A broadcast signal reception device of a next-generation broadcast service according to an embodiment of the present invention may perform a reverse operation of the broadcast signal transmission device of the next-generation broadcast service that has been described with reference to FIG. 8.

The broadcast signal reception device of a next-generation broadcast service according to an embodiment of the present invention may include a synchronization & demodulation module for performing demodulation corresponding to a reverse operation performed by the broadcast signal transmission device, a frame parsing module for parsing an input signal frame to extract data transmitted by a service selected by a user, a demapping & decoding module for converting an input signal into bit region data, deinterleaving bit region data as necessary, performing demapping on mapping applied for transmission efficiency, and correcting error that occurs in a transmission channel for decoding, an output processor for performing a reverse operation of various compression/signal processing procedures applied by the broadcast signal transmission device, and a signaling decoding module for acquiring and processing PLS information from the signal demodulated by the synchronization & demodulation module. The frame parsing module, the demapping & decoding module, and the output processor may perform the functions using the PLS data output from the signaling decoding module.

Hereinafter, the timer interleaver will be described. A time interleaving group according to an embodiment of the present invention may be directly mapped to one frame or may be spread over $P_I$ frames. In addition, each time interleaving group may be divided into one or more ($N_{TI}$) time interleaving blocks. Here, each time interleaving block may correspond to one use of a time interleaver memory. A time interleaving block in the time interleaving group may include different numbers of XFECBLOCK. In general, the time interleaver may also function as a buffer with respect to data pipe data prior to a frame generation procedure.

The time interleaver according to an embodiment of the present invention may be a twisted row-column block interleaver. The twisted row-column block interleaver according to an embodiment of the present invention may write a first XFECBLOCK in a first column of the time interleaving memory, write a second XFECBLOCK in a next column, and write the remaining XFECBLOCKs in the time interleaving block in the same manner. In an interleaving array, a cell may be read in a diagonal direction to a last row from a first row (a leftmost column as a start column is read along a row in a right direction). In this case, to achieve single memory deinterleaving at a receiver side irrespective of the number of XFECBLOCK in the time interleaving block, the interleaving array for the twisted row-column block interleaver may insert a virtual XFECBLOCK into the time interleaving memory. In this case, to achieve single memory deinterleaving at a receiver side, the virtual XFECBLOCK needs to be inserted into another frontmost XFECBLOCK.

Figure 9:
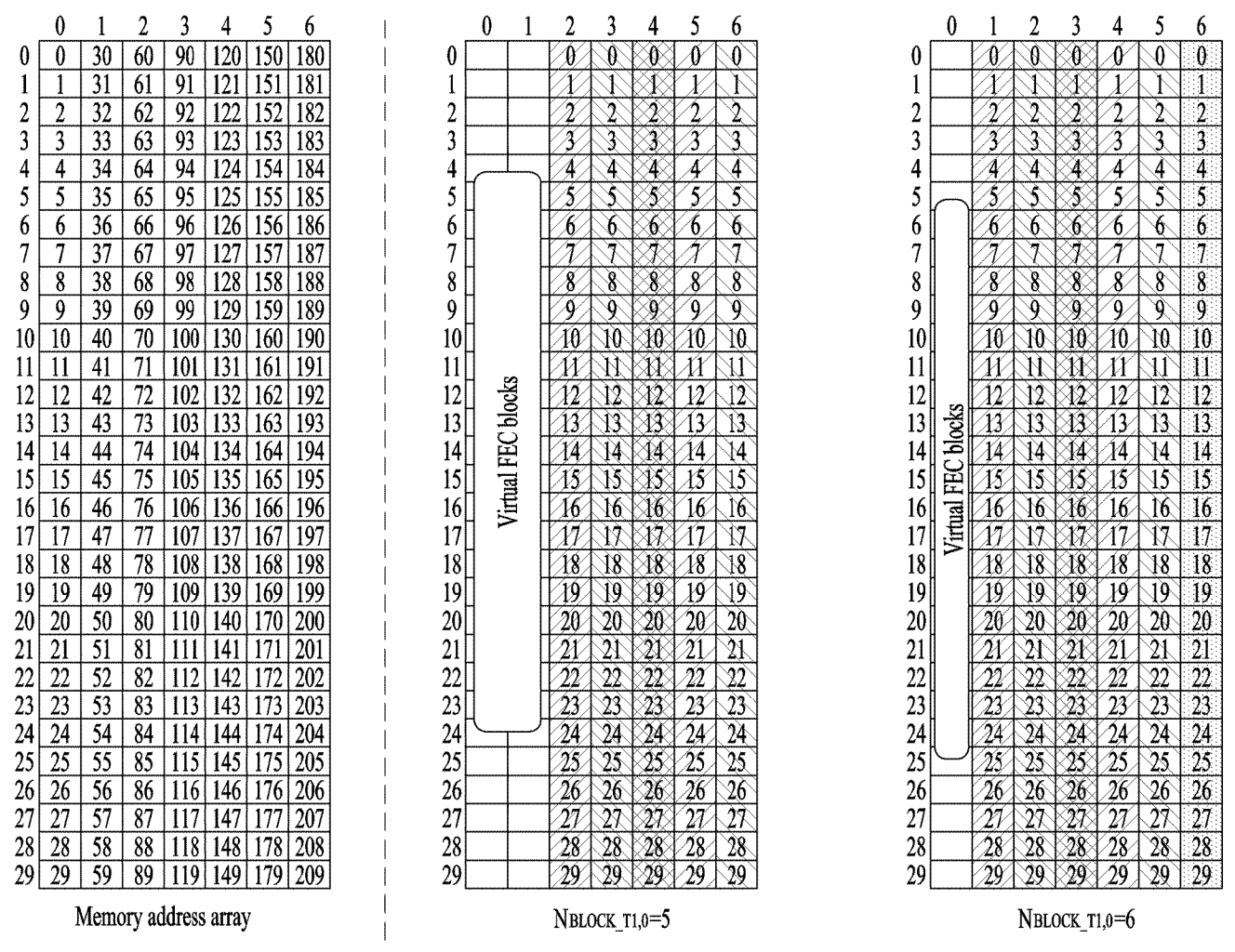

FIG. 9 is a writing operation of a time interleaver according to an embodiment of the present invention.

A block shown in a left portion of the drawing shows a TI memory address array and a block shown in a right portion of the drawing shows a writing operation when two or one virtual FEC blocks are inserted into a frontmost group of TI groups with respect to two consecutive TI groups.

The frequency interleaver according to an embodiment of the present invention may include an interleaving address generator for generating an interleaving address to be applied to data corresponding to a symbol pair.

Figure 10:
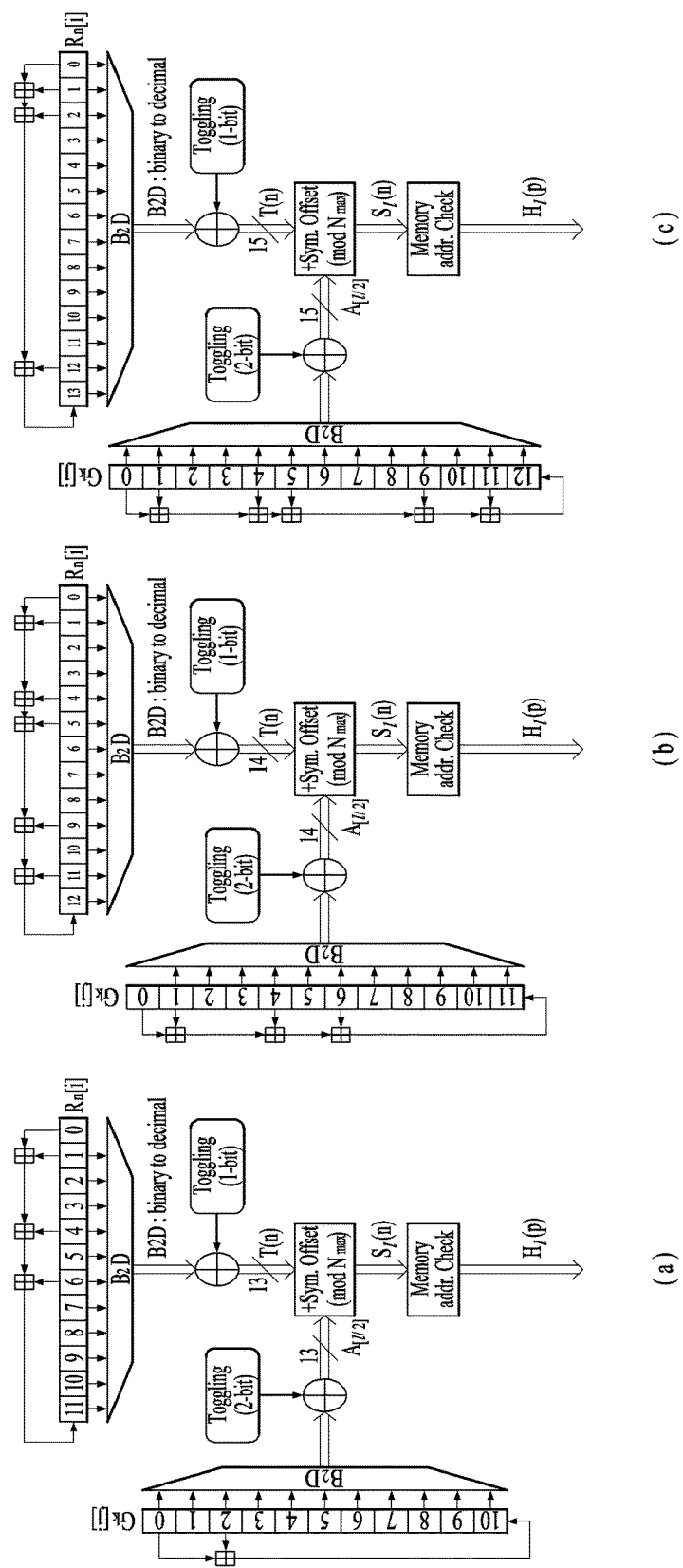
FIG. 10 is a block diagram of an interleaving address generator including a main-PRBS generator and a sub-PRBS generator according to each FFT mode, included in the frequency interleaver, according to an embodiment of the present invention.

FIG. 10 is a block diagram of an interleaving address generator including a main-PRBS generator and a sub-PRBS generator according to each FFT mode, included in the frequency interleaver, according to an embodiment of the present invention.

(a) is a block diagram of an interleaving address generator with respect to a 8K FFT mode, (b) is a block diagram of an interleaving address generator with respect to a 16K FFT mode, and (c) is a block diagram of an interleaving address generator with respect to a 32K FFT mode.

An interleaving procedure with respect to an OFDM symbol pair may use one interleaving sequence and will be described below. First, an available data cell (output cell from a cell mapper) to be interleaved in one OFDM symbol $O_{m,1}$ may be defined as $O_{m,1}=[X_{m,1,0}, \ldots, X_{m,1,p}, \ldots, X_{m,1,Ndata-1}]$ with respect to $l=0, \ldots, N_{sym}-1$. In this case, $x_{m,1,p}$ may be a $p^{th}$ cell of a $l^{th}$ OFDM symbol in a $m^{th}$ frame and $N_{data}$ may be the number of data cells. In the case of a frame signaling symbol, $N_{data}=C_{FSS}$, in the case of normal data, $N_{data}=C_{data}$, and in the case of a frame edge symbol, $N_{data}=C_{FES}$. In addition, the interleaving data cell may be defined as $P_{m,1}=[v_{m,1,0}, \ldots, v_{m,1Ndata-1}]$ with respect to $l=0, \ldots, N_{sym}-1$.

With respect to an OFDM symbol pair, an interleaved OFDM symbol pair may be given according to $V_{m,1,Hi(p)}=x_{m,1,p}$, $p=0, \ldots, N_{data}-1$ for a first OFDM symbol of each pair and given according to $v_{m,l,p}=x_{m,l,Hi(p)}$ $p=0, \ldots, N_{data}-1$ for a second OFDM symbol of each pair. In this case, $H_1(p)$ may be an interleaving address generated based on a cyclic shift value (symbol offset) of a PRBS generator and a sub-PRBS generator.

FIG. 11 is a diagram illustrating state variables for delivery of service time information according to an embodiment of the present invention.

The drawing illustrates state variables for delivery of the service time information. The state variables for delivery of the service time information may include at least one of a ServiceTimeInfo state variable including the service time information, an UpdateDuration state variable including delivery duration information, and/or an A_ARG_TYPE_UpdateDuration state variable including requested delivery duration information. The ServiceTimeInfo state variable, the UpdateDuration state variable, and/or the A_ARG_TYPE_UpdateDuration state variable may be a required state variable. The ServiceTimeInfo state variable may include media time and current time, i.e., wall-clock time information of a program that is presented or served by a broadcast receiving apparatus. The UpdateDuration state variable may be variable indicating delivery duration of time information when a broadcast receiving apparatus transmit the time information for synchronization to a companion screen device using an eventing method. The A_ARG_TYPE_UpdateDuration state variable may be variable to be used to make a request for particular delivery duration when a companion screen device receives time information for synchronization from a broadcast receiving apparatus using an eventing method.

Service time information (ServiceTimeInfo) may be information for providing data related to time synchronization between A/V content displayed by a broadcast receiving apparatus and A/V content displayed by a companion screen device. For example, the service time information may include at least one of media time information and/or wall-clock time of a program that is presented or served by a broadcast receiving apparatus. The broadcast receiving apparatus may execute an event (or triggering event) (eventing method) to transmit service time information for time synchronization to a companion screen device. In addition, the broadcast receiving apparatus may transmit the service time information for time synchronization to the companion screen device in response to a request of the companion screen device (requesting method).

The delivery duration information may be information indicating duration for delivery of the service time information. The broadcast receiving apparatus may transmit the service time information to the companion screen device based on the delivery duration information. For example, the delivery duration information (UpdateDuration) may be information indicating delivery duration when the broadcast receiving apparatus transmits service time information for time synchronization to the companion screen device using an eventing method. That is, the delivery duration information may indicate duration for eventing the service time information. When the broadcast receiving apparatus transmits the service time information for time synchronization to the companion screen device using an eventing method, the broadcast receiving apparatus may transmit the service time information to the companion screen device with duration indicated by the delivery duration information.

The requested delivery duration information may be information indicating a value of delivery duration information requested by the companion screen device when the companion screen device receives service time information for time synchronization from the broadcast receiving apparatus using an eventing. In detail, when the broadcast receiving apparatus transmits service time information for time synchronization to the companion screen device using an eventing method, the companion screen device may make a request for predetermined (or particular) delivery duration to the broadcast receiving apparatus based on the requested delivery duration information. In response to the request of the companion screen device, the broadcast receiving apparatus may determine delivery duration information based on the requested delivery duration information and transmit the service time information to the companion screen device with duration indicated by the delivery duration information.

FIG. 12 is a diagram illustrating service time information according to an embodiment of the present invention.

The service time information may be information for time synchronization between the broadcast receiving apparatus and the companion screen device. The service time information may include at least one of media time information and/or current time information of a program that is presented or served by the broadcast receiving apparatus. The service time information may include the aforementioned media timeline checkpoint.

In detail, the service time information may include at least one of serviceId attribute, programId attribute, mediaTime element, and/or currentTime element.

The serviceId attribute may indicate a unique ID of a service that is currently selected by a first receiver. For example, the service may include at least one of a linear service and/or a non-linear service.

The programId attribute may indicate a unique ID of a currently presented program. For example, the program may include content included in a linear service and/or a non-linear service.

The mediaTime element may indicate media time information of a currently presented program. The mediaTime element may include mediaTimeProtocol attribute indicating a program used to represent the mediaTime element. For example, the mediaTimeProtocol attribute may indicate a timestamp.

The currentTime element may indicate current time information (wall-clock time). The currentTime element may include currentTimeProtocol attribute indicating a program used to represent the currentTime element. For example, the currentTimeProtocol attribute may indicate a network time protocol (NTP).

The broadcast receiving apparatus may execute an event (or triggering event) (eventing method) to transmit service time information for time synchronization between the broadcast receiving apparatus and the companion screen device to the companion screen device. In addition, the broadcast receiving apparatus may transmit the service time information for time synchronization to the companion screen device in response to a request of the companion screen device (requesting method).

Figures 13, 14:
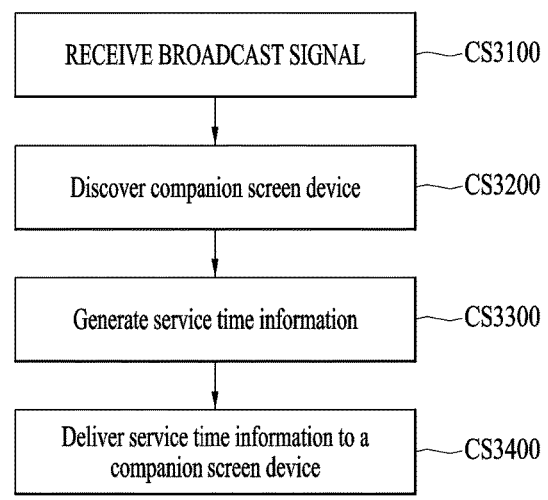
FIG. 13 illustrates an XML format of the service time information according to an embodiment of the present invention.
FIG. 14 is a flowchart illustrating an operation of the broadcast reception apparatus according to an embodiment of the present invention.

FIG. 13 is a diagram illustrating XML format of service time information according to an embodiment of the present invention.

Referring to the drawing, service time information may include at least one of serviceId attribute, programId attribute, mediaTime element, and/or currentTime element.

The serviceId attribute may indicate "11". The programId attribute may indicate "1008". The mediaTime element may include mediaTimeProtocol attribute. The mediaTimeProtocol attribute may indicate "timestamp". In addition, the mediaTime element may indicate "77ee". The currentTime element may include currentTimeProtocol attribute. The currentTimeProtocol attribute may indicate "NTP". The currentTime element may indicate "88ee".

The broadcast receiving apparatus may transmit service time information including media time information indicating "77ee" as a timestamp and current time information indicating "88ee" as an NTP to the companion screen device with respect to a program with "1008" as a value of a program ID in a service with "11" as a value of a service ID.

FIG. 14 is a flowchart illustrating an operation of a broadcast receiving apparatus according to an embodiment of the present invention.

A broadcast signal receiving apparatus may receive a broadcast signal using a broadcast interface (CS3100). For example, the broadcast signal receiving apparatus may receive signaling information and a service including an audio/video (A/V) program using the broadcast interface. For example, the program may refer to content. That is, the A/V program may refer to A/V content.

For example, the signaling information may include media time information of a presented A/V program.

Then, the broadcast receiving apparatus may discover the companion screen device using a companion screen interface (CS3200). The broadcast receiving apparatus may transmit data and/or signaling information to the companion screen device or receive data and/or signaling information from the companion screen device using the companion screen interface.

Then, the broadcast receiving apparatus may operate the broadcast interface and the companion screen interface using a controller. The controller may include a time synchronization service processor.

Then, the broadcast receiving apparatus may generate service time information for providing data related to time synchronization between an A/V program based on signaling information and an A/V program displayed by the companion screen device using the controller and/or the time synchronization service processor (CS3300).

Then, the broadcast receiving apparatus may transmit the service time information to the companion screen device using the companion screen interface (CS3400).

The service time information according to an embodiment of the present invention may include at least one of serviceId attribute indicating a service ID, programId attribute indicating an ID of a program presented in a service, mediaTime element indicating media time information of a program, and/or currentTime element indicating wall-clock time.

The broadcast receiving apparatus according to an embodiment of the present invention may transmit service time information using a requesting method. The broadcast signal receiving apparatus may transmit service time information to the companion screen device based on a first request of making a request for acquisition of service time information received from the companion screen device using the companion screen interface.

The broadcast receiving apparatus according to an embodiment of the present invention may transmit service time information using an eventing method. The broadcast receiving apparatus may generate update interval information indicating an interval for transmitting the service time information using the time synchronization service processor. Then, the broadcast receiving apparatus may transmit the service time information to the companion screen device based on the update interval information using the companion screen interface.

The update interval information according to an embodiment of the present invention may be one of delivery duration information indicating duration for transmitting service time information and delivery frequency information indicating a frequency for transmitting service time information. For example, the interval may include duration and/or a frequency. The update interval information may include update duration information and/or update frequency information.

The broadcast receiving apparatus may make a request for acquisition of the update interval information. The broadcast receiving apparatus may receive a second request (or update interval information request) of making a request for acquisition of the update interval information from the companion screen device using the companion screen interface. Then, the broadcast receiving apparatus may generate current update interval information indicating a value of the update interval information at a time point indicated by wall-clock time based on the second request using the time synchronization service processor. Then, the broadcast receiving apparatus may transmit the current update interval information to the companion screen device using the companion screen interface.

For example, the update interval information request may include a delivery duration information request and/or the delivery frequency information request. The current update interval information may include current delivery duration information and/or current delivery frequency information.

The broadcast receiving apparatus may make a request for setup of the update interval information. The broadcast receiving apparatus may receive a third request (or update interval information setup request) of making a request of setup of the update interval information from the companion screen device using the companion screen interface. The third request may include the requested update interval information indicating a value of the update interval information requested by the companion screen device. Then, the broadcast receiving apparatus may generate confirmed update interval information indicating one of the same value as the requested update interval information and a closest value to the requested update interval information using the time synchronization service processor. Then, the broadcast receiving apparatus may transmit the service time information to the companion screen device based on the confirmed update interval request information using the companion screen interface.

For example, the update interval information setup request may include a delivery duration information setup request and/or a delivery frequency information setup request. The requested update interval information may include the requested delivery duration information and/or the requested delivery frequency information. The confirmed update interval information may include confirmed delivery duration information and/or confirmed delivery frequency information.

Figure 15:
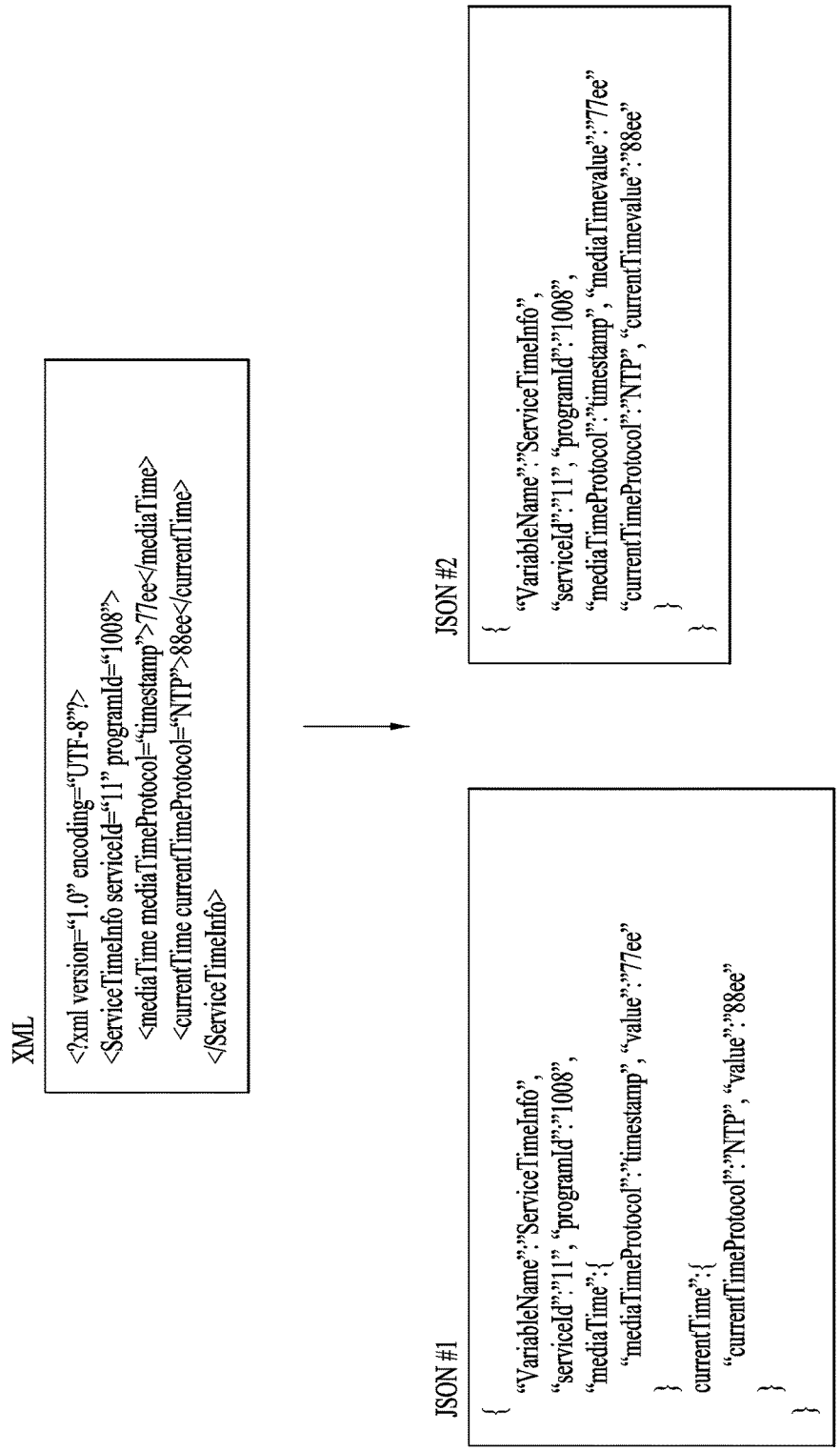
FIG. 15 illustrates service time information Service-TimeInfo in JSON format according to another embodiment of the present invention.

FIG. 15 illustrates service time information Service-TimeInfo in the JSON format according to another embodiment of the present invention.

As described above, the ServiceTimeInfo may be information providing data related to synchronization between services/content played in a TV receiver and a CD (Companion Device). The ServiceTimeInfo may have a format of the aforementioned ServiceTimeInfo state variable. The ServiceTimeInfo may be used to deliver information such as media time from the TV receiver to the CD.

Although the ServiceTimeInfo state variable may be written in XML as described above, it may also be written in JSON. The XML format shown in the figure may be an embodiment of the XML format of the aforementioned ServiceTimeInfo state variable. The ServiceTimeInfo state variable in the XML format may be represented in the JSON format as shown in the figure.

When the ServiceTimeInfo state variable is represented in JSON, the ServiceTimeInfo state variable may be represented as JSON #1 shown in the figure. The ServiceTimeInfo may include VariableName, serviceId, programId, mediaTime and/or currentTime information. The VariableName can indicate the name of the state variable in JSON format. Here, the VariableName can have a value of ServiceTimeInfo. The serviceId can indicate an ID of a service related to the state variable. In the shown embodiment, the serviceId may have a value of "11". This may be a channel number or a channel ID of the corresponding service. The programId can indicate an ID of a program related to the corresponding state variable. In the illustrated embodiment, programId may have a value of "1008". This may be an ID value of the corresponding program (content).

The mediaTime may include mediaTimeprotocol information and/or value information. The mediaTimeProtocol information can indicate a protocol used to represent media time, like the aforementioned @mediaTimeProtocol. Here, the mediaTime has a timestamp value. The mediaTime has a timestamp form. The value information can indicate a mediaTime value. In the present embodiment, mediaTime has a value of 77ee.

The currentTime information may include currentTimeProtocol information and/or value information. The currentTimeProtocol information can indicate a protocol used to represent the current time, like the aforementioned @currentTimeProtocol. Here, currentTime information has an NTP value which represents that the current time is represented in the form of NTP. The value information may have a value indicating the current time. In the present embodiment, the current time is 88ee.

When the ServiceTimeInfo state variable is represented in JSON format, the ServiceTimeInfo state variable may be represented as JSON #2 as shown in the figure. Information in JSON #2 has been described in the above-described JSON #1. However, in JSON #2, the mediaTime information and the currentTime information are omitted and thus there may be no hierarchic structure of information. The names of the value information of the mediaTime information and the currentTime information may be changed to mediaTiemvalue and currentTimevalue.

Internal information structures of state variables in JSON format or XML format may be configured/combined differently according to embodiments.

Figure 16:
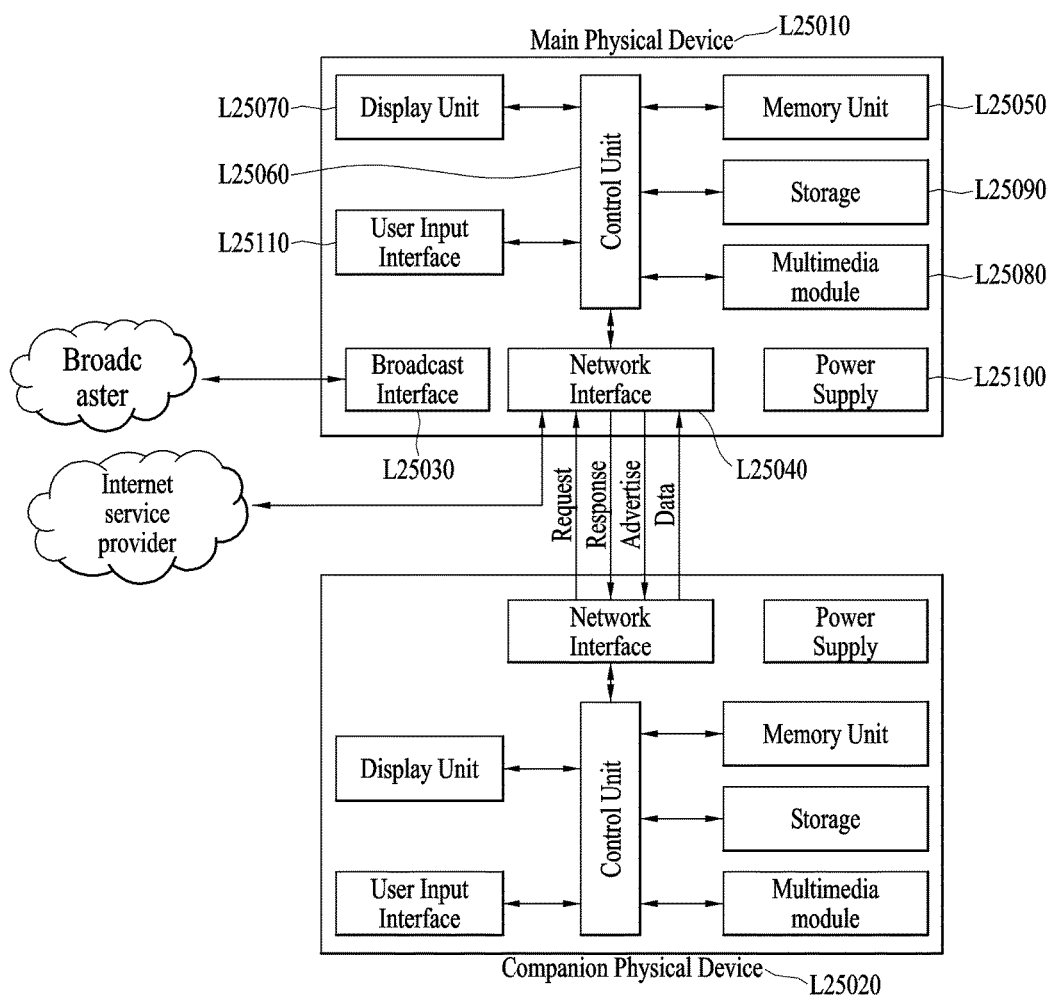
FIG. 16 is a block diagram illustrating a main physical device and a companion physical device according to an embodiment of the present invention.

FIG. 16 is a block diagram illustrating a main physical device and a companion physical device according to an embodiment of the present invention.

The embodiment of the present invention can provide a service guide in a terrestrial broadcast environment or a mobile broadcast environment. In addition, the embodiment of the present invention can provide a service guide regarding services available in the next generation hybrid broadcast environment based on interaction between a terrestrial broadcast network and the Internet.

The embodiment of the present invention can inform users of not only various services available in the next generation hybrid broadcast system, but also constituent content of the services and/or component elements of the services. As a result, the user can easily confirm, select, and view the corresponding service, resulting in increased user convenience.

The embodiment of the present invention may construct a single service, various constituent content of the service, and/or component elements of the service, and may make a cross reference to each other. As a result, the broadcast receiver can easily construct and provide the corresponding service, and can allow the user to easily recognize the corresponding service.

The embodiments of the present invention can extend the reference structure for linking one service to various content and/or component elements of the service, and can allow the broadcast receiver and/or the user to reduce the amount of resources and/or consumption time needed to search for content and/or component elements of the single service.

This figure is a block diagram illustrating a main physical device and a companion physical device according to an embodiment of the present invention.

The main physical device (L25010) according to an embodiment of the present invention is one of devices for interactive services, and may indicate a target device to be controlled by the companion physical device (L25020). The main physical device may be referred to as a main device, a main reception device, a main display, a main screen, or the like.

The main physical device (L25010) according to one embodiment of the present invention may include a broadcast interface (L25030), a network interface (L25040), a memory unit (L25050), a control unit (L25060), a display unit (L25070), a multimedia module (L25080), a storage unit (L25090), a power-supply unit (L25100), and/or a user input interface (L25110).

The broadcast interface (L25030) may indicate a physical device located between the broadcaster and the device, such that the broadcast interface (L25030) acting as the physical device can transmit various messages (such as the AV stream, service guide, and notification messages) and/or data. The broadcast interface (L25030) may receive broadcast signals, signaling information, data, etc. from the broadcaster.

The network interface (L25040) may indicate a physical device located between various devices (e.g., the main physical device and the companion physical device), such that the network interface (L25040) can transmit various messages (e.g., commands, requests, actions, response messages, etc.), and can perform advertising and/or data transmission. The network interface may receive broadcast services, broadcast content, signaling information, applications, data, etc. from the Internet service provider.

The memory unit (L25050) may be an optional or selective device implemented in various types of devices, and may indicate a volatile physical device capable of temporarily storing various types of data.

The control unit (L25060) may be configured to control the entire operation of the source device and/or the sink device, and may be implemented by software or hardware. In this case, the source device may indicate a device configured to transmit messages and/or data. The sink device may indicate a device configured to receive messages and/or data. Therefore, the main physical device and the companion physical device according to the embodiment of the present invention may correspond to the source device or the sink device.

The display unit (L25070) may display data received through the network interface or data stored in the storage unit on the screen. In this case, the display unit may be controlled by the control unit.

The multimedia module (L25080) may reproduce various types of multimedia. The multimedia module may be contained in the control unit, and may be located independently of the control unit.

The storage unit (L25090) may indicate a non-volatile physical device capable of storing various types of data therein. For example, the SC card may correspond to the storage unit.

The power-supply unit (L25100) may receive the external power-supply voltage and/or the internal power-supply voltage under control of the control unit, such that the power-supply unit (L25100) can provide a power-supply voltage needed to operate other constituent elements.

The user input interface (L25110) may indicate a device capable of receiving input signals or commands from the user.

The companion physical device (L25020) according to the embodiment of the present invention may be one of devices needed for interactive services, and may indicate a device configured to control the main device. Generally, the companion physical device may directly receive input signals from the user. The companion physical device may be referred to as a companion device, a second device, an additional device, an auxiliary device, a companion reception device, a companion receiver, a companion display, a second screen, or the like.

The physical device (L25020) according to the embodiment of the present invention may include a network interface, a memory unit, a control unit, a display unit, a multimedia module, a storage unit, a power-supply unit, and/or a user input interface.

From among all the constituent elements of the companion physical device according to the embodiment, some constituent elements having the same names as those of the main device may have the same functions as those of the constituent elements of the above-mentioned main device.

Figure 17:
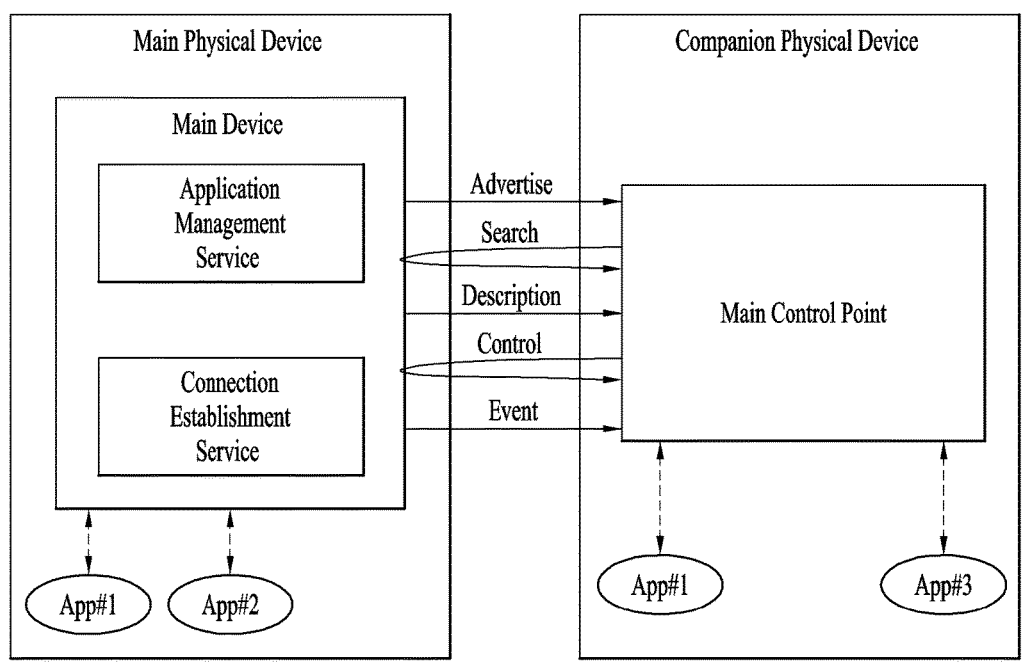
FIG. 17 illustrates a UPnP based PD-CD architecture according to an embodiment of the present invention.

FIG. 17 illustrates a UPnP based PD-CD architecture according to an embodiment of the present invention.

A main physical device may correspond to a TV receiver (broadcast reception apparatus, PD). A companion physical device may correspond to the aforementioned CD (companion device). The two devices are physical devices and may refer to a PD or a CD.

In the present embodiment, the main physical device may include a main device. Here, the main device may correspond to a controlled device defined in UPnP. Hereinafter, the main device will be called a controlled device for convenience of description.

In the present embodiment, the companion physical device may include a main control point. Here, the main control point may correspond to a control point defined in UPnP. The main control point may refer to a control point that communicates with a main controlled device.

The controlled device may be positioned in the TV receiver in the UPnP architecture and perform various operations. When the TV receiver joins a home network, the controlled device can multicast an advertisement message or deliver a UPnP service description provided by a PD to the control point. In addition, the controlled device may deliver a state variable to the control point in an eventing manner or deliver information to the control point when the control point requests a specific operation according to an action method. A PC such as the TV receiver may be called a controlled device.

The controlled device may provide an Application Management Service and/or a Connection Establishment Service. These services may be UPnP services provided by the controlled device. The application management service may refer to services related to management of applications executed in the controlled device and the control point. App-to-app communication or services for delivering specific information to an application may correspond to the application management service. In the illustrated embodiment, applications App#1 and App#2 in the PD may communicate with applications App#1 and App#3 in the CD according to the application management service.

The connection establishment service may be a service related to establishment and management of connection between the controlled device and the control point. A discovery process between the controlled device and the control point may conform to a discovery process defined in UPnP.

First, when a PD joins a home network, the PD can multicast a discovery message for advertising the PD. When a CD joins the home network later, the CD can multicast a search message for arbitrary PDs. A PD that has received the search message may unicast a response message to the CD. The advertising message and the search message may be exchanged irrespective of home network join time or order of the PD and the CD and may be periodically exchanged.

Upon reception of a response message to the advertising message or the search message of the PD, the CD may send an HTTP GET request message to request information about a UPnP service provided by the PD. The PD may deliver description information about services to the CD in response to the request. Then, the CD can subscribe to a service of the PD. The CD can obtain desired information using an action, transmit information or receive information in an eventing manner.

The main device and the main control point may be called a screen device and a screen control device according to an embodiment.

Figure 18:
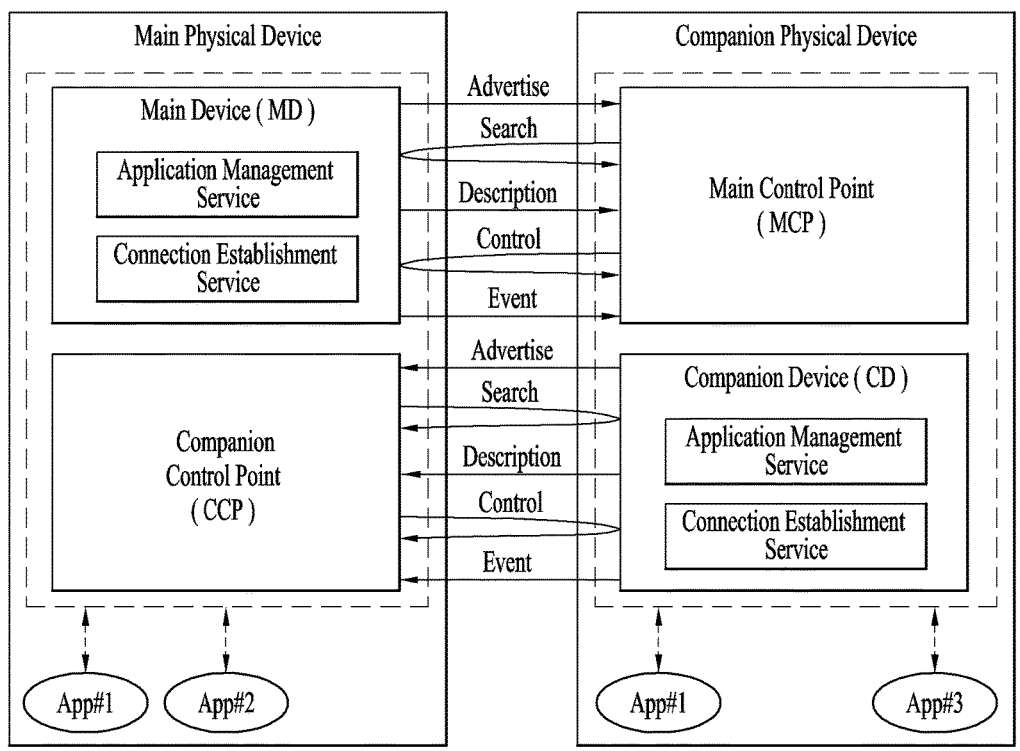
FIG. 18 illustrates a UPnP based PD-CD architecture according to another embodiment of the present invention.

FIG. 18 illustrates a UPnP based PD-CD architecture according to another embodiment of the present invention.

In the present embodiment, a main physical device PD may include a main controlled device and/or a companion control point. In addition, a companion physical device CD may include a main control point and/or a companion control device.

In general, operations and roles of a controlled device and a control point are asymmetrical in a UPnP architecture. That is, an operation that can be performed by the control device may not be performed by the control point.

To compensate for this, the companion physical device CD may include a companion controlled device in the same manner as the main physical device PD includes a main controlled device. The main physical device may have a companion control point corresponding to each controlled device and the companion physical device may have a main control point. The main controlled device may communicate with the main control point and the companion controlled device may communicate with the companion control point.

The companion controlled device and the companion control point may exchange a discovery message and perform operations such as events/actions. Accordingly, the CD may play a leading role in communication. However, the companion controlled device and the companion control point may have different operations, roles and rights from the main controlled device/control point. Specific operations or the scope of rights may be set by designer.

The companion controlled device and the companion control point may be called a screen (controlled) device and a screen control point according to an embodiment.

Figure 19:
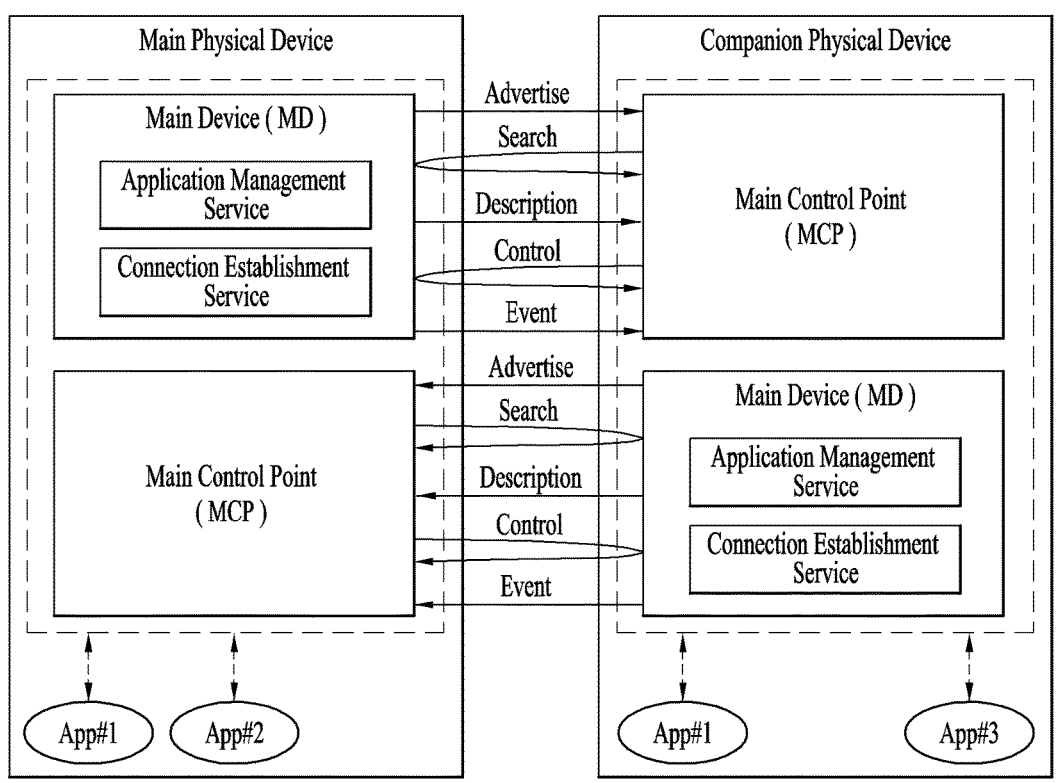
FIG. 19 illustrates a UPnP based PD-CD architecture according to another embodiment of the present invention.

FIG. 19 illustrates a UPnP based PD-CD architecture according to another embodiment of the present invention.

In the present embodiment, a main physical device PD may include a main controlled device and/or a main control point. In addition, a companion physical device CD may include a main control point and/or a main controlled device.

As described above, the PD and the CD may perform asymmetrical operations in a UPnP architecture. To solve this, an architecture in which the PD and the CD further includes a pair of a main control point and a main controlled device in addition to the main controlled device and the main control point, respectively, may be configured. In this case, both the PD and the CD can include the equivalent main controlled device/the control point, distinguished from the aforementioned embodiment in which the companion controlled device/control point perform different operations from the main controlled device/control point. Accordingly, an architecture can be configured in such a manner that the TV receiver and the companion physical device have equal communication rights.

Figure 20:
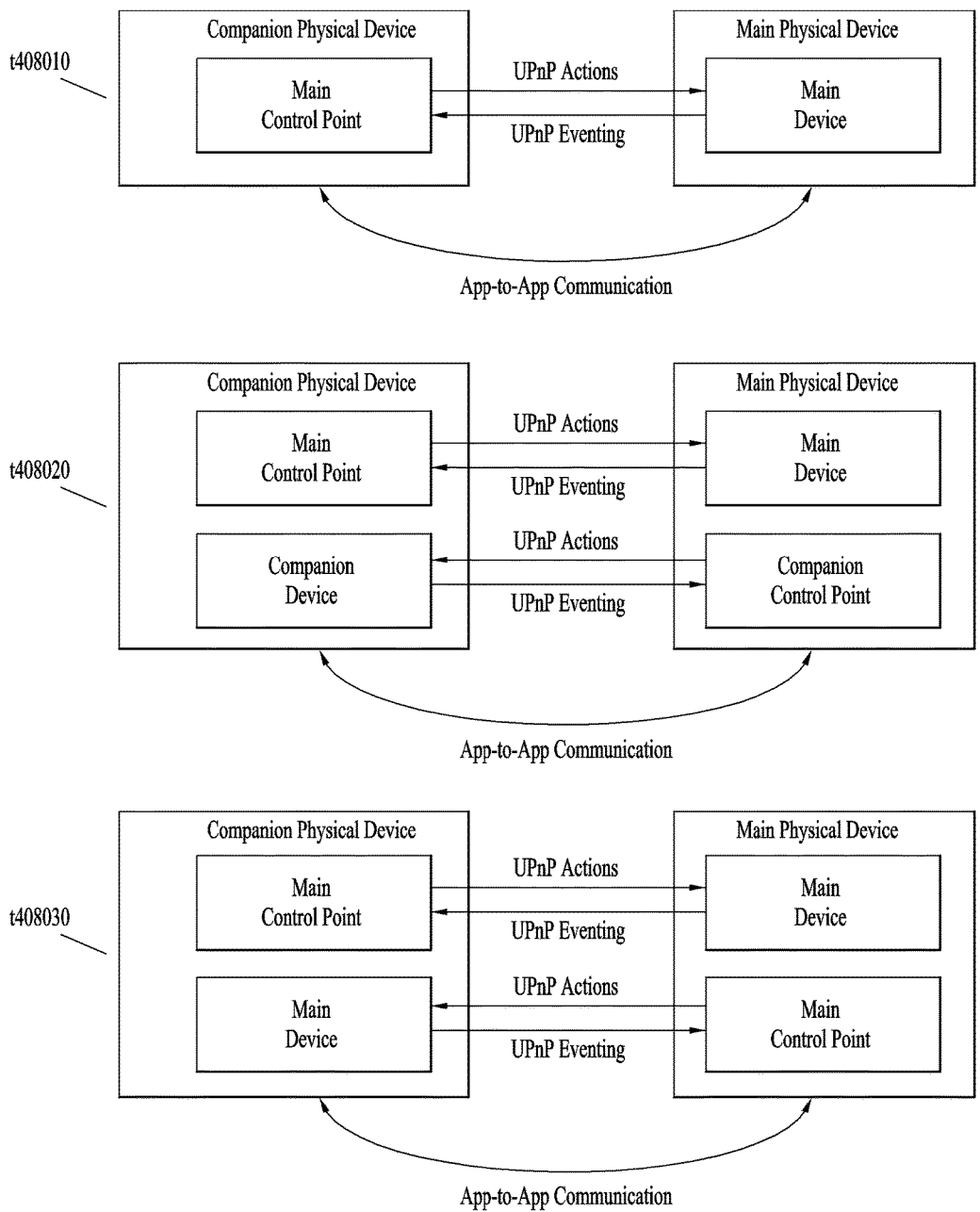
FIG. 20 illustrates interactions in a UPnP based PD-CD architecture according to an embodiment of the present invention.

FIG. 20 illustrates interactions in a UPnP based PD-CD architecture according to an embodiment of the present invention.

FIG. 20 sequentially illustrates embodiments of the aforementioned UPnP based PD-CD architectures. The first embodiment t408010 may be an embodiment in which the aforementioned PD includes a controlled device and the CD includes a control point. The second embodiment t408020 may be an embodiment in which the aforementioned PD includes a main controlled device and a companion control point and the CD includes a main control point and a companion controlled device. The third embodiment t408030 may be an embodiment in which the aforementioned PD includes a main controlled device and a main control point and the CD includes a main control point and a main controlled device.

In the first embodiment t408010, the controlled device can deliver information such as a state variable to the control point through UPnP eventing. Simultaneously, the control point can request information or a specific operation from the controlled device through a UPnP action. This may be the most fundamental architecture.

In the second embodiment t408020, the main controlled device can communicate with the main control point and the companion controlled device can communicate with the companion control point. The main controlled device can deliver information such as a state variable to the main control point through UPnP eventing. Simultaneously, the main control point can request information or a specific operation from the main controlled device through a UPnP action. In addition, the companion controlled device can deliver information such as a state variable to the companion control point through UPnP eventing. Simultaneously, the companion control point can request information or a specific operation from the companion controlled device through a UPnP action. As described above, the companion controlled device and the companion control point may have different operations, roles and rights from the main controlled device/control point.

In the third embodiment t408030, the main controlled devices of the PD and the CD can communicate with main control points corresponding thereto. The main controlled devices can deliver information such as a state variable to the main control points through UPnP eventing. Simultaneously, the main control points can request information or a specific operation from the main controlled devices through a UPnP action. Through this operation, application communication can be performed between each other.

Figure 21:
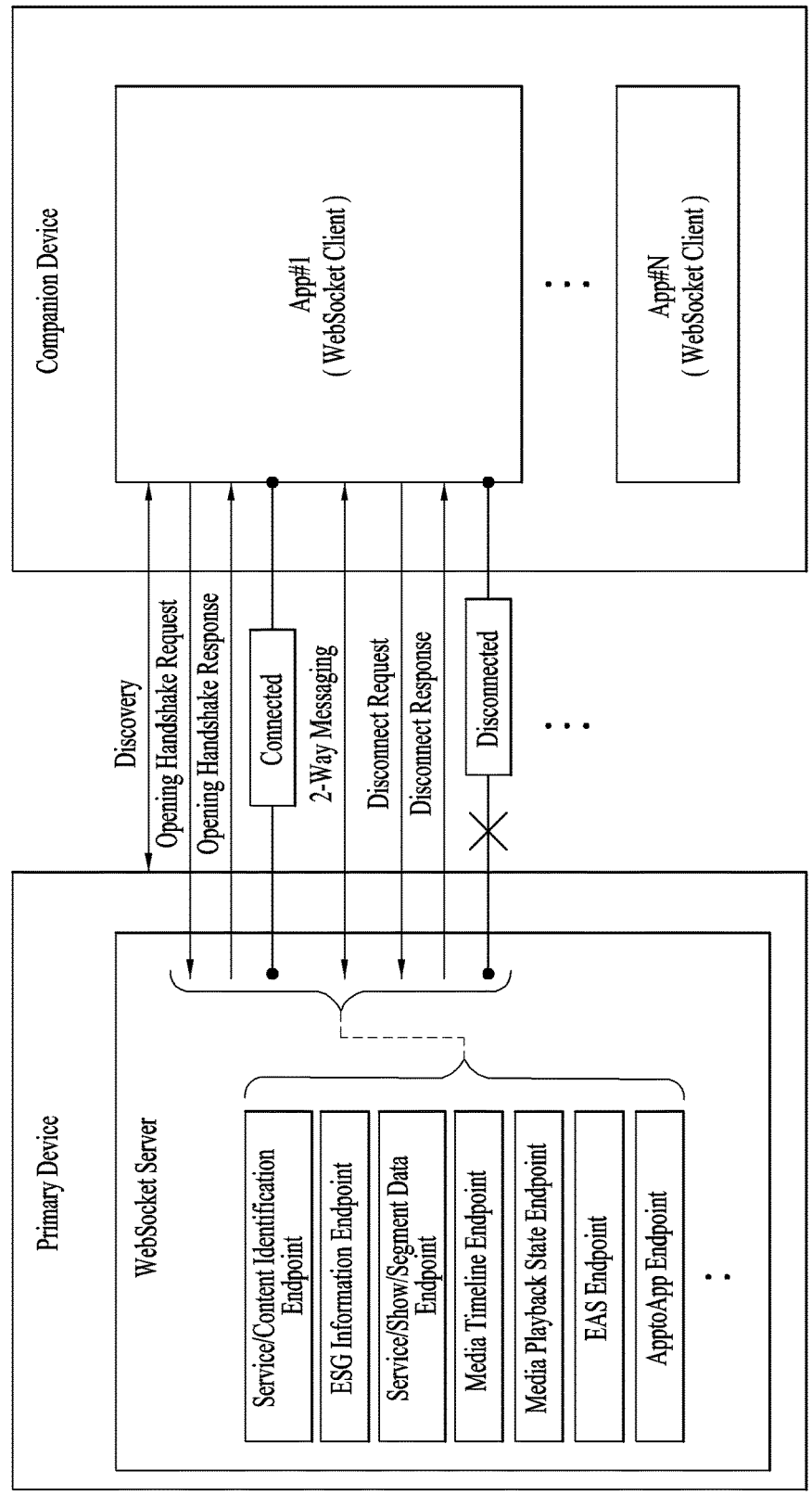
FIG. 21 illustrates a Websocket based PD-CD architecture according to an embodiment of the present invention.

FIG. 21 illustrates a Websocket based PD-CD architecture according to an embodiment of the present invention.

In the Websocket based architecture, communication can be performed between a PD and an application executed in a CD. In the Websocket based architecture, the PD may include a Websocket server and the CD may include applications. Here, applications of the CD may be called Websocket clients.

The Websocket server in the PD may have endpoints with respect to operations/functions provided by the PD. The endpoints may be connected to applications of the CD to deliver an ESG or media timeline and perform communication between an application of the PD and an application of the CD.

First, a discovery process may be performed between the PD and an application executed in the CD. The discovery process will be described below. In this process, information about the endpoints of the Websocket server may be delivered to the application of the CD.

For each endpoint, the application of the CD and the Websocket server can perform a handshake process. When the application of the CD requests handshake opening, the Websocket server can send a response to the request. Accordingly, the Websocket server and the application of the CD can be connected through an endpoint.

In the Websocket architecture, when the Websocket server and the application of the CD are connected through the endpoint, information can be transmitted through the endpoint. Messages can be freely relayed between applications of the PD and the CD.

When disconnection is required, the application of the CD can request disconnection for the endpoint (Disconnect Request). The Websocket server sends a response to the request (Disconnect Response) and connection with the endpoint can be terminated. Disconnection may be performed by the PD first and may be automatically performed in various situations.

The aforementioned process may be a process of interacting with a single Websocket endpoint. When there are multiple endpoints, the aforementioned process can be equally performed for the endpoints to activate desired endpoints. This process may be performed for multiple endpoints simultaneously or sequentially.

In the present embodiment, the Websocket server may have endpoints for provided functions, respectively. That is, a single endpoint can be provided to a single function.

Such endpoints may include a service/content identification endpoint, an ESG information endpoint, a service/show/segment data endpoint, a media timeline endpoint, a media playback state endpoint, an EAS endpoint and/or an app-to-app endpoint.

The service/content identification endpoint may execute a function of delivering information for identifying a service/content that is being played or will be played in a PD. An application of a CD can receive the information through this endpoint.

The ESG information endpoint may be used for a CD to receive an ESG. An application of the CD can receive the ESG through this endpoint. The service/show/segment data endpoint may receive various types of data about services.

The media timeline endpoint may deliver the current time and media time information of a currently played service/content. The aforementioned service time information may be delivered through this endpoint. The media playback state endpoint may deliver information related to presentation of a currently played service/content. The information related to presentation may refer to information indicating whether a currently played service/content is played at normal speed, fast-forwarded at 3× or reversed. The aforementioned playback state information may be delivered to an application of the CD through this endpoint.

The EAS endpoint may deliver EAS information to the CD. When the EAS information is delivered to a TV receiver, it is possible to signal a dangerous situation more efficiently by delivering the EAS information to the CD. The app-to-app end point may be an endpoint for communication between an application executed in a PD and an application executed in a CD. The application of the PD and the application of the CD can exchange information by transmitting/receiving messages using this endpoint.

Since each endpoint is provided for each function, an application of the CD can access an endpoint to perform a connection process and obtain desired information to communicate with an application of the PD through the endpoint.

Hereinafter, this architecture may be referred to as Websocket based architecture embodiment #1 for convenience of description. This embodiment can be combined with various embodiments based on UPnP and HTTP as well as other Websocket based architectures.

Figure 22:
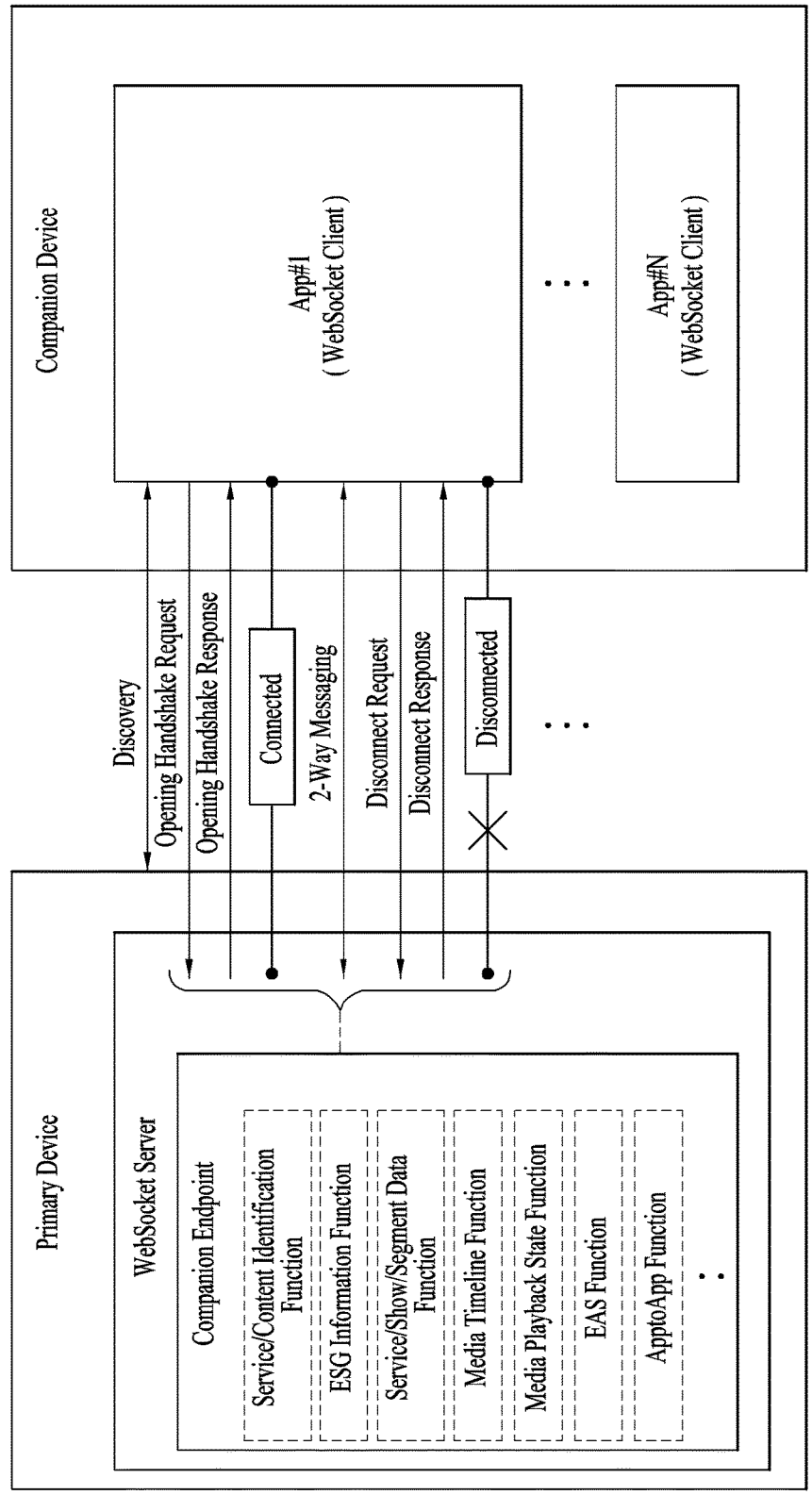
FIG. 22 illustrates a Websocket based PD-CD architecture according to another embodiment of the present invention.

FIG. 22 illustrates a Websocket based PD-CD architecture according to another embodiment of the present invention.

In the present embodiment, an endpoint may not be provided to each function. In the present embodiment, a Websocket server of a PD provides a single endpoint which can execute all the aforementioned functions. This endpoint may be called a companion endpoint. Other components of the Websocket architecture may be the same as the aforementioned embodiment.

The aforementioned endpoint may execute all functions executed by multiple endpoints in the aforementioned embodiment. That is, this endpoint can execute the functions executed by the aforementioned service/content identification endpoint, the ESG information endpoint, the service/show/segment data endpoint, etc. Accordingly, an application of the CD can perform operations such as receiving an ESG, receiving media time information and communicating with an application of the PD only by connecting to the endpoint. In this case, however, a function for which a message is exchanged between the application of the CD and the Websocket server needs to be identified. Accordingly, the message may include more specific information or may be extended.

Since the companion endpoint executes all functions, all the functions can be executed when connection to the endpoint is established. A process of connecting to the endpoint may be the same as the aforementioned process of connecting to a normal endpoint. In this case, connection to the endpoint cannot be partially terminated even when a certain function need not be accessed because there is a single endpoint. On the contrary, even when only one function is required, connection to the companion endpoint must be established.

Hereinafter, this architecture may be referred to as Websocket based architecture embodiment #2 for convenience of description. This embodiment can be combined with various embodiments based on UPnP and HTTP as well as other Websocket based architectures.

Figure 23:
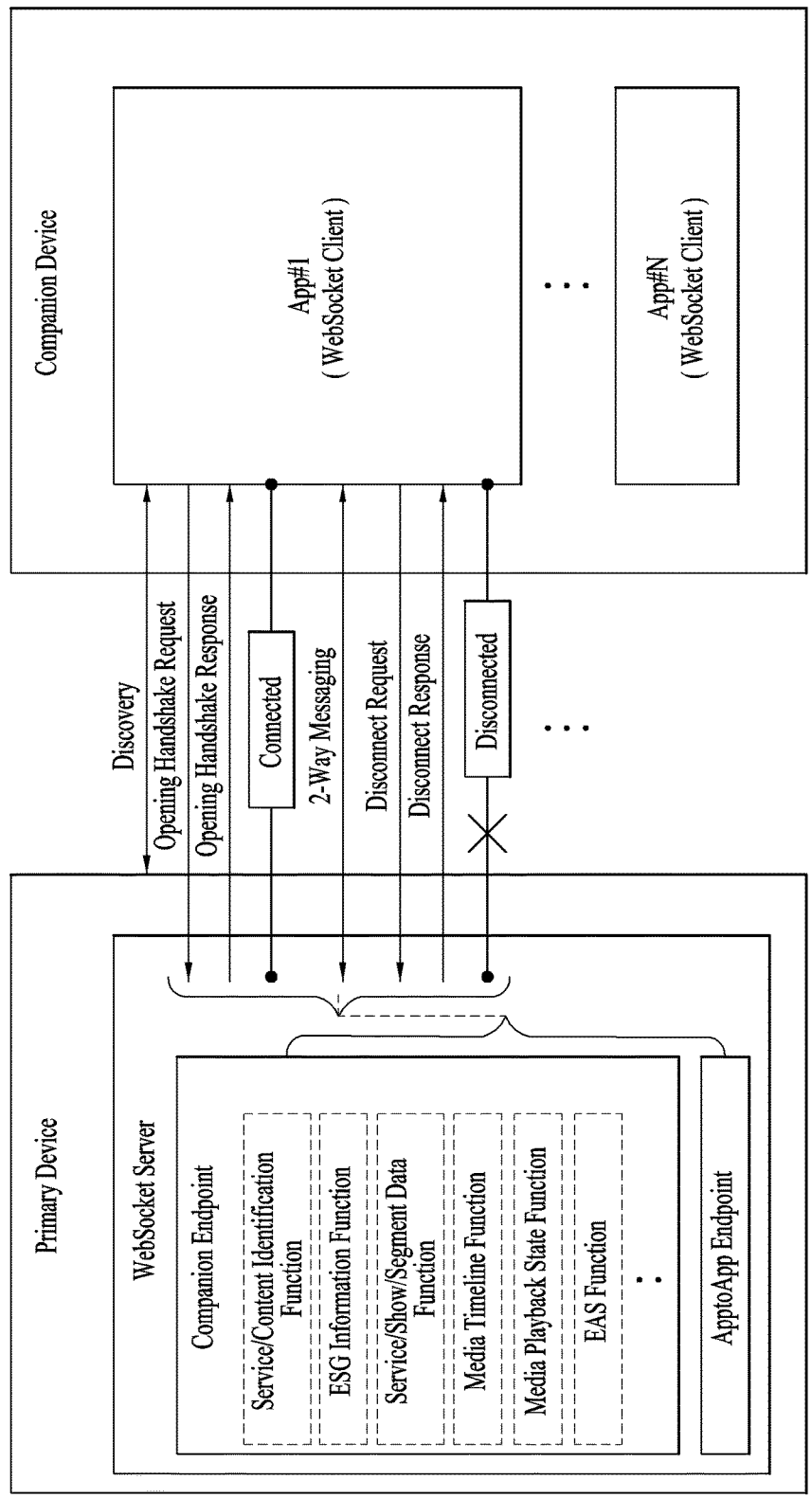
FIG. 23 illustrates a Websocket based PD-CD architecture according to another embodiment of the present invention.

FIG. 23 illustrates a Websocket based PD-CD architecture according to another embodiment of the present invention.

In the present embodiment, n endpoints are provided and can execute m functions. Here, n may be equal to or less than m, and n and m may be integers. That is, a plurality of (n) endpoints each of which can execute one or more functions can be provided.

In the illustrated embodiment, an endpoint that executes a service/content identification function, an ESG delivery function and the like may be provided as a companion endpoint and an endpoint that executes an app-to-app function may be provided as a separate "app-to-app endpoint".

The architecture of the present embodiment may be regarded as a combination of the aforementioned Websocket based architectures #1 and #2. Various architectures can be configured depending on values of n and m. Various numbers of endpoints may be provided and each endpoint may provide various numbers of functions.

The above-described connection to and disconnection from endpoints may need to be performed for each endpoint. That is, the process may need to be performed n times for n endpoints.

Hereinafter, this architecture may be referred to as Websocket based architecture embodiment #3 for convenience of description. This embodiment can be combined with various embodiments based on UPnP and HTTP as well as other Websocket based architectures.

Figure 24:
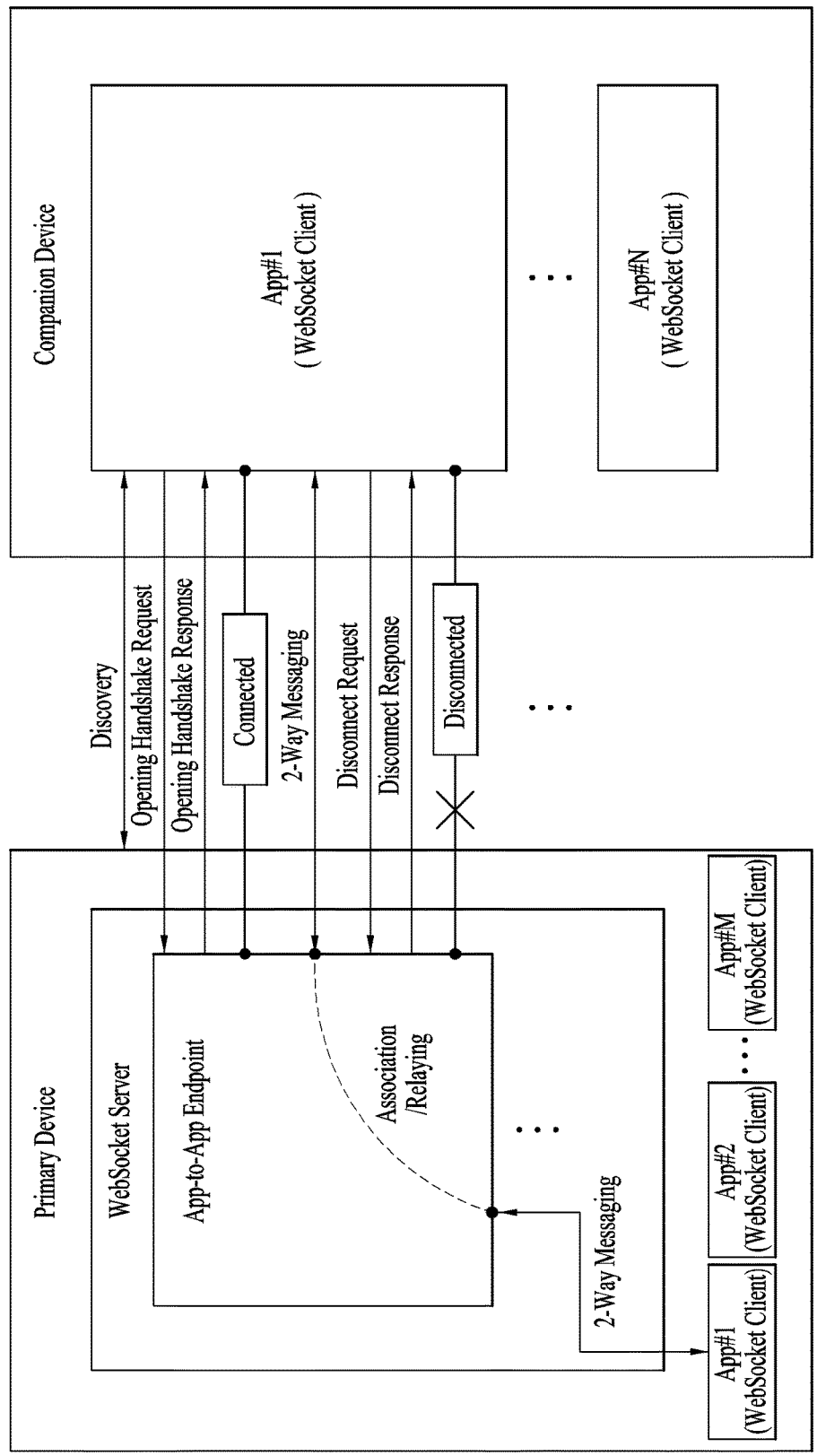
FIG. 24 illustrates app-to-app communication in a Websocket based PD-CD architecture according to an embodiment of the present invention.

FIG. 24 illustrates app-to-app communication in a Websocket based PD-CD architecture according to an embodiment of the present invention.

App-to-app communication may be performed between an application executed in the PD and an application executed in the CD. In a Websocket based architecture, applications can communicate through a Websocket server. Here, the aforementioned app-to-app endpoint can be used. Alternatively, an endpoint executing the app-to-app communication function and other functions may be used according to an embodiment.

The application of the CD can connect to the app-to-app communication endpoint of the Websocket server through the aforementioned process. Applications executed in the PD correspond to Websocket clients, and the application of the PD can connect to the app-to-app communication endpoint of the Websocket server. The Websocket server can connect matching connection requests from among received connection requests to enable message exchange.

When the applications of the PD and the CD are connected, the applications can exchange messages through the Websocket server. The messages can be delivered bidirectionally. The Websocket server can relay a message sent from one application to the other application.

Figure 25:
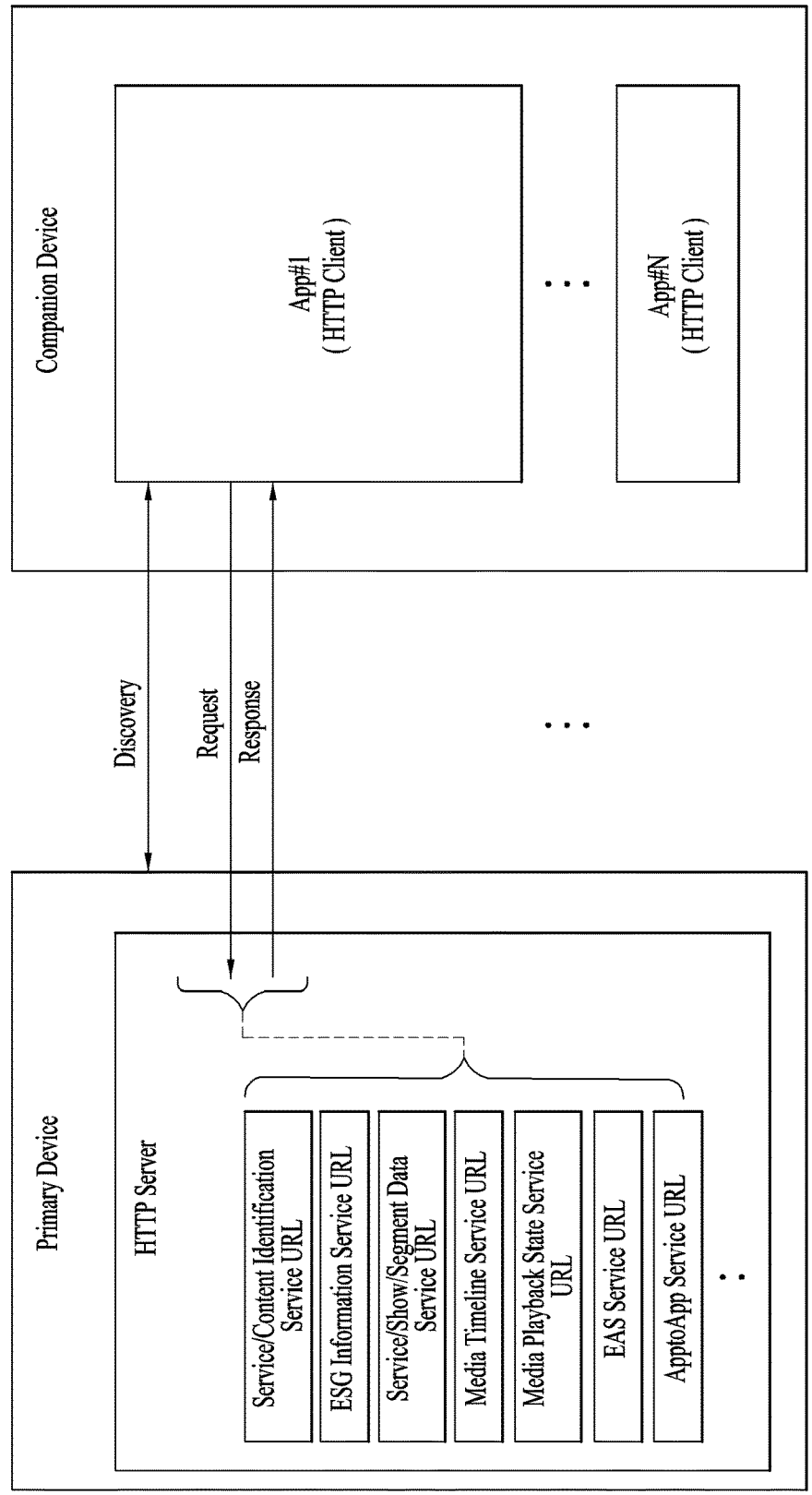
FIG. 25 illustrates an HTTP based PD-CD architecture according to an embodiment of the present invention.

FIG. 25 illustrates an HTTP based PD-CD architecture according to an embodiment of the present invention.

In the HTTP based architecture, communication can be performed between a PD and an application executed in a CD. In the HTTP based architecture, the PD may include an HTTP server and the CD may include applications. Here, applications of the CD may be called HTTP clients.

The HTTP server included in the PD may be a server for performing various operations/functions. To access each function of the server, a service URL for a corresponding service may be needed. An application of the CD may send a request to the corresponding service URL to receive desired information.

First, a discovery process may be performed between the PD and the application executed in the CD. In this process, information about URLs of the HTTP server may be delivered to the application of the CD. HTTP clients of the CD may access desired URLs using the delivered URL information to receive desired information.

In the present embodiment, the HTTP server may have different URLs for functions. That is, a single URL can be provided for a single function.

Services provided through such service URLs may be similar to functions provided by the aforementioned Websocket server. For example, when the application of the CD accesses a service/content identification service URL, the application can receive information for identifying a service/content that is being played or will be played in the PD. That is, the application of the CD can send a request for service/content identification information to the service/content identification service URL and the HTTP server of the PD can deliver the requested information to the application of the CD. An ESG information service, a media timeline service and the like corresponding to the functions provided by the aforementioned ESG information endpoint, media timeline endpoint and the like can be defined. The application of the CD can receive desired information by sending a request to each service URL.

Since service URLs are respectively provided to services, the application of the CD needs to know information about each URL and to access a desired URL to obtain desired information or communicate with an application of the PD.

Hereinafter, this architecture may be referred to as HTTP based architecture embodiment #1 for convenience of description. This embodiment can be combined with various embodiments based on UPnP and HTTP as well as other HTTP based architectures.

Figure 26:
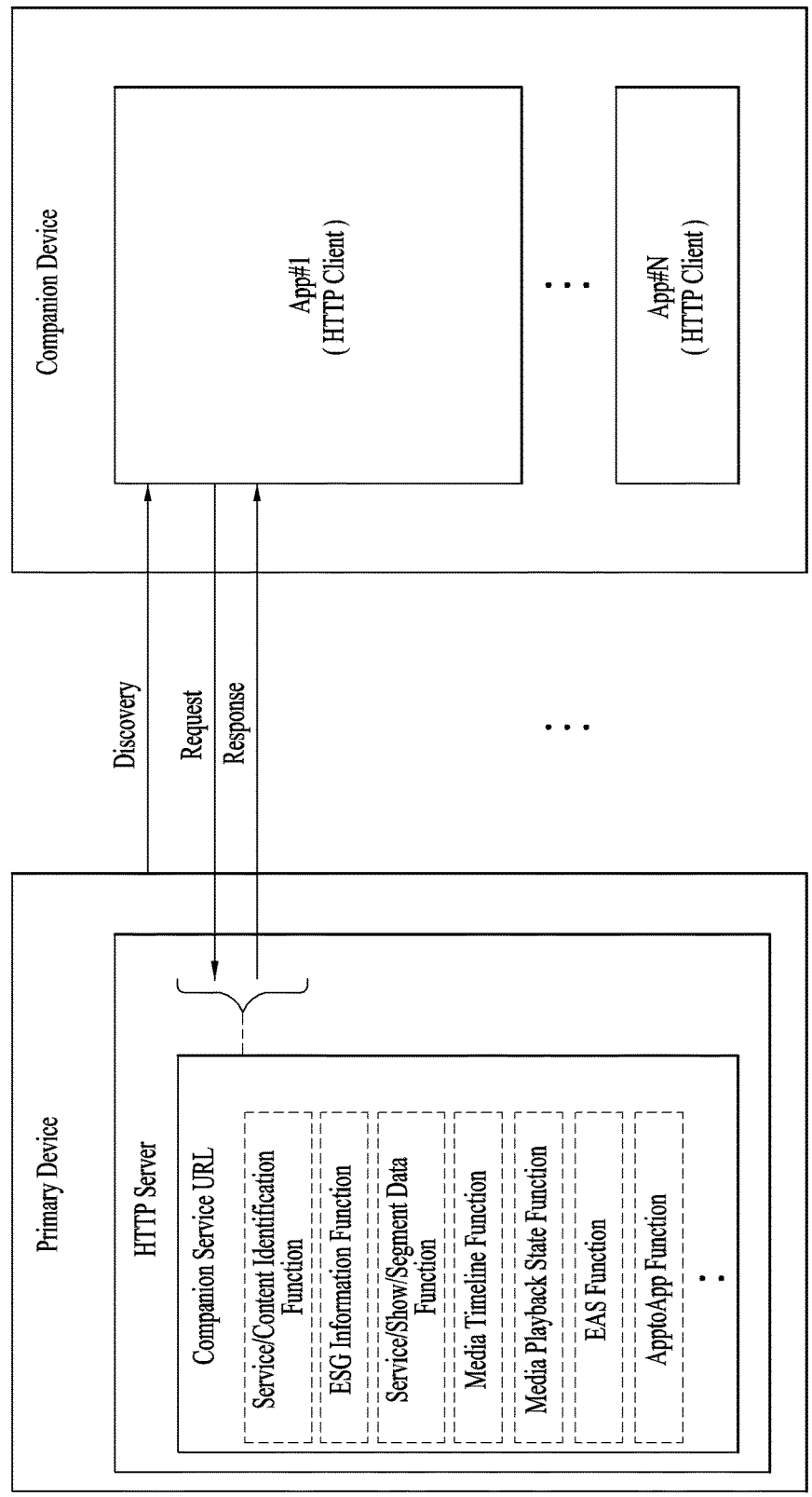
FIG. 26 illustrates an HTTP based PD-CD architecture according to another embodiment of the present invention.

FIG. 26 illustrates an HTTP based PD-CD architecture according to another embodiment of the present invention.

In the present embodiment, service URLs may not be provided to respective services. In the present embodiment, an HTTP server of a PD provides a single service URL through which all the aforementioned functions can be executed. This service URL may be called a companion service URL. Other components of the HTTP architecture may be the same as the aforementioned embodiment.

The single service URL may be a service URL through which all functions executed through multiple service URLs in the aforementioned embodiment can be executed. That is, this service URL can execute the functions executed by the aforementioned service/content identification service URL, ESG information service URL, the service/show/segment data service URL, etc. Accordingly, an application of the CD can receive an ESG or media time information only by sending a request to the service URL.

In this case, when a request is sent to the HTTP server, the request message may be extended in such a manner that a new variable is attached to the query term. This is because it is necessary to identify information that the application of the CD wants to receive by sending a request to the companion service URL. The HTTP server can analyze the request and deliver the information that the application of the CD desires.

Hereinafter, this architecture may be referred to as HTTP based architecture embodiment #2 for convenience of description. This embodiment can be combined with various embodiments based on UPnP and HTTP as well as other HTTP based architectures.

Figure 27:
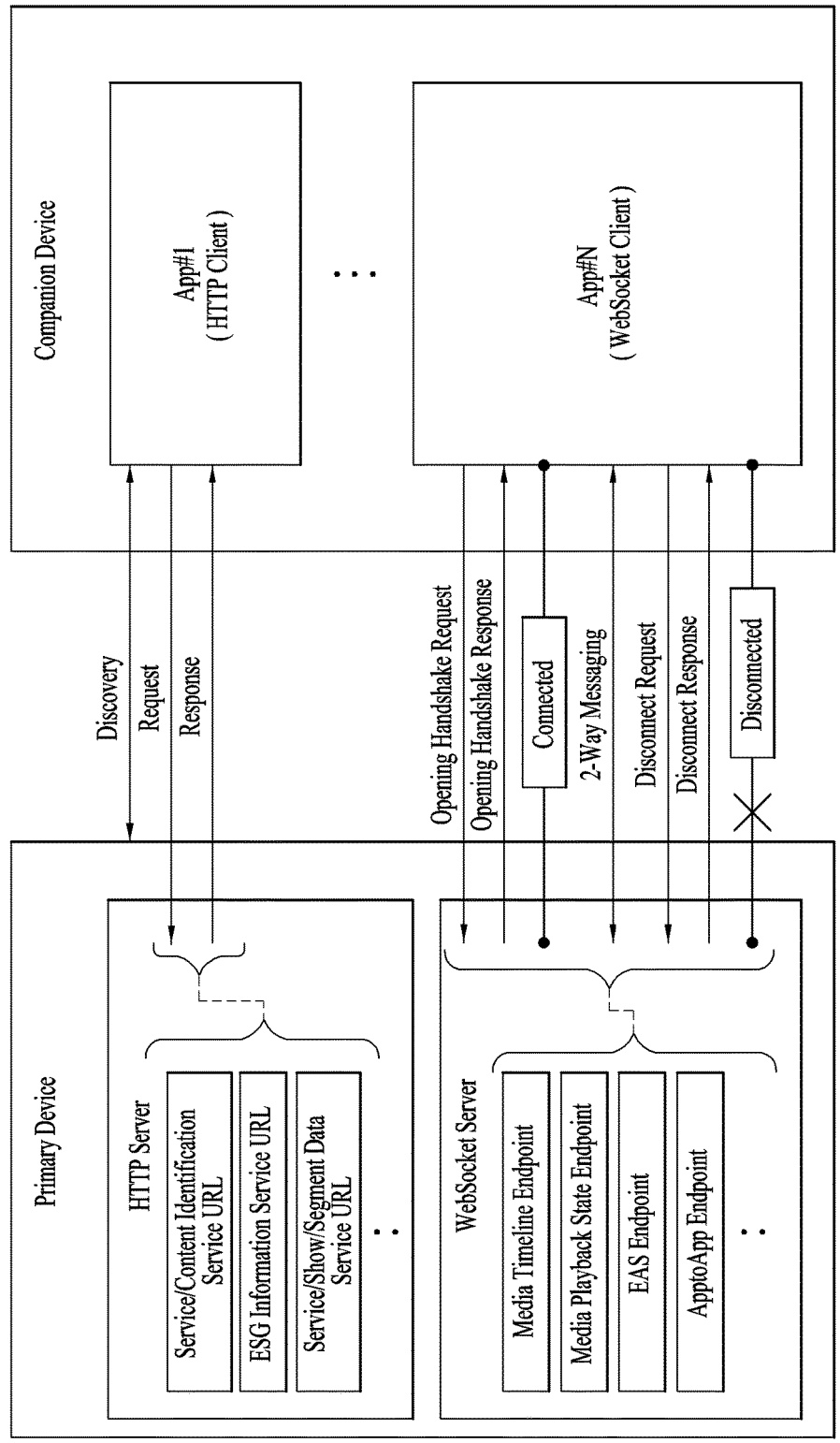
FIG. 27 illustrates a Websocket & HTTP based PD-CD architecture according to an embodiment of the present invention.

FIG. 27 illustrates a Websocket & HTTP based PD-CD architecture according to an embodiment of the present invention.

The aforementioned UPnP based architectures, Websocket based architectures and HTTP based architectures may be combined. For example, a PD may simultaneously have an HTTP server and a Websocket server. According to an embodiment, the PD may have the HTTP server and the Websocket server and serve as a controlled device in a UPnP architecture.

In addition, a combined UPnP architecture may be one of the aforementioned first, second and third UPnP architecture embodiments #1, #2 and #3. A combined Websocket architecture may be one of the aforementioned first, second and third Websocket architecture embodiments #1, #2 and #3, and a combined HTTP architecture may be one of the aforementioned first, second and third HTTP architecture embodiments #1 and #2.

In the present embodiment, the PD simultaneously has the HTTP server and the Websocket server, HTTP based architecture #2 can be used as an HTTP architecture, and Websocket based architecture #3 can be used as a Websocket architecture. That is, in the HTTP server, a single service URL address can execute a plurality of functions. The Websocket server provides n endpoints that can execute a plurality of functions. Specifically, two endpoints are provided, one endpoint serves as an endpoint for app-to-app communication, and the other endpoint serves as an endpoint executing all other functions in the present embodiment.

Although only the above-described embodiments are described herein, the technical scope of the present invention includes all other combinations as embodiments. Various architectures can be designed according to such combinations and selected and used according to designer.

In the architecture as in the present embodiment, functions may be divided and executed by the HTTP server and the Websocket server. That is, the HTTP server may be used to execute specific functions and a single HTTP service URL may be used to receive requests for executing the functions. In addition, the Websocket server may provide endpoints for executing other functions.

Such function division may be performed depending on characteristics of corresponding functions. The HTTP may be used for asynchronous communication whereas the Websocket may be used for synchronous communication.

According to an embodiment, the ESG information delivery function, the service/show/segment data delivery function and the like may be performed by the HTTP server. That is, information such as an ESG or service data can be acquired by sending a request to a service URL of the HTTP server.

In addition, the service/content identification function, the media playback state function, the app-to-app communication function and the like may be performed by the Websocket. The Websocket server may provide the companion endpoint for executing the media playback state function and the app-to-app endpoint for executing the app-to-app communication function.

According to an embodiment, the media timeline function may be executed by the HTTP and/or Websocket. The media timeline function may be provided by both the HTTP and the Websocket or provided by one of the HTTP and the Websocket. The EAS information delivery function may be executed by the Websocket or a multicast sender in the PD. When the multicast sender is used, the multicast sender in the PD can multicast EAS information to devices in a multicast group.

FIG. 28 illustrates formats of messages used for discovery of a PD (Primary Device) according to an embodiment of the present invention.

The PD can be discovered by a CD or an application executed in the CD. In this process, an SSDP (Simple Service Discovery Protocol) may be used. The PD may have an ST (Search Target) value for identifying a technical standard to which the PD conforms. For example, the PD can use urn:atsc:device:atsccompanion:3 or urn:atsc:service:atsccompanion:3 as a device type or service type thereof. These values can be used in a discovery process through ST matching.

For a discovery process, the PD may advertise itself to CDs. Alternatively, a CD may discover the PD through search.

First, when the PD advertises itself to CDs, the PD can multicast a discovery message. This discovery message may be transmitted through a NOTIFY method. The discovery message for advertising of the PD may be as illustrated in embodiment t413010.

When a CD discovers the PD through search, the CD or an application executed in the CD can multicast a discovery message. This discovery message may be transmitted through an M-SEARCH method. The discovery message for searching of the CD may be as illustrated in embodiment t413020.

The application of the CD can discover PDs conforming to a specific technical standard using the ST value. The PD can receive the aforementioned search message. When the ST value of the PD matches the ST value of the message, the PD can send a response to the application of the CD which has sent the message (200 OK). This response message may be as illustrated embodiment t413030.

The illustrated message formats are merely embodiments of the present invention and parameters included in the messages may have different values according to embodiments.

The discovery process described herein can be applied to HTTP architectures as well as Websocket architectures.

Figure 29:
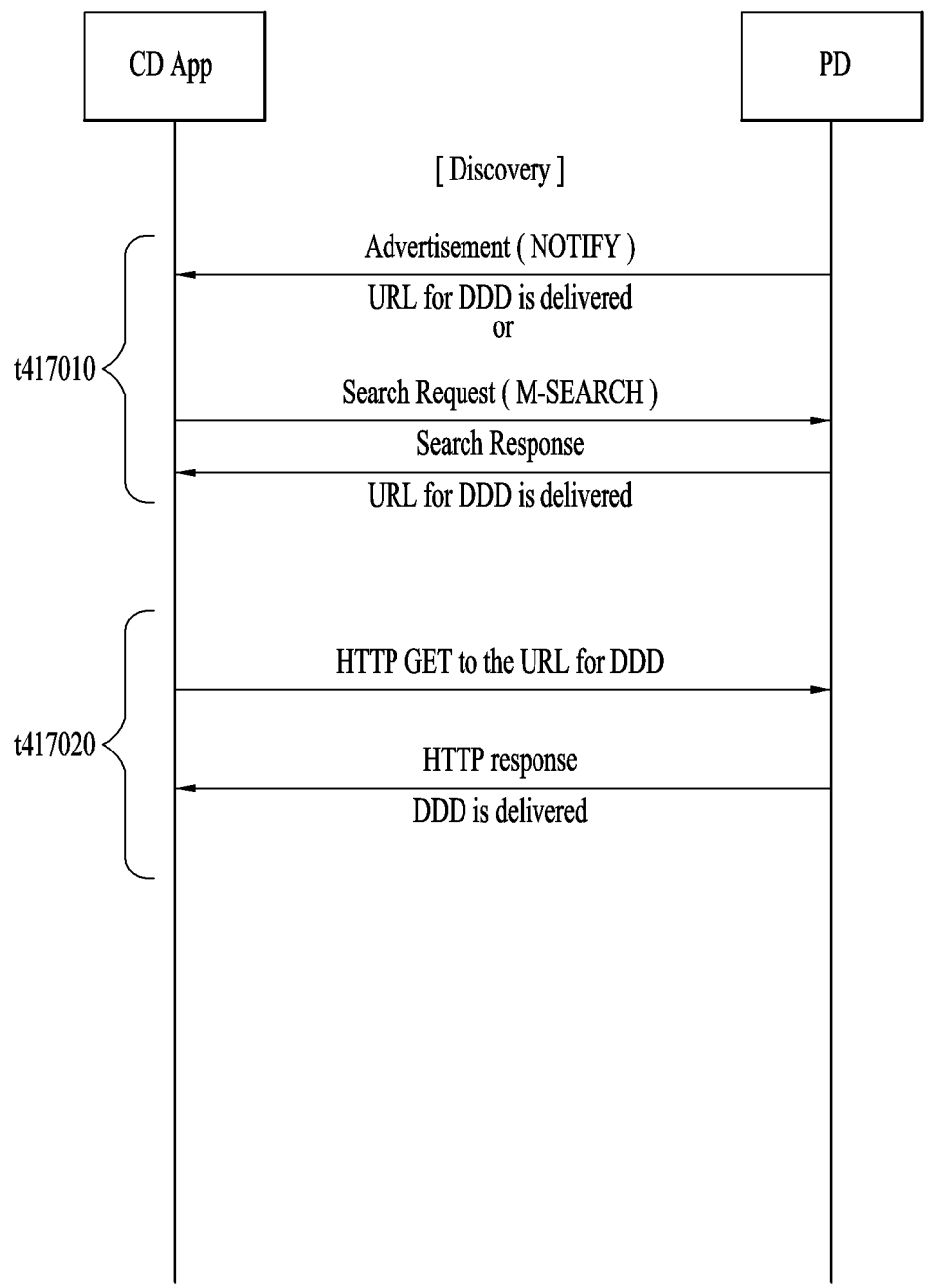
FIG. 29 illustrates a process for discovering a Websocket endpoint or an HTTP service URL using a DDD (Device Description Document) according to an embodiment of the present invention.

FIG. 29 illustrates a process for discovering a Websocket endpoint or an HTTP service URL using a DDD (Device Description Document) according to an embodiment of the present invention.

As described above, a PD may multicast a discovery message for advertising the PD or transmit a response message to a received M-SEARCH message to a CD. An application of the CD may obtain a URL from a LOCATION header of the multicast discovery message or the response message to the M-SEARCH message. The URL may be a URL through which a DDD (Device Description Document) can be acquired. The application of the CD may acquire the DDD using the URL to obtain device description information.

Specifically, the PD may multicast a discovery message for advertising the PD through the NOTIFY method as described above. In this process, URL information for acquiring a DDD may be delivered to the application executed in the CD. Alternatively, when the application of the CD multicasts a discovery method for searching using the M-SEARCH method, the PD may send a response message thereto to the CD. In this process, the URL information for acquiring the DDD may also be delivered to the application executed in the CD (t417010).

Then, the application of the CD may send a request for the DDD to the acquired URL using HTTP GET. The PD may deliver the DDD to the application of the CD using a response message (t417020). The body of the response message may include the DDD.

Addresses of Websocket endpoints may be provided to the application of the CD through the DDD. According to an embodiment, addresses of service URLs of an HTTP architecture may be provided to the application of the CD through the DDD. When an architecture in which two or more protocols are combined is used, addresses of Websocket endpoints and/or addresses of service URLs of the HTTP may be provided to the application.

FIG. 30 illustrates a DDD request message and a DDD format in a process for discovering a Websocket endpoint or an HTTP service URL using a DDD according to an embodiment of the present invention.

As described above, an application of a CD may request a DDD using HTTP GET. Here, the GET message may have a format as illustrated in embodiment t418010. A DDD request message using GET may be transmitted to a URL of a DDD acquired from a PD. In addition, host information of an IP address/port of the description may be used. Furthermore, a language preferred by a control point may be used.

As described above, a response message to the DDD request message may be returned. The body of the response message may include the DDD. The DDD may have a format as illustrated in embodiment t418020.

The DDD may include specification version information, base URL information, device related information, etc. The specification version information specVersion can indicate version information of a corresponding DDD specification as a major version/minor version. The base URL information can include base URL information that can be used for all related URLs delivered by the DDD.

The device related information can include type information of a device described by the DDD, short device name information readable by a user (friendlyName), manufacture information of a corresponding device, service list information, etc.

The service list information can include service type information indicating the type of each service provided by the corresponding device, service ID information indicating the ID of the service, service description URL information indicating a URL related to service description, control URL information used for control of the corresponding service and/or URL information used for eventing of the corresponding service.

The illustrated formats are merely embodiments of the present invention and structures thereof, elements included therein and values of the elements may be varied according to embodiments.

FIG. 31 illustrates DDD formats in a process for discovering a Websocket endpoint or an HTTP service URL using a DDD according to an embodiment of the present invention.

As described above, addresses of Websocket endpoints or addresses of HTTP service URLs may be delivered to an application of a CD through DDD delivery. The application of the CD may connect to a Websocket endpoint or send a request to a service URL using the addresses.

In the aforementioned Websocket based architecture embodiment #1, the DDD format according to the illustrated embodiment t419010 or the DDD format according to the embodiment t419020 may be used.

In the illustrated embodiment t419010, device information of the DDD may include address information of various Websocket endpoints in addition to the device type information. As shown, address information about endpoints such as the service/content identification endpoint and the ESG information endpoint is included in the device information of the DDD. Since the DDD format is used in Websocket based architecture embodiment #1, the pieces of address information about the endpoints may be arranged. The DDD format according to illustrated embodiment t419020 may also include address information about various Websocket endpoints. In this case, the address information about the endpoints may be included in the service information of the DDD.

While the address information is positioned below the device information and the service information in the present embodiment, the address information may be arranged at other positions in the DDD. In the illustrated embodiment, other elements of the aforementioned DDD are omitted. Other elements may be configured according to various embodiments.

The DDD formats according to the illustrated embodiments t419010 and t419020 may be used in the aforementioned HTTP based architecture embodiment #1. In this case, the address information of the Websocket endpoints can be replaced by URL address information of service URLs. Accordingly, element names may be changed. Similarly, since the DDD formats are used in HTTP based architecture embodiment #1, the pieces of address information of the service URLs may be arranged.

Addresses of Websocket endpoints may be configured in the form of ws://localhost:8030/ESGInformation, ws://localhost:8030/Data and ws://localhost:8030/MediaTimeline. Addresses of HTTP service URLs may be configured in the form of http://192.168.1.4:8080/serviceidentification and http://localhost:8030/ESGInformation.

FIG. 32 illustrates DDD formats in a process for discovering a Websocket endpoint or an HTTP service URL using a DDD according to another embodiment of the present invention.

In the aforementioned Websocket based architecture embodiment #2, a DDD format according to the illustrated embodiment t420010 or a DDD format according to the illustrated embodiment t420020 may be used.

In the illustrated embodiment t420010, the device information of the DDD may include addresses of Websocket endpoints in addition to the device type information. Since the DDD format is used in Websocket based architecture embodiment #2, only address information about a single companion endpoint may be included therein. The DDD format according to the illustrated embodiment t420020 may also include only address information about a single companion endpoint. In this case, the address information of the corresponding endpoint can be included in the service information of the DDD.

The DDD formats according to the illustrated embodiments t420010 and t420020 may be used in the aforementioned HTTP based architecture embodiment #2. In this case, the address information of the Websocket companion endpoint can be replaced by URL address information of a companion service URL. Accordingly, element names may be changed. Similarly, since the DDD formats are used in HTTP based architecture embodiment #2, only address information of a single service URL can be included therein.

In the aforementioned Websocket based architecture embodiment #3, the DDD format according to the illustrated embodiment t420030 or the DDD format according to the illustrated embodiment t420040 may be used.

In the illustrated embodiment t420030, the device information of the DDD may include address information of n Websocket endpoints in addition to the device type information. For example, the device information may include address information of a companion endpoint that executes the service/content identification function, the ESG information delivery function, etc. and address information of the app-to-app communication endpoint. The DDD format according to the illustrated embodiment t420040 may also include address information of n Websocket endpoints. In this case, address information of corresponding endpoints can be included in the service information of the DDD.

While the address information is positioned below the device information and the service information in the present embodiment, the address information may be arranged at other positions in the DDD. In the illustrated embodiment, other elements of the aforementioned DDD are omitted. Other elements may be configured according to various embodiments.

Figure 33:
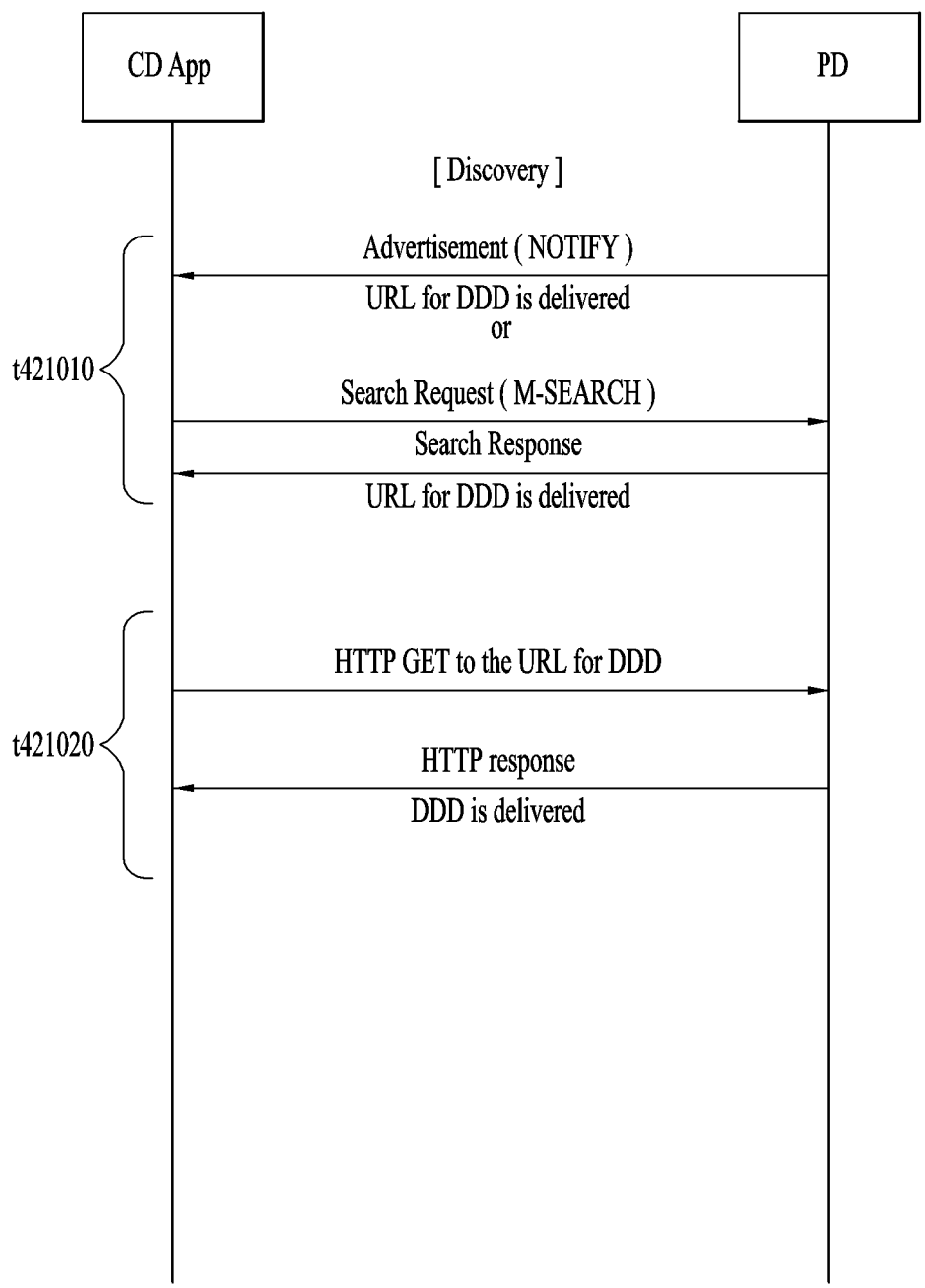
FIG. 33 illustrates a process for discovering a Websocket endpoint or an HTTP service URL using a response header to a DDD request according to an embodiment of the present invention.

FIG. 33 illustrates a process for discovering a Websocket endpoint or an HTTP service URL using a response header to a DDD request according to an embodiment of the present invention.

As described above, a PD may multicast a discovery message for advertising the PD or transmit a response message to a received M-SEARCH message to a CD. An application of the CD may obtain a URL from a LOCATION header of the multicast discovery message or the response message to the M-SEARCH message. This process may be the same as the process in the aforementioned embodiment.

The URL may be a URL through which a DDD can be acquired, and the application of the CD may send a message for requesting the DDD to the URL using HTTP GET. The DDD is delivered through the body of a response message to the request and thus the application of the CD can obtain device description information (t421020).

In the above-described embodiment, addresses of Websocket endpoints or address information of HTTP service URLs are delivered through the DDD of the response message. In the present embodiment, the address information may be delivered through the header of the response message. In this case, the body of the response message may include no information or may include the DDD.

FIG. 34 illustrates a format of a response header in a process for discovering a Websocket endpoint or an HTTP service URL using a response header to a DDD request according to an embodiment of the present invention.

As described above, an application of a CD may request a DDD using HTTP GET. Here, the GET message may have a format as illustrated in embodiment t422010. A DDD request message using GET may be transmitted to a URL of a DDD acquired from a PD. Furthermore, host information of an IP address/port of description may be used. In addition, a language preferred by a control point may be used. The GET message may be the same as the message in the aforementioned embodiment.

As described above, a response message to the DDD request message may be returned. Address information may be delivered through the header of the response message.

In the aforementioned Websocket based architecture embodiment #1, a response header format according to the illustrated embodiment t422020 may be used. The response header according to the embodiment can include address information of various Websocket endpoints in addition to basic 200 OK message information. As shown, address information about endpoints such as the service/content identification endpoint and the ESG information endpoint may be included in the response header. Since the response header format is used in Websocket based architecture embodiment #1, the pieces of address information about the endpoints may be arranged. Here, the structure and form in which address information is included in the response header may be configured in various manners according to embodiments.

The response header format according to the illustrated embodiment t422020 may be used in the aforementioned HTTP based architecture embodiment #1. In this case, the address information of the Websocket endpoints can be replaced by URL address information of service URLs. Accordingly, element names may be changed. Similarly, since the response header format is used in HTTP based architecture embodiment #1, the pieces of address information of the service URLs may be arranged.

In the aforementioned Websocket based architecture embodiment #2, a response header format according to the illustrated embodiment t422030 may be used. The response header according to the embodiment can include address information of a Websocket endpoint in addition to basic 200 OK message information. Since the response header format is used in Websocket based architecture embodiment #2, only address information about a companion endpoint can be included therein. Here, the structure and form in which the address information is included in the response header may be configured in various manners according to embodiments.

The response header format according to the illustrated embodiment t422030 may be used in the aforementioned HTTP based architecture embodiment #2. In this case, the address information of the Websocket companion endpoint can be replaced by address information of a companion service URL. Accordingly, element names may be changed. Similarly, since the response header format is used in HTTP based architecture embodiment #2, only the address information of the companion service URL may be included therein.

In the aforementioned Websocket based architecture embodiment #3, a response header format according to the illustrated embodiment t422040 may be used. The response header according to the embodiment can include address information of n Websocket endpoints in addition to basic 200 OK message information. For example, address information of a companion endpoint that executes the service/content identification function, the ESG information delivery function, etc. and address information of the app-to-app communication endpoint may be included in the response header. Here, the structure and form in which address information is included in the response header may be configured in various manners according to embodiments.

Figure 35:
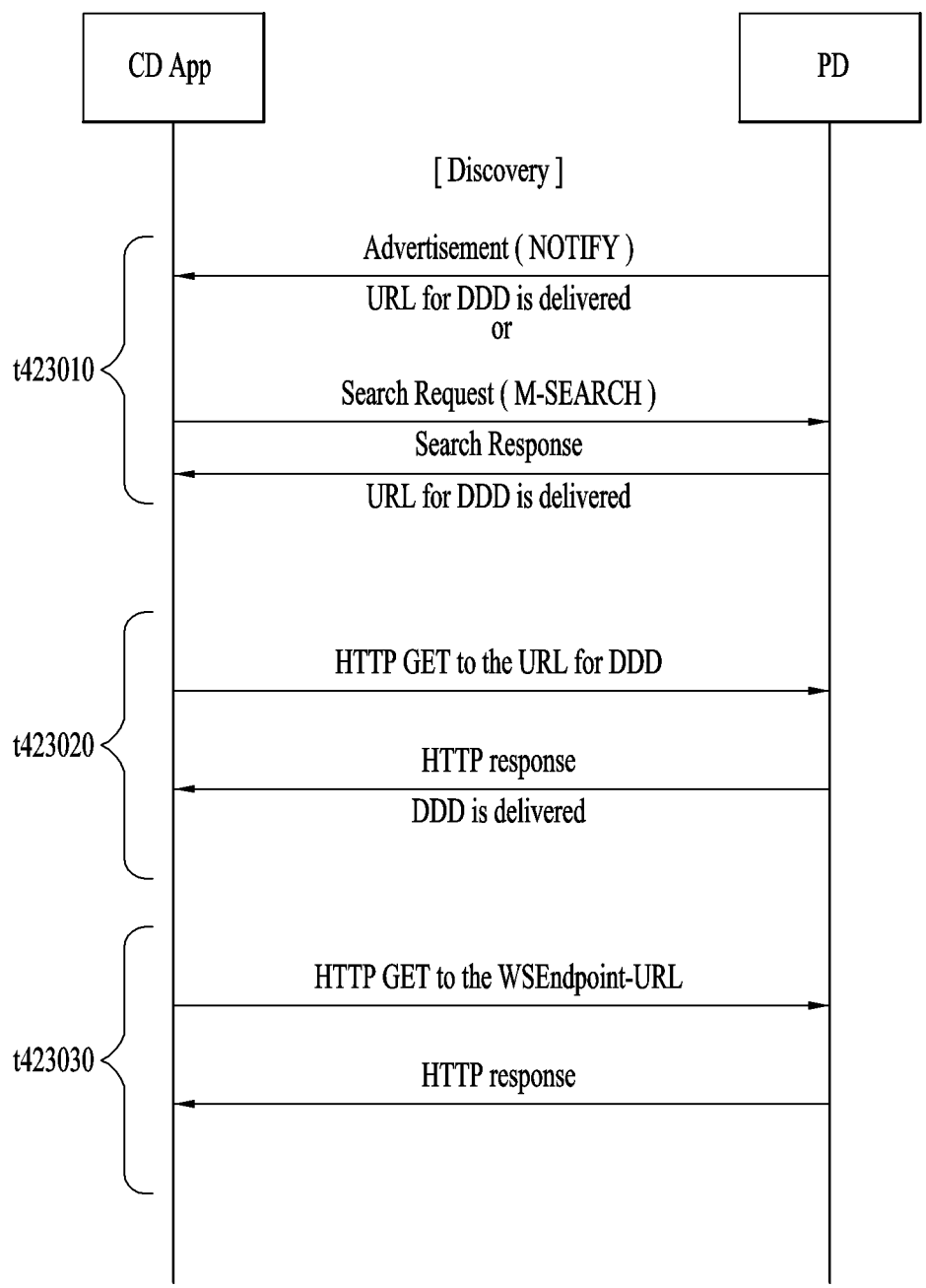
FIG. 35 illustrates a process for discovering a Websocket endpoint or an HTTP service URL using a URL of a response header to a DDD request according to an embodiment of the present invention.

FIG. 35 illustrates a process for discovering a Websocket endpoint or an HTTP service URL using a URL of a response header to a DDD request according to an embodiment of the present invention.

As described above, a PD may multicast a discovery message for advertising the PD or transmit a response message to a received M-SEARCH message to a CD. An application of the CD may obtain a URL from a LOCATION header of the multicast discovery message or the response message to the M-SEARCH message. The URL may be a URL through which a DDD can be acquired, and the application of the CD may send an HTTP GET request to the URL. The processes t42310 and t42320 may be the same as the aforementioned embodiment.

Here, a response message may be received as a response to the HTTP GET request. In the aforementioned embodiment, address information has been delivered through a DDD included in the body of the response message or the response message header. In the present embodiment, a URL through which address information can be acquired may be delivered through the response message header. In this case, the body of the response message may include no information and or may include a DDD (t423020).

The application of the CD may request address information by sending the HTTP GET request to the delivered URL for the address information. The PD may send a response message to the application of the CD. The address information can be delivered to the CD through the response message (t423030). The address information may be delivered through the body of the response message. According to an embodiment, the address information may be delivered through the header of the response message.

FIG. 36 illustrates a GET request and response message formats according thereto in a process for discovering a Websocket endpoint or an HTTP service URL using a URL of a response header to a DDD request according to an embodiment of the present invention.

As described above, an application of a CD may request a DDD using HTTP GET. Here, the GET message may have a format as illustrated in embodiment t424010. A DDD request message using GET may be transmitted to a URL of a DDD acquired from a PD. Furthermore, host information of an IP address/port of description may be used. The GET message may be the same as the message in the aforementioned embodiment.

A response message may be received in response to the HTTP GET request. The response message may have a format as shown in embodiment t424020. The response message may include a URL through which address information can be acquired in addition to basic 200OK message information. The URL may be URL information for acquiring the address of a Websocket endpoint or URL information for acquiring the address of an HTTP service URL. Alternatively, the URL may be URL information for obtaining both. In the illustrated format, the URL information for acquiring the address of a Websocket endpoint is included.

The application of the CD may send a request for address information to the URL using HTTP GET. Here, the GET message may have a format shown in embodiment t424030. The request message using GET may be transmitted to a URL of address information acquired from the PD. In addition, host information of an IP address/port of description may be used. Furthermore, a language preferred by a control point may be used.

For example, when the URL for acquiring the address information is http://192.168.1.10:8080/WSEndpoints (assuming Websocket), the GET message using this URL may be configured as shown in embodiment t424040.

Subsequently, a response message to the address information request message may be returned as described above. The response message may include address information. The address information may be the address of the Websocket endpoint or the address of the HTTP service URL.

FIG. 37 illustrates formats of a response message delivering address information in a process for discovering a Websocket endpoint or an HTTP service URL using a URL of a response header to a DDD request according to an embodiment of the present invention.

In the aforementioned Websocket based architecture embodiment #1, a response message format according to the illustrated embodiment t425010 may be used.

As shown, address information about endpoints such as the service/content identification endpoint and the ESG information endpoint may be included in the message. Since the message format is used in Websocket based architecture embodiment #1, the pieces of address information about the endpoints may be arranged.

The message format according to the illustrated embodiment t425010 may be used in the aforementioned HTTP based architecture embodiment #1. In this case, the address information of the Websocket endpoints can be replaced by URL address information of service URLs. Accordingly, element names may be changed. Similarly, since the message format is used in HTTP based architecture embodiment #1, the pieces of address information of the service URLs may be arranged.

In the aforementioned Websocket based architecture embodiment #2, a message format according to the illustrated embodiment t425020 may be used.

The message format according to the illustrated embodiment t425020 may be used in the aforementioned HTTP based architecture embodiment #2. In this case, the address information of the Websocket companion endpoint can be replaced by address information of a companion service URL. Accordingly, element names may be changed. Similarly, since the message format is used in HTTP based architecture embodiment #2, only the address information of the companion service URL may be included therein.

In the aforementioned Websocket based architecture embodiment #3, a message format according to the illustrated embodiment t425030 may be used.

The message format according to the illustrated embodiment t425030 may include n Websocket endpoints. For example, address information of a companion endpoint that executes the service/content identification function, the ESG information delivery function, etc. and address information of the app-to-app communication endpoint may be included in the message format.

While the illustrated formats include address information in an additionalData element, the message may include other pieces of information according to embodiments. Here, a structure and a form in which address information is included in the message may be configured in various manners according to embodiments.

Figure 38:
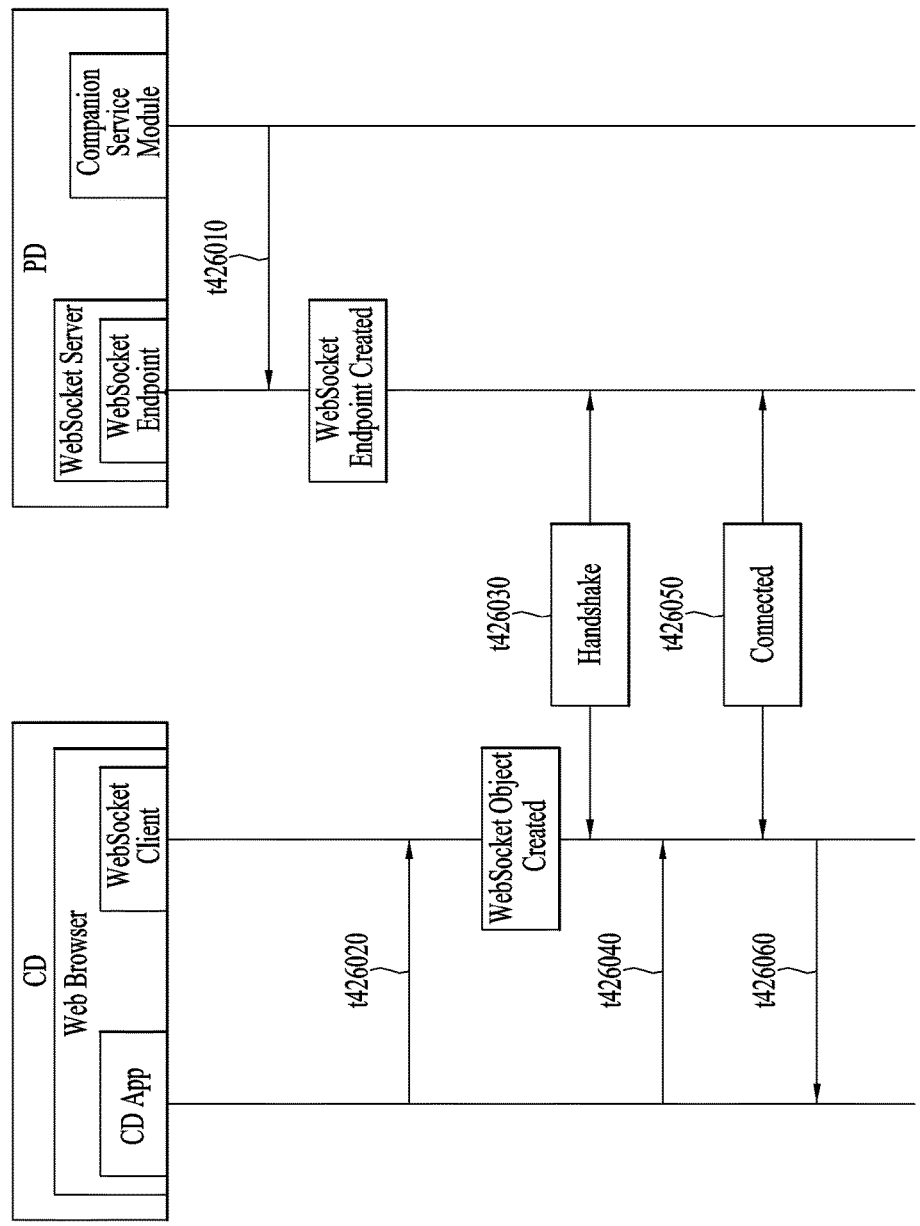
FIG. 38 illustrates a Websocket based handshake & connection process (after discovery) according to an embodiment of the present invention.

FIG. 38 illustrates a Websocket based handshake & connection process (after discovery) according to an embodiment of the present invention.

As described above, a PD may serve as a Websocket server and a CD may correspond to a Websocket client. The PD may include a Websocket server and/or a companion service module. The companion service module may provide information necessary for a companion device or perform overall management related to companion services. The companion service module may be a hardware module.

The Websocket server of the PD may provide Websocket endpoints. An application available in a web browser in the CD may be executed. The web browser may also provide a Websocket client.

First, the companion service module of the PD may request generation of a Websocket endpoint from the Websocket server (t426010). For example, a request in the form of @ServerEndpoint("/WS_AA") in Java format may be delivered. Here, "/WS_AA" may refer to a related URL. Through this process, the Websocket server can generate the Websocket endpoint.

An application of the CD may call an API for generating a Websocket object (t426020). The API in the name of newWebsocket may have the address of the Websocket endpoint as a variable thereof. For example, ex_Websocket can be defined in the form of ex_Websocket=newWebsocket (ws://192.168.1.11:8080/WS_AA). Through this process, the Websocket object can be generated in the CD. Here, handshake between the endpoint of the Websocket server in the PD and the Websocket object of the CD can be performed (t426030).

The application of the CD may call an APR for adding OpenEventHandler (t426040). The API may be WebsocketObject.onopen( ). For example, a handler can be added in a manner of exWebsocket.onopen( . . . ). In this process, the Websocket server and a client can be connected (t426050).

The Websocket client can notify the application of the CD of opening of connection (t426060).

Figure 39:
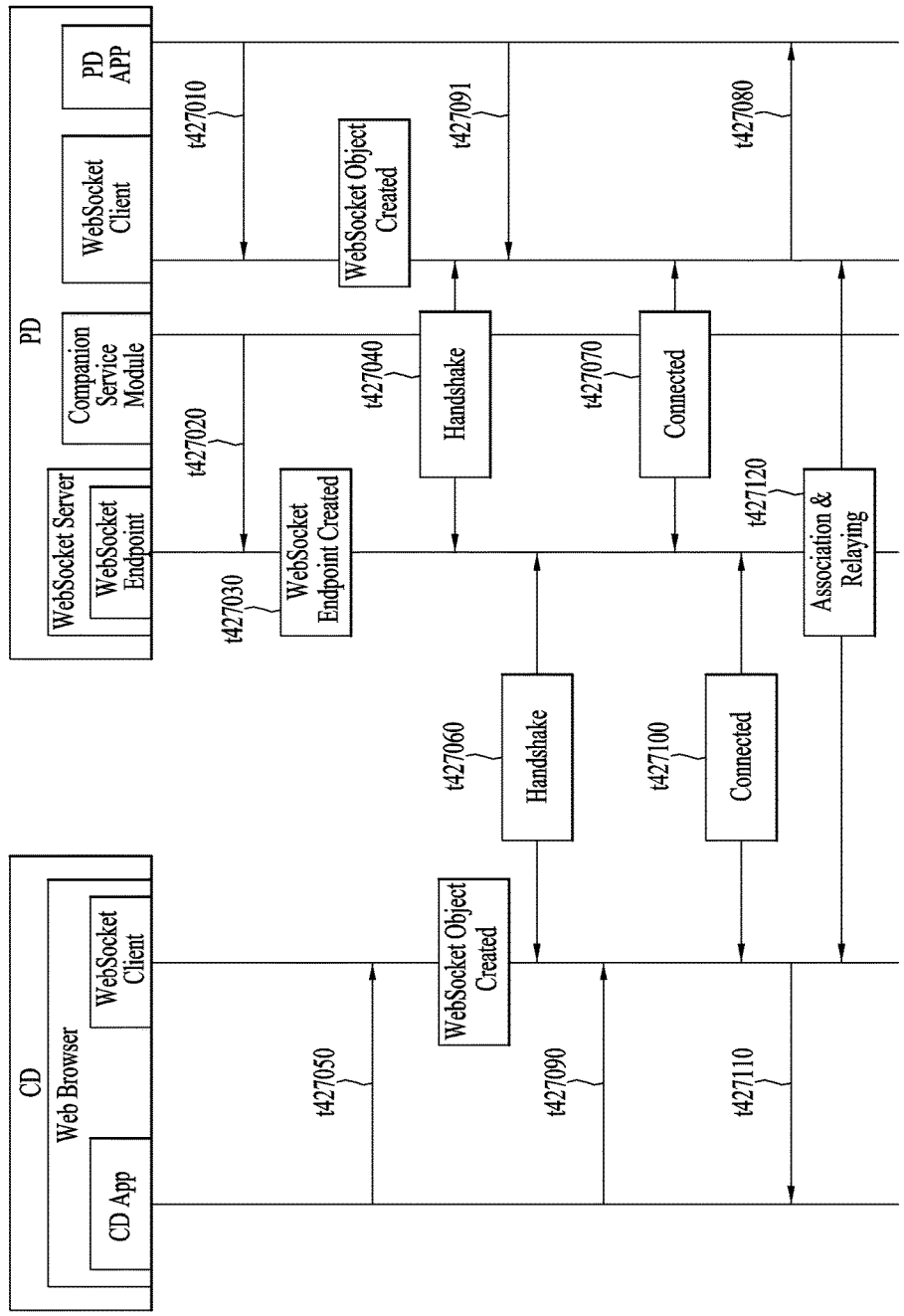
FIG. 39 illustrates a handshake & connection process for Websocket based app-to-app communication (after discovery) according to an embodiment of the present invention.

FIG. 39 illustrates a handshake & connection process for Websocket based app-to-app communication (after discovery) according to an embodiment of the present invention.

In a Websocket based architecture, app-to-app communication can be performed between an application executed in a PD and an application executed in a CD. As described above, when the application of the PD is connected to a Websocket server and the application of the CD is also connected to the Websocket server, the Websocket server can relay messages and data between the applications.

First, the application of the PD may call an API in order to generate a new Websocket object in a Websocket client in the PD. The aforementioned newWebsocket API may be used. For example, the API can be used such as local_Websocket=newWebsocket(ws://localhost:8080/App-toApp). In this process, the Websocket object for the application of the PD can be generated.

A companion service module of the PD may call an API from the Websocket server to generate a Websocket endpoint (t427020 and t427030). This process has been described above. In this case, an endpoint for app-to-app communication needs to be generated, and thus a URL (e.g., /App-toApp) related to app-to-app communication can be used as a variable. Thereafter, the local Websocket client of the PD and the Websocket server can perform a handshake process (t427040).

The application of the CD may also generate a Websocket object (t427050). The process for generating the Websocket object is the same as the aforementioned process. In this case, since the Websocket object is a Websocket object for app-to-app communication, the Websocket object can be defined in the form of remote_Websocket=newWebsocket (ws://192.168.1.11:8080/ApptoApp). Subsequently, the Websocket server of the PD and the Websocket object of the CD can perform a handshake process (t427060).

The Websocket client of the PD and the Websocket client of the CD may call an API in order to add OpenEventHandler (t427091 and t427090). This process is the same as the aforementioned process. Accordingly, the Websocket clients can be connected to the Websocket server (t427070 and t427100). Upon connection, the Websocket clients can notify the applications of opening of connection through an event (t427080 and t427110).

Upon completion of the aforementioned processes, the application of the CD and the application of the PD can communicate each other (t427120). The applications of both sides can deliver messages to each other through the Websocket server. That is, the Websocket server can relay a message sent from one client to the other client. Such a two-way communication process will be described in detail below.

Figure 40:
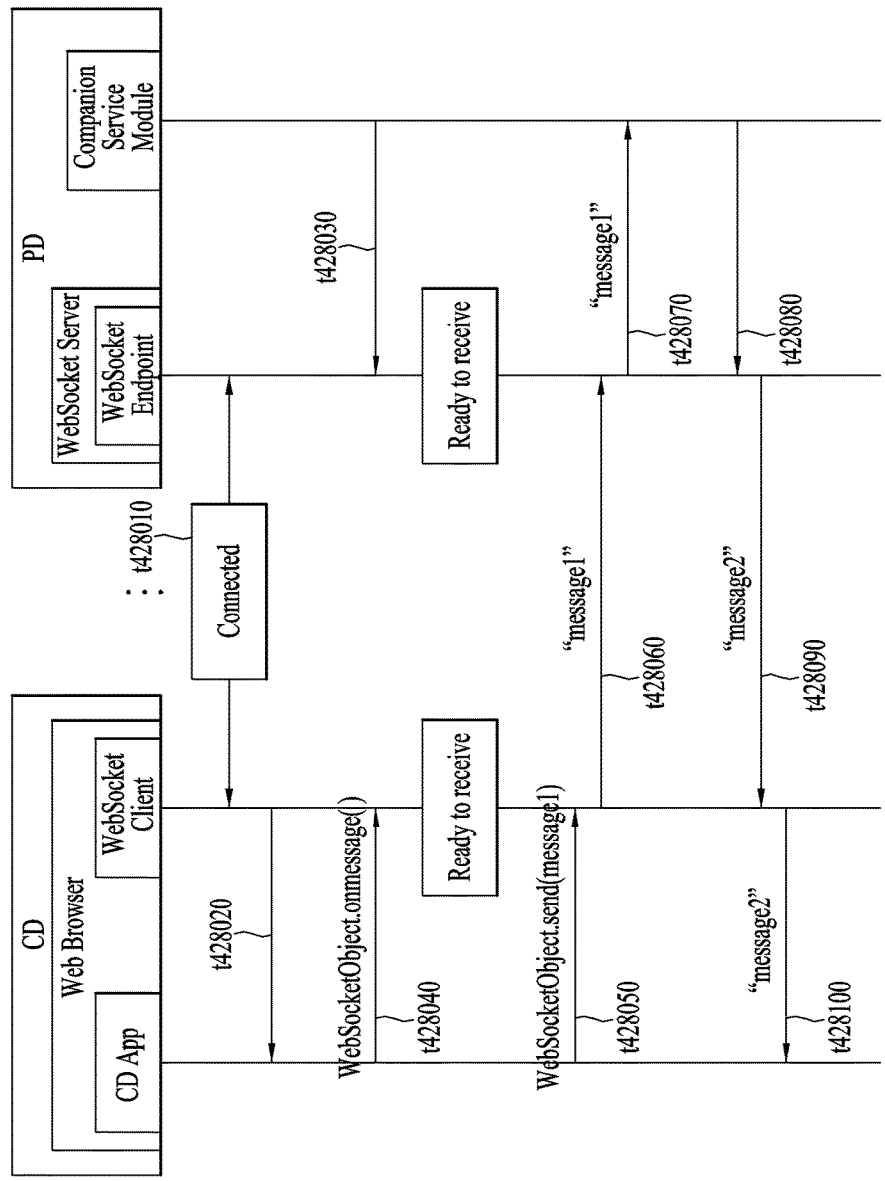
FIG. 40 illustrates a Websocket based two-way communication process (after connection) according to an embodiment of the present invention.

FIG. 40 illustrates a Websocket based two-way communication process (after connection) according to an embodiment of the present invention.

A case in which the application of the CD and the Websocket server of the PD have been connected through the aforementioned processes is assumed (t428010). As described above, the Websocket client can notify the application of the CD of opening of connection (t428020).

The companion service module may call an API in order to receive a message (t428030). For example, an API such as @OnMessage in the Java format can be used. Accordingly, the Websocket server may be ready to receive a message (ready receive).

The application of the CD may call an API for adding MessageEventHandler (t428040). For example, an API such as WebsocketObject.onmessage( ) can be called. In the case of an object such as ex_Websocket in the aforementioned example, an API may be called in the form of ex_Websocket.onmessage( . . . ). Through this process, the Websocket client of the CD may be ready to transmit/receive messages.

The application of the CD may call an API for sending a message (t428050). For example, an API such as WebsocketObject.send(message1) can be called. In the case of an object such as ex_Websocket in the aforementioned example, an API such as ex_Websocket.send(message1) can be called. Accordingly, a message (message 1) can be delivered to the Websocket server (t428060).

The Websocket server may deliver the received message (message 1) to the companion service module (t428070). The companion service module may deliver a message (message 2) in response to the message (message 1) (t428080, t428090 and t428100). The companion service module may call an API for sending the message (t428080). To transmit an object in a text or JSON format, a Java API such as session.getBasicRemote( ).sendText(message2) or session.getBasicRemote( ).sendObject (message2) can be called.

Figure 41:
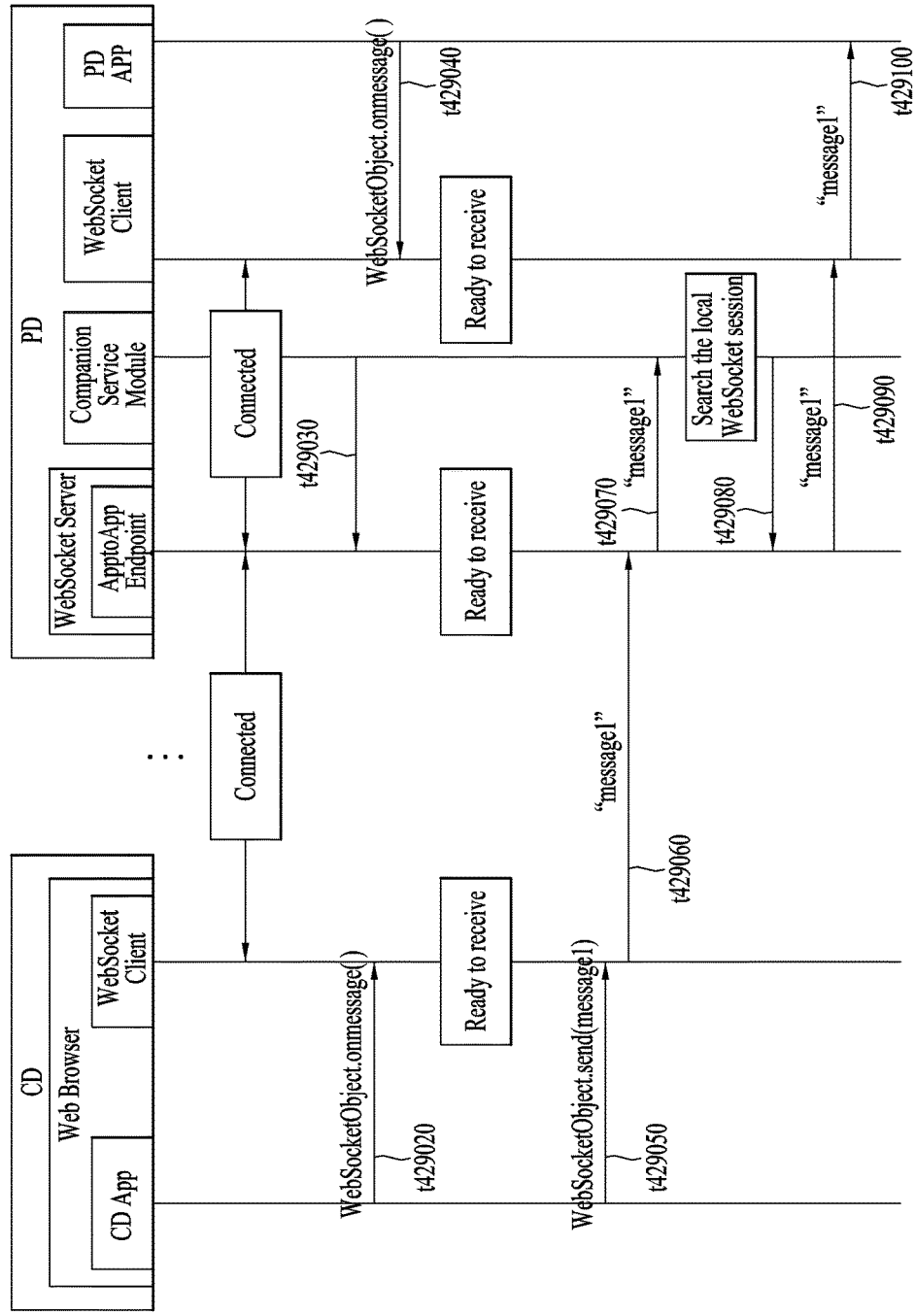
FIG. 41 illustrates a Websocket based app-to-app two-way communication process (after connection/CD to PD) according to an embodiment of the present invention.

FIG. 41 illustrates a Websocket based app-to-app two-way communication process (after connection: CD-to-PD) according to an embodiment of the present invention.

A case in which the application of the CD, the Websocket server of the PD and the application executed in the PD have been connected through the aforementioned processes is assumed. The applications may have received information indicating opening of connection from the Websocket client through an event.

As described above, the companion service module may call an API in order to receive a message and the Websocket server may be ready to receive a message through the API (t429030). The application of the PD may call an API in order to add MessageEventHandler and the Websocket client of the PD may be ready to receive a message (t429040). The application of the CD may call an API such that the Websocket client is ready to receive a message (t429020). The detailed process has been described above.

The application of the CD may call an API in order to send a message (t429050). The API may be the aforementioned API. For example, an API such as remote_Websocket.send (message1) can be used. A message can be delivered to the Websocket server through the API (t429060). The Websocket server can deliver the message (message 1) to the companion service module (t429070).

The companion service module may search for a local Websocket session in order deliver the message to the local Websocket client of the PD. The companion service module may call an API in order to deliver the message (message 1) when the local Websocket session is found (t429080). Here, a Java API such as session.getBasicRemote( ).sendText (message1) or session.getBasicRemote( ).sendObject (message1) can be called in order to transmit an object in a text or JSON format, as described above.

The Websocket server can deliver the message (message 1) to the Websocket client (t429090) and the Websocket client can deliver the message (message 1) to the application of the PD (t429100).

Figure 42:
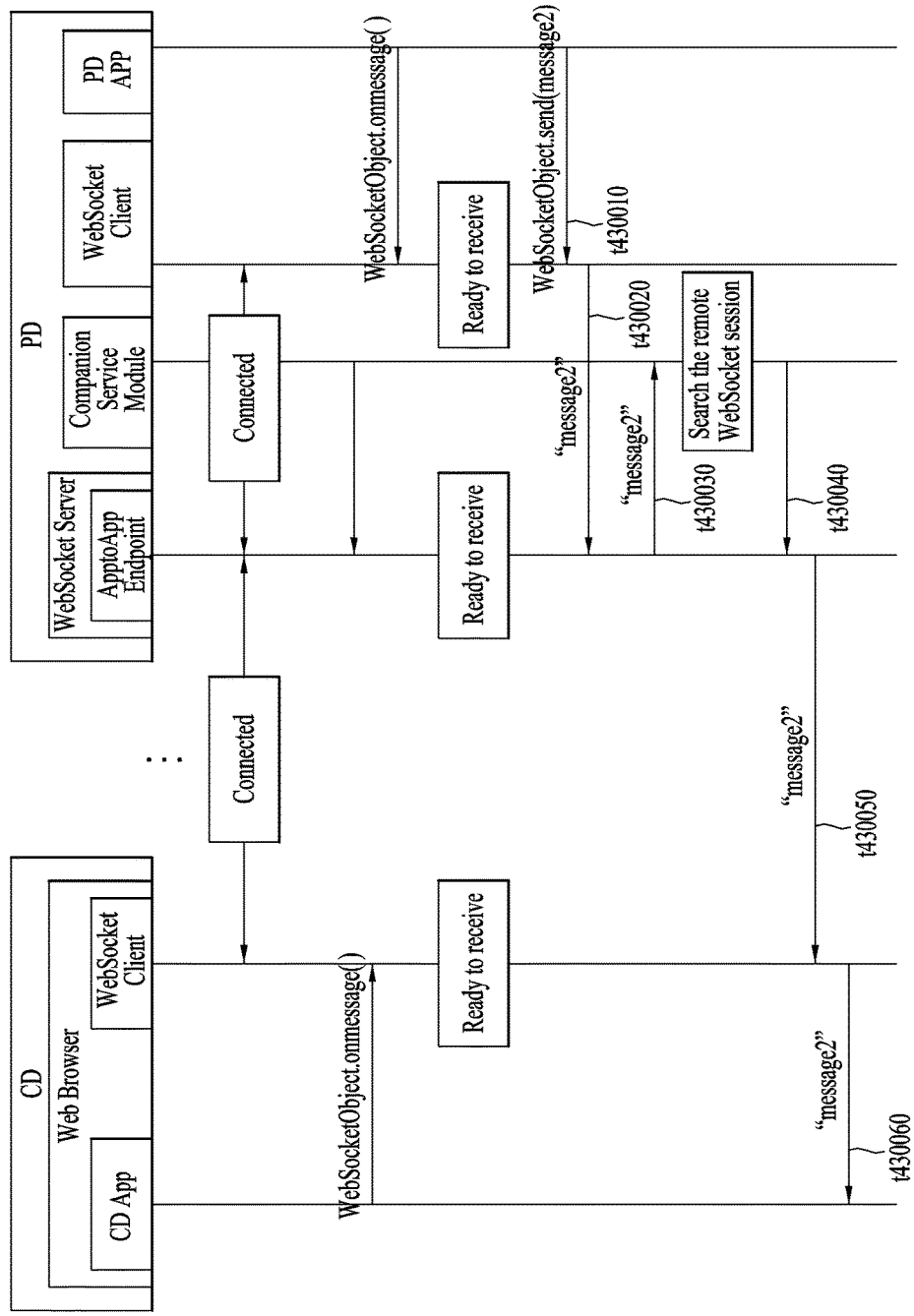
FIG. 42 illustrates a Websocket based app-to-app two-way communication process (after connection/PD to CD) according to an embodiment of the present invention.

FIG. 42 illustrates a Websocket based app-to-app two-way communication process (after connection: PD-to-CD) according to an embodiment of the present invention.

A case in which the application of the CD, the Websocket server of the PD and the application executed in the PD have been connected through the aforementioned processes is assumed. The applications may have received information indicating opening of connection from the Websocket client through an event.

The Websocket server and the Websocket clients may have been ready to transmit/receive messages through the aforementioned processes.

The application of the PD may call an API in order to send a message (t430010). The API may be the aforementioned API. For example, an API such as local_Websocket.send (message2) can be used. A message can be delivered to the Websocket server through the API (t430020). The Websocket server can deliver the message (message 2) to the companion service module (t430030).

The companion service module may search for a remote Websocket session in order deliver the message to a remote Websocket client of the PD. The companion service module may call an API in order to deliver the message (message 2) when the remote Websocket session is found (t430040). Here, a Java API such as session.getBasicRemote( ).sendText(message2) or session.getBasicRemote( ).sendObject (message2) can be called in order to transmit an object in a text or JSON format, as described above.

The Websocket server can deliver the message (message 2) to the Websocket client (t430050) and the Websocket client can deliver the message (message 2) to the application of the CD (t430060).

Figure 43:
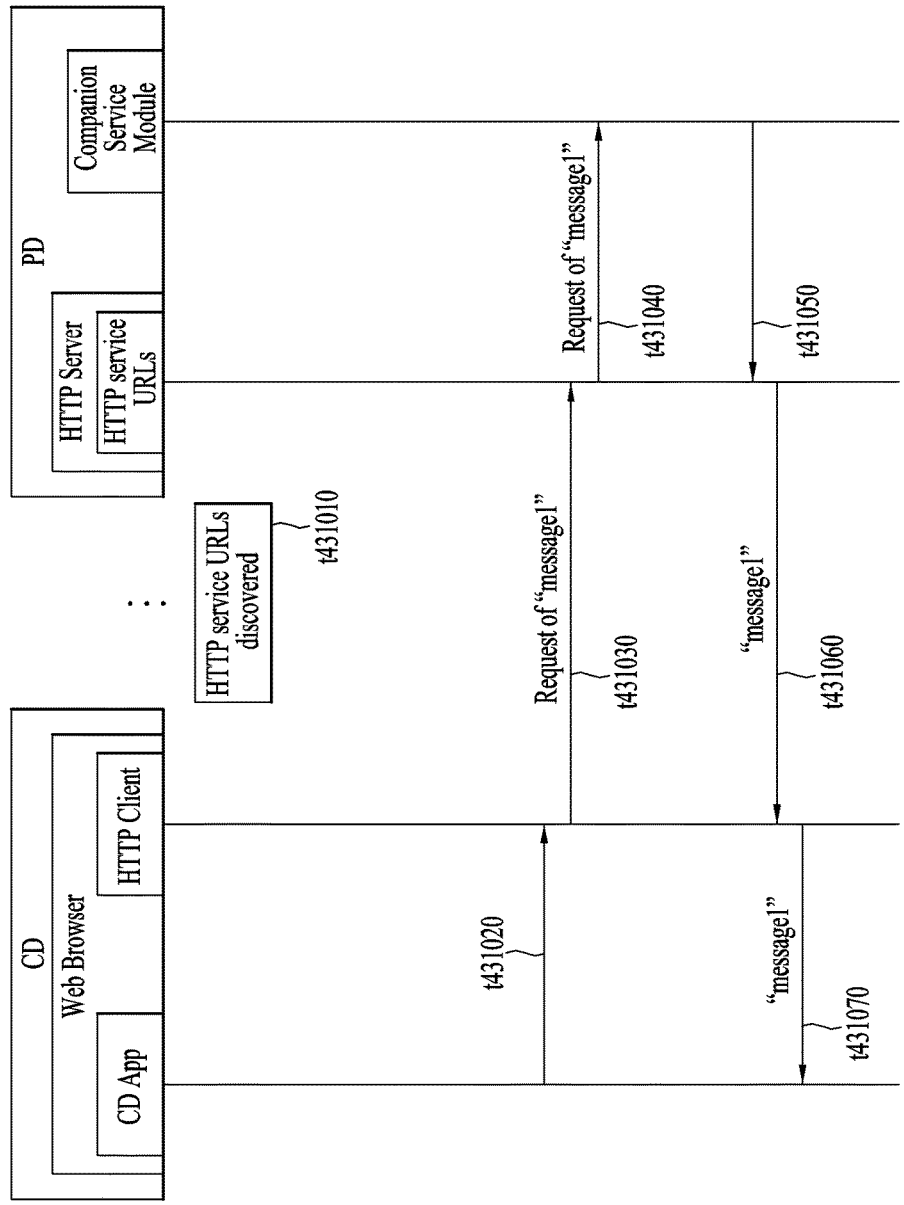
FIG. 43 illustrates an HTTP based request-response process (after discovery) according to an embodiment of the present invention.

FIG. 43 illustrates an HTTP based request-response process (after discovery) according to an embodiment of the present invention.

It is assumed that all HTTP service URLs have been discovered through the above-described discovery process in an HTTP based architecture (t431010).

An application of a CD may call an API and send a request for a message to an HTTP client (t431020). The HTTP client may send the request to an appropriate URL corresponding to the request of the application from among the HTTP service URLs discovered in the discovery process (t431030). Alternatively, the HTTP client may send the request to a companion service URL according to the aforementioned embodiment. In this case, content of the request can be identified through the query term of the request.

An HTTP server may deliver the request to a companion service module in a PD (t431040). The companion service module may call an API in order to deliver the requested message (message1) to the CD (t431050).

The HTTP server may deliver the message (message 1) to the HTTP client (t431060) and the HTTP client may deliver the message to the application of the CD (t431070).

Figure 44:
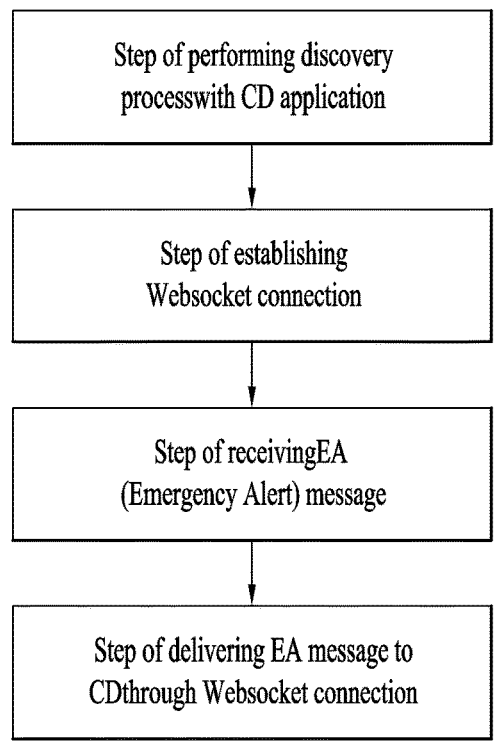
FIG. 44 illustrates a method for providing a broadcast service in a PD according to an embodiment of the present invention.

FIG. 44 illustrates a method for providing a broadcast service by a PD according to an embodiment of the present invention.

The method for providing a broadcast service by the PD according to an embodiment of the present invention may include a step of performing a discovery process with a CD application, a step of establishing Websocket connection, a step of receiving an EA (Emergency Alert) message and/or step of delivering the EA message to a CD through Websocket connection.

First, a companion module of a broadcast reception apparatus which operates as a PD may perform a discovery process with a CD application executed in a companion device (CD). The discovery process has been described above. Here, it is assumed that the CD application is not launched by the PD. The CD may multicast an M-SEARCH message. Upon reception of the M-SEARCH message, the PD may reply to the message with a 200 OK message. The header of the 200 OK message may include a location URL of the PD.

The CD application may send a request for device description to the location URL. The request may be performed using the HTTP GET method. Upon reception of the request, the PD or the companion module of the PD may transmit a first response message to the CD application. Here, the first response message may include a first URL in the header thereof. The first URL may be used as an endpoint of a web server provided by the PD. Here, the endpoint of the web server may refer to a service URL provided by the web server. The first URL may correspond to a companion service URL used in the aforementioned HTTP based architectures. There may be service URLs depending on functions according to an embodiment. In such a case, the first URL may be one of multiple HTTP service URLs.

The companion module of the PD may receive an application information request from the CD application. The CD application may send the application information request to the first URL. The companion module may transmit a second response message in response to the application information request. The second response message may include the second URL in a response message body. The second URL may be used as an endpoint of a Websocket server provided by the PD. Here, the second URL which is address information of the corresponding Websocket endpoint may be a companion Websocket endpoint or an app-to-app Websocket endpoint.

The present embodiment may correspond to the aforementioned embodiment in which an HTTP based web server and a Websocket based Websocket server are provided by the PD. Specifically, the present embodiment may correspond to the embodiment from among the aforementioned embodiments, in which only one companion service URL is provided as an HTTP service URL and one companion endpoint and one app-top-app endpoint are provided as Websocket server endpoints. Here, the Websocket companion endpoint may be an endpoint providing functions other than the app-to-app communication function. Communication between the PD and the CD may be performed by a web server (HTTP) or a Websocket server depending on functions. For example, ESG delivery may be performed by the web server and service & content identification, EA (Emergency Alert) message delivery and media playback information delivery may be performed by the Websocket server. Media timeline information may be delivered through the web server and/or the Websocket server.

Subsequently, the companion module of the PD may establish Websocket connection between the Websocket server and the CD application. In this process, the second URL may be used. The method of establishing Websocket connection (session) has been described above in detail. Here, the Websocket connection may be Websocket connection for connecting a PD application and a CD application for app-to-app communication or Websocket connection for exchanging information between the PD and the CD application.

A reception module of the PD may receive an EA message including EA information over a broadcast network or a broadband network. The reception module may be one of a tuner that receives data through a broadcast network and a network interface that receives data over broadband or may include both the tuner and the network interface. The EA message may refer to a message including EA information for announcing an emergency situation. This has been described above.

The Websocket server of the PD may deliver the received EA message to the CD through Websocket connection. The delivery process will be described below in detail. Here, the Websocket server may refer to a hardware module or a processor that performs operation corresponding to the aforementioned Websocket server.

In a method for providing a broadcast service by a PD according to another embodiment of the present invention, the step of delivering the EA message to the CD may further include a step of executing a PD application for processing EA information, a step of executing an EA application of the CD by the PD application and/or a step of delivering the EA message from the PD application to the EA application of the CD through Websocket connection.

When the EA message is received, an internal control module of the PD may execute an application of the PD related to the EA message. The application of the PD may render the EA message and manage a process of delivering the EA message to the CD. The application of the PD may execute the EA application in the CD. The EA application may be an application having a function of rendering and processing the EA message in the CD. When the EA application is executed in the CD, app-to-app Websocket connection may be established between the EA application and the application of the PD. This process has been described above. The application of the PD may deliver the received EA message to the EA application. The EA application may render and process the EA message in the CD.

In a method for providing a broadcast service by a PD according to another embodiment of the present invention, the EA message may include ID information for identifying the EA message, expiration time information indicating a time at which the EA message expires and/or category information indicating a type of an emergency alert indicated by the EA message. Information that can be included in the EA message has been described above.

A method for providing a broadcast service by a PD according to another embodiment of the present invention may further include a step in which the CD application requests timeline information using the HTTP GET method and/or a step in which the PD delivers an HTTP response message to the CD application. The aforementioned web server of the PD may be requested to provide the timeline information. Here, the timeline information may refer to information about a media timeline of a broadcast service being provided by the PD. The web server of the PD transmits the response message to the request to the CD application. The response message may include UTC information and media time information in a pair. The UTC information may refer to absolute time information which is current UTC time information and the media time information may refer to media time information at the UTC time.

A method for providing a broadcast service by a PD according to another embodiment of the present invention may further include a step in which the CD application requests a service identification message from the Websocket server of the PD and/or a step in which the Websocket server delivers the service identification message to the CD application. The request and a response thereto may be performed through Websocket connection. Here, the PD may deliver the service identification message to the CD application through notification without a request of the CD application according to an embodiment. The service identification message may include at least one piece of service related information or at least one piece of content related information acquired from electronic service guide (ESG) data. Service related information may be included in the service identification message in the form of a service element and content related information may be included in the service identification message in the form of a content element.

In a method for providing a broadcast service by a PD according to another embodiment of the present invention, the service identification message may include component information and/or content item information related to each piece of content. The content element of the service identification message may include component elements that describe components included in the corresponding content and/or content item elements that describe files/data related to the corresponding content. Here, content may correspond to a program of the corresponding broadcast service (channel).

Here, the component information may include information about components having continuous and presentable data of the corresponding content. For example, the components may correspond to an audio component, a video component, a closed caption component, etc. In addition, each piece of component information may include URL information for accessing the corresponding component. The URL information may be service URL information of the PD or URL information of a server provided by a service provider.

The content item information may include information about additional data components of the corresponding content. Here, additional data components may refer to data such as the aforementioned app-based enhancement components or applications, and signaling information related to applications. In addition, each piece of content item information may include URL information for accessing the corresponding data. The URL information may be service URL information of the PD or URL information of a server provided by the service provider.

In a method for providing a broadcast service by a PD according to another embodiment of the present invention, URL information for accessing an additional data component may be used to acquire data for providing app-based enhancement for a broadcast service.

A method for providing a broadcast service by a CD according to an embodiment of the present invention will be described. This method is not shown in the drawings.

The method for providing a broadcast service by a CD according to an embodiment of the present invention may include a step in which a launcher of the CD executes an application of the CD, a step in which the application of the CD performs a discovery process with a PD using a network interface of the CD, a step in which the application of the CD establishes Websocket connection with a Websocket server of the PD using a Websocket client of the CD and/or a step in which the application of the CD receives an EA message using the Websocket client of the CD. The discovery process between the CD application and the PD may be performed by a companion module of the CD. The CD application may send a device description request using the companion module, send an application information request to the aforementioned first URL and acquire a response to the requests. In addition, an EA application of the CD may be executed by a PD application to perform app-to-app communication through Websocket connection. The EA application may receive an EA message through the app-to-app communication.

Methods for providing a broadcast service by a CD according to embodiments of the present invention may correspond to the above-described method for providing a broadcast service by a PD according to embodiments of the present invention. Methods for providing a broadcast service by a CD may be performed by hardware modules corresponding to modules (e.g., the companion module, the reception module, the internal control module, the web server and the Websocket server) used in the methods for providing a broadcast service by a PD. Methods for providing a broadcast service by a CD may have embodiments corresponding to the above-described embodiments of the method for providing a broadcast service by a PD.

The aforementioned steps may be omitted or replaced by other steps performing similar/identical operations according to embodiments.

Figure 45:
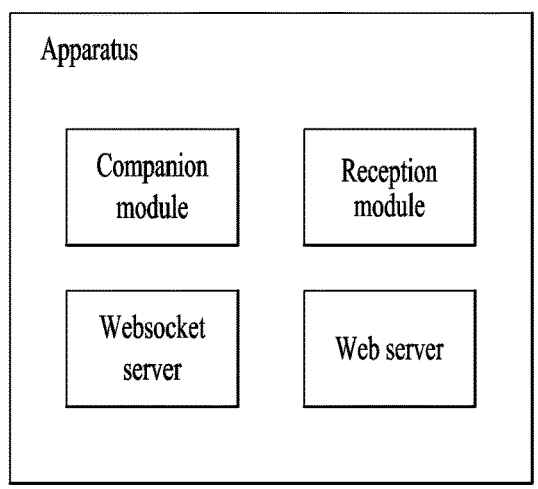
FIG. 45 illustrates a broadcast reception apparatus operating as a PD according to an embodiment of the present invention.

FIG. 45 illustrates a broadcast reception apparatus operating as a PD according to an embodiment of the present invention.

The broadcast reception apparatus operating as a PD according to an embodiment of the present invention may include the aforementioned companion module, reception module, internal control module, web server and/or Websocket server. The blocks and modules have been described above. Here, the web server/Websocket server may refer to hardware modules or processors that perform operations corresponding to the aforementioned web server/Websocket server.

The broadcast reception apparatus operating as a PD according to an embodiment of the present invention and internal modules/blocks thereof may perform the aforementioned embodiments of the methods for providing a broadcast service by a PD.

An apparatus operating as a CD according to an embodiment of the present invention will be described. This apparatus is not shown in the drawings.

The apparatus operating as a CD according to an embodiment of the present invention may include the aforementioned launcher, companion module and/or network interface. The blocks and modules have been described above.

The apparatus operating as a CD according to an embodiment of the present invention and internal modules/blocks thereof may perform the aforementioned embodiments of the methods for providing a broadcast service by a CD.

The internal blocks/modules of the aforementioned apparatus may be processors that perform continuous processes stored in a memory and may be hardware elements provided inside/outside the apparatus according to an embodiment.

The aforementioned modules may be omitted or replaced by other modules performing similar/identical operations according to embodiments.

FIG. 46 is a diagram illustrating a protocol applied to features according to an embodiment of the present invention.

Hereinafter, a protocol and a message structure format for a companion device (CD) in a broadcast system according to an embodiment of the present invention will be described with reference to the figure. The term communication means communication between a main device (or a receiver or a PD) and a companion device.

According to an embodiment of the present invention, for service and content identification communication, an HTTP protocol and/or a WebSocket protocol are used, Notification is used as a required messaging property, and Subscription may be applied.

According to an embodiment of the present invention, for ESG information communication, an HTTP protocol is used, Request/Response is used as a required message property, and Subscription may not be applied.

According to an embodiment of the present invention, for service, show and segment data communication, an HTTP protocol is used, Request/Response is used as a required message property, and Subscription may not be applied.

According to an embodiment of the present invention, for media timeline communication, an HTTP protocol and/or WebSocket protocol are used, Request/Response and/or Notification are used as a required message property, and Subscription may be applied when the WebSocket protocol is used and may not be applied when the HTTP protocol is used.

According to an embodiment of the present invention, for media playback state communication, a WebSocket protocol is used, Notification is used as a required message property, and Subscription may be applied.

According to an embodiment of the present invention, for Emergency Alert Messages communication, an HTTP protocol (multicast) and/or a WebSocket protocol are used, Request/Response and/or Notification are used as a required message property, and Subscription may be applied when the WebSocket protocol is used and may not be applied when the HTTP protocol is used.

FIG. 47 is a diagram illustrating a message structure format for an HTTP request according to an embodiment of the present invention.

FIG. (a) shows a first message structure format for an HTTP Request. An HTTP Request message may have a header and a body. The header may include common URL information for the HTTP Request, and the body may include information for specifying and/or identifying the message. That is, the body may include a CDRequest element, the CDRequest element may include a Feature element including a feature name (or a service name) for identifying and/or specifying the message (or the service) and/or an Argument element including parameter information. The Feature element has a feature name (or service name) as a field value. For example, the feature name may include PlaybackState, ContentIdentification, ESG, DataCommunication, MediaTimeline and/or EAS.

FIG. (b) shows a second message structure format for an HTTP Request. The second message structure format may use an HTTP GET method for requesting resource (data) of a web server side with a URL (URI) format. That is, the header of the HTTP Request message may include a URL, the URL may include a URL (CDHttpReqURL) of a host (or a web server or a broadcast reception device) and/or a featurename for specifying (or identifying a message (or a service). For example, the URL may be represented by "10.192.111.111/mediaplaybackstate". Here, "10.192.111.111" is a HOST URL (CDHttpReqURL), and "mediaplaybackstate" is a featurename for specifying a message. The HOST URL (CDHttpReqURL) may be acquired through a device discovery procedure.

FIG. (c) shows a third message structure format for an HTTP Request. The third message structure format may use an HTTP GET method. That is, the header of the HTTP Request message includes a URL, and the URL may include a HOST URL (ATSCCS_PDURL) and/or a ServiceName for specifying (or identifying) for a message (or a service). The HOST URL (ATSCCS_PDURL) may be acquired through a previous device discovery procedure. For example, the HOST URL (ATSCCS_PDURL) may include a first URL. The ServiceName may include "atsc3:csservices:eam:1" indicating an Emergency Alert Service (EAS), "atsc3:csservices:esg:1" indicating an Electronic Service Guide (ESG), "atsc3:csservices:mps:1" indicating a Media Playback State, and/or "atsc3.csservices.mt.1" indicating a Media Timeline.

For example, the header of the HTTP Request message may have the following format.

[Header of HTTP Request message]
GET/atsc3:csservices:mps:1 HTTP/1.1
HOST 10.192.111.111

Here, a request method field indicates a "GET" method for requesting resource (data) of a web server side with a URL (URI) format, a request URI field indicates "atsc3:csservices:mps:1" indicating a media playback state message, an HTTP version field indicates "1.1", and a HOST field indicates "10.192.111.111". The companion device may request a media playback state message using "GET" methods. The request URI field may include a ServiceName, and a HOST field may include a value corresponding to a HOST URL.

FIG. (d) shows a fourth message structure format for an HTTP Request. The message structure format may use an HTTP GET method. That is, the header of the HTTP Request message may include a URL, the URL may include a host URL (ATSCCS_PDURL), a ServiceName for specifying (or identifying) a message (or a service), and/or at least one parameter (param1=val1 & param2=val2 & . . . ). The host URL (ATSCCS_PDURL) may be acquired through a previous device discovery procedure. For example, the HOST URL (ATSCCS_PDURL) may include a first URL. The ServiceName may include "atsc3:csservices:eam:1" indicating an Emergency Alert Service (EAS), "atsc3:csservices:esg:1" indicating an Electronic Service Guide (ESG), "atsc3:csservices:mps:1" indicating a Media Playback State, and/or "atsc3.csservices.mt.1" indicating a Media Timeline. A parameter (or a query parameter) may indicate additional information of a message. In addition, the parameter may provide input arguments for at least one request.

For example, the header of the HTTP Request message may have the following format.

[Header of HTTP Request message]
GET/atsc3:csservices:esg:1?param1=val1 HTTP/1.1
HOST 10.192.111.111

Here, a request method field indicates a "GET" method for requesting resource (data) of a web server side with a URL (URI) format, a request URI field indicates "atsc3:csservices:esg:1?param1=val1" indicating an electronic service guide (ESG) and a parameter value (param1=val1), an HTTP version field indicates "1.1", and a HOST field indicates "10.192.111.111". The companion device may request an electronic service guide using "GET" methods. The request URI field may include a ServiceName and/or a parameter, and a HOST field may include a value corresponding to a HOST URL.

FIG. 48 is a diagram illustrating a message structure format for an HTTP response and/or WebSocket response according to an embodiment of the present invention.

FIG. (a) shows a message structure format for an HTTP Response and/or WebSocket Response according to an embodiment of the present invention. The body of the HTTP Response and/or WebSocket Response may include a CDResponse element including the content of a message. The CDResponse element may include a Feature element and/or message content for the feature (or the service). The Feature element has a feature name as a field value.

FIG. (b) shows a message structure format for an HTTP Response and/or a WebSocket Response according to another embodiment of the present invention. The CDResponse element may include a FeatureName element including message content for the feature (or the service). The name of the FeatureName element may be changed according to the feature name.

FIG. (c) shows a third message structure format for an HTTP Response and/or a WebSocket Response according to another embodiment of the present invention. The CDResponse element may include a feature attribute and/or message content for the feature (or the service). The feature attribute has a feature name as a field value.

FIG. (d) shows the use example of FIG. (b). The CDResponse element may include a MediaPlaybackState element. The MediaPlaybackState element may include a SubscriptionID element, an MPState element, an MPSpeed element, a MediaURL element, MediaID element, a PDDevID element and/or a PDVersion element. Here, the SubscriptionID element, the MPState element, the MPSpeed element, the MediaURL element, the MediaID element, the PDDevID element and/or the PDVersion element may correspond to the message content for the feature. The SubscriptionID element may have an "aaa" value, the MPState element may have a "PLAYING" value, and the MPSpeed element may have a value of "1". That is, in this use example, the HTTP Response and/or the WebSocket Response may deliver a response to the MediaPlaybackState feature, the SubscriptionID of the MediaPlaybackState feature may be "aaa", and the speed may be "1" time.

FIG. (e) shows the use example of FIG. (c). The CDResponse element may include a feature attribute, a SubscriptionID element, an MPState element, an MPSpeed element, a MediaURL element, a MediaID element, a PDDevID element and/or a PDVersion element. Here, the SubscriptionID element, the MPState element, the MPSpeed element, the MediaURL element, the MediaID element, the PDDevID element and/or the PDVersion element may correspond to message content for the feature. The feature attribute may have a "PlaybackState" value, the SubscriptionID element may have an "aaa" value, the MPState element may have a "PLAYING" value, and the MPSpeed element may have a value of "1". That is, in this use example, the HTTP Response and/or the WebSocket Response may deliver a response to a PlaybackState feature, the SubscriptionID of the PlaybackState feature may be "aaa", and the speed may be "1" time.

FIG. 49 is a diagram illustrating a message structure format for WebSocket subscription according to an embodiment of the present invention.

FIG. (a) shows a message structure format for a WebSocket Subscription Request according to an embodiment of the present invention. The CDSubRequest element may include a feature attribute, a SubCallbackURL element, a SubDuration element, a CDDevID element, a CDAppID element and/or a CDAppVersion element. In addition, the CDSubRequest element may further include a MediaURL element and/or a MediaID element.

The feature attribute indicates the name of a feature (or a message or a service) to be subjected to subscription. A SubCallbackURL element may indicate Uniform Resource Locator (URL) information for receiving the feature in response to this request. A SubDuration element may indicate a duration requested until subscription of the feature expires. For example, the requested duration may be in millisecond and/or second units. If the value of the SubDuration element is a specific value (e.g., "−1"), the requested duration may indicate an infinite duration. A CDDevID element may indicate a device identifier for a companion device. A CDAppID element may indicate an application identifier for the companion device. A CDAppVersion element may indicate version information of an application for the companion device. A MediaURL element may indicate a URL for a media, by which subscription of the feature (e.g., media playback state information) is requested. If the MediaURL element is not present, information on the media currently played back by the broadcast reception device may be selectively requested. A MediaID element may indicate an identifier for a media, by which subscription of the feature (e.g., media playback state information) is requested. This identifier may uniquely identify the media of the broadcast reception device, by which subscription of the feature (e.g., media playback state information) is requested.

FIG. (b) shows a message structure format for a Web-Socket Subscription Response according to an embodiment of the present invention. A CDSubResponse element may include a feature attribute, a StatusCode element, a StatusString element, a SubID element, a SubTimeoutDuration element, a PDDevID element and/or a PDVersion element. The CDSubResponse element may further include a MediaURL element and/or a MediaID element.

The feature attribute may indicate the name of a feature to be subjected to subscription. A StatusCode element may indicate that the request is successfully granted. For example, if the StatusCode element has a predetermined value (e.g., "aaa"), this may indicate that the request is successfully granted. A StatusString element may indicate a success/failure indication status string of the request. A SubID element may indicate a subscription identifier for subscription of a current feature. A SubID element may be used to uniquely identify subscription from a companion device to a broadcast reception device. A SubTimeoutDuration element may indicate an actual duration in which subscription of the feature expires. For example, the duration may be in second units. If the value of the SubTimeoutDuration element is a specific value (e.g., "4"), the actual duration in which subscription expires may indicate an infinite duration. A MediaURL element may indicate a URL for a media, to which a subscription response of the feature is transmitted. A MediaID element may indicate an identifier for a media, to which the subscription response of the feature is transmitted. This identifier may uniquely identify the media of the broadcast reception device, to which the subscription response of the feature is transmitted. In addition, this identifier may be associated with a SubID element transmitted to the media. A PDDevID element may indicate a device identifier for a broadcast reception device (Primary Device (PD)). A PDVersion element may indicate version information of the broadcast reception device.

When the subscription request is not granted, the CDSubResponse element may include at least one of a StatusCode element and/or a StatusString element. The StatusCode element may indicate a failure status code describing why the request is not granted. For example, if the StatusCode element has a predetermined value (e.g., "xxx"), this may indicate that a SubCallbackURL element is not present or is not valid. In addition, if the StatusCode element has a predetermined value (e.g., "yyy"), this may indicate that the subscription request cannot be granted. The StatusString element may indicate a success/failure indication status string of the request.

FIG. 50 is a diagram illustrating a message structure format for WebSocket subscription renewal according to an embodiment of the present invention.

FIG. (a) shows a message structure format for a WebSocket Subscription Renewal Request according to an embodiment of the present invention. A CDSubRequest element may include a feature attribute, a SubID element, a SubDuration element, a CDDevID element, a CDAppID element and/or a CDAppVersion element.

FIG. (b) shows a message structure format for a WebSocket Subscription Renewal Request according to another embodiment of the present invention. A CDSubRequest element of FIG. (b) may be replaced by a CDSubRenewRequest element. The CDSubRenewRequest element may include a feature attribute, a SubID element, a SubDuration element, a CDDevID element, a CDAppID element and/or a CDAppVersion element.

FIG. (c) shows a message structure format for a WebSocket Subscription Renewal Response according to an embodiment of the present invention. A CDSubResponse element may include a feature attribute, a StatusCode element, a StatusString element, a SubID element, a SubTimeoutDuration element, a PDDevID element and/or a PDVersion element.

FIG. (d) shows a message structure format for a WebSocket Subscription Renewal Response according to another embodiment of the present invention. The CDSubResponse element of FIG. (c) may be replaced by a CDSubRenewResponse element. The CDSubRenewResponse element may include a feature attribute, a StatusCode element, a StatusString element, a SubID element, a SubTimeoutDuration element, a PDDevID element and/or a PDVersion element.

When the subscription request is not granted, the CDSubResponse element and/or the CDSubRenewResponse element may include at least one of a StatusCode element and/or a StatusString element. The StatusCode element may indicate a failure status code describing why the request is not granted. For example, if the StatusCode element has a predetermined value (e.g., "xxx"), this may indicate that a SubscriptionCallbackURL element is not present or is not valid. In addition, if the StatusCode element has a predetermined value (e.g., "yyy"), this may indicate that the subscription request cannot be granted. A StatusString element may indicate a success/failure indication status string of the request.

FIG. 51 is a diagram illustrating a message structure format for WebSocket subscription cancellation according to an embodiment of the present invention.

FIG. (a) shows a message structure format for a WebSocket Subscription Cancel Request according to an embodiment of the present invention. A CDSubRequest element may include a feature attribute, a SubID element, a CDDevID element, a CDAppID element and/or a CDAppVersion element.

FIG. (b) shows a message structure format for a WebSocket Subscription Cancel Request according to another embodiment of the present invention. The CDSubRequest element of (a) may be replaced by a CDSubCancelRequest element. The CDSubCancelRequest element may include a feature attribute, a SubID element, a CDDevID element, a CDAppID element and/or a CDAppVersion element.

FIG. (c) shows a message structure format for a WebSocket Subscription Cancel Response according to an embodiment of the present invention. A CDSubResponse element may include a feature attribute, a StatusCode element and/or a StatusString element.

FIG. (d) shows a message structure format for a WebSocket Subscription Cancel Response according to another embodiment of the present invention. The CDSubResponse element of FIG. (c) may be replaced by a CDSubCancelResponse element. A CDSubCancelResponse element may include a feature attribute, a StatusCode element and/or a StatusString element.

FIG. 52 is a diagram illustrating a message structure format for an HTTP response according to an embodiment of the present invention.

FIG. (a) shows the body of a message structure format for an HTTP Response with an XML format. An ATSCCSMessage element including the message for the HTTP Response may include a ServiceName element indicating the name of a service and/or a MessageBody element including data of a service (or message) body.

A ServiceName element may indicate "atsc3:csservices:eam:1" indicating an Emergency Alert Service (EAS), "atsc3:csservices:esg:1" indicating an Electronic Service Guide (ESG), "atsc3:csservices:mps:1" indicating a Media Playback State, and/or "atsc3.csservices.mt.1" indicating a Media Timeline.

FIG. (b) shows an embodiment of a message structure format for an HTTP Response with an XML format. When a broadcast reception device (PD) receives an HTTP GET Request from a companion device (CD), the broadcast reception device may deliver an HTTP Response to the companion device. The HTTP Response may include a header and a body. The header may include all header structures of HTTP 1.1. The header may include a version field indicating an HTTP version, a status code field indicating a code indicating whether a request succeeds, and/or a status phrase field describing a result state. For example, "HTTP/1.1 200 OK" indicates that an HTTP protocol version is "1.1" and the status code "200" (request success) is "OK". The body may include the above-described ATSCCSMessage element. For example, a ServiceName element may indicate "atsc3:csservices:mps:1" indicating a Media Playback State. A MessageBody element may include media content information.

FIG. (c) shows the body of a message structure format for an HTTP Response with a JSON format. FIG. (d) shows an embodiment of an HTTP Response with a JSON format. FIGs. (c) and (d) are equal to FIGs. (a) and (b) except that the format is changed.

FIG. 53 is a diagram illustrating a message structure format for a WebSocket message according to an embodiment of the present invention.

FIG. (a) shows a WebSocket message format of an XML format. The WebSocket message format of FIG. (a) is applicable to all WebSockets. The WebSocket message may include an ATSCCS_WSMessage element including a message. The ATSCCS_WSMessage element may include at least one of a StatusCode element, a StatusString element, a ServiceName element, a MessageType element, a SubID element, a SubDuration element, and/or a MessageBody element.

The StatusCode element may indicate a success/failure indication status code indicating a request state.

The StatusString element may indicate a success/failure indication status string of a request.

The ServiceName element may indicate the name of a service. For example, the ServiceName element may indicate "atsc3:csservices:eam:1" indicating Emergency Alert Service (EAS), "atsc3:csservices:esg:1" indicating an Electronic Service Guide (ESG), "atsc3:csservices:mps:1" indicating a Media Playback State, and/or "atsc3.csservices.mt.1" indicating a Media Timeline.

A MessageType element may identify the type of the message. For example, the type of the message may indicate a subscription request (sub) indicating a request of subscription, a subscription renewal request (Renew) indicating renewal of subscription, subscription cancel request (Cancel) indicating cancellation of subscription, a subscription response (SubRsp) indicating a response to the subscription request (sub), a subscription renewal response (RenewRsp) indicating a response to the subscription renewal request (Renew), a subscription cancel response (CancelRsp) indicating a response to the subscription cancel request (Cancel), a notification (Notify) indicating notification of a message, and/or a notification response (NotifyRsp) indicating a response to the notification (Notify).

The SubID element may indicate a subscription identifier for message flow.

The SubDuration element may indicate an active duration of subscription.

The MessageBody element may include message body data.

Only when the MessageType element indicates one of the subscription response (SubRsp), the subscription renewal response (RenewRsp), the subscription cancel response (CancelRsp), and the notification response (NotifyRsp), the ATSCCS_WSMessage element may include a StatusCode element and/or a StatusString element.

Except that the MessageType element indicates the subscription request (sub), all ATSCCS_WSMessage elements may include a SubID element, because the SubID element is allocated along with the message of a subscription response (SubRsp) type.

Except that the MessageType element is the notification (Notify) and/or notification response (NotifyRsp), all ATSCCS_WSMessage elements may include a SubDuration element.

Only when the MessageType element indicates the notification (Notify), the ATSCCS_WSMessage element may include a MessageBody element.

The above description is on the assumption that WebSocket connection is established through a URL (e.g., ATSCCS_PDWSURL) given in a previous discovery procedure.

FIG. (b) shows a WebSocket message format of a JSON format. The WebSocket message format of FIG. (b) is substantially equal to the WebSocket message format of FIG. (a) except for the format.

FIG. 54 is a diagram illustrating an ATSCCS_WSMessage element with an XML format according to an embodiment of the present invention.

FIG. (a) shows an ATSCCS_WSMessage element in which the type of a message is a subscription request (sub). The ATSCCS_WSMessage element may include a ServiceName element, a MessageType element, and/or a SubDuration element.

FIG. (b) shows an ATSCCS_WSMessage element in which the type of a message is a subscription response (SubRsp). The ATSCCS_WSMessage element may include a StatusCode element, a StatusString element, a ServiceName element, a MessageType element, a SubID element, and/or a SubDuration element.

FIG. (c) shows an ATSCCS_WSMessage element in which the type of a message is a subscription renewal request. The ATSCCS_WSMessage element may include a ServiceName element, a MessageType element, a SubID element, and/or a SubDuration element.

FIG. (d) shows an ATSCCS_WSMessage element in which the type of a message is a subscription renewal response (RenewRsp). The ATSCCS_WSMessage element may include a StatusCode element, a StatusString element, a ServiceName element, a MessageType element, a SubID element, and/or a SubDuration element.

FIG. (e) shows an ATSCCS_WSMessage element in which the type of a message is a notification (Notify). The ATSCCS_WSMessage element may include a ServiceName element, a MessageType element, a SubID element, and/or a MesseageBody element.

FIG. (f) shows an ATSCCS_WSMessage element in which the type of a message is a notification response (NotifyRsp). The ATSCCS_WSMessage element may include a StatusCode element, a StatusString element, a ServiceName element, a MessageType element, and/or a SubID element.

FIG. 55 is a diagram illustrating an ATSCCS_WSMessage element with a JSON format according to an embodiment of the present invention.

The ATSCCS_WSMessage element with the JSON format is substantially equal to the above-described ATSCCS_WSMessage element with the XML format.

FIG. 56 is a diagram illustrating a WebSocket subscription message format and a WebSocket notification message format according to an embodiment of the present invention.

In this figure, the WebSocket message format is divided into a WebSocket subscription message format for subscription and a WebSocket notification message format for notification.

FIG. (a) shows a WebSocket subscription message format according to an embodiment of the present invention.

The WebSocket subscription message may include an ATSCCS_WSSubMessage element including a message for subscription. The ATSCCS_WSSubMessage element may include a ServiceName element, a MessageType element, a SubID element, and/or a SubDuration element.

The MessageType element may indicate the type of a message. For example, the type of the message may indicate a subscription request (sub) indicating a request of subscription, a subscription renewal request (Renew) indicating renewal of subscription, subscription cancel request (Cancel) indicating cancellation of subscription, a subscription response (SubRsp) indicating a response to the subscription request (sub), a subscription renewal response (RenewRsp) indicating a response to the subscription renewal request (Renew), and/or a subscription cancel response (CancelRsp) indicating a response to the subscription cancel request (Cancel).

Except that the MessageType element indicates the subscription request (sub), all ATSCCS_WSSubMessage elements may include a SubID element, because the SubID element is allocated along with the message of a subscription response (SubRsp) type.

Except that the MessageType element is the subscription cancel request (Cancel) and/or subscription cancel response (CancelRsp), all ATSCCS_WSSubMessage elements may include a SubDuration element.

The above description is on the assumption that WebSocket connection is established through a URL (e.g., ATSCCS_PDWSURL) given in a previous discovery procedure.

FIG. (b) shows a WebSocket notification message format according to an embodiment of the present invention.

The WebSocket notification message may include an ATSCCS_WSMessage element including a message for notification. The ATSCCS_WSMessage element may include a ServiceName element, a SubID element, and/or a MessageBody element.

The WebSocket notification message format may be similar to an HTTP response message format.

The above description is on the assumption that WebSocket connection is established through a URL (e.g., ATSCCS_PDWSURL) given in a previous discovery procedure.

FIG. 57 is a diagram illustrating an ATSCCS_WSSubMessage element and an ATSCCS_WSMessage message with a JSON format according to an embodiment of the present invention.

FIG. (a) shows an ATSCCS_WSSubMessage element in which the type of a message is a subscription request (sub). The ATSCCS_WSSubMessage element may include a ServiceName element, a MessageType element, and/or a SubDuration element.

FIG. (b) shows an ATSCCS_WSSubMessage element in which the type of a message is a subscription response (SubRsp). The ATSCCS_WSSubMessage element may include a ServiceName element, a MessageType element, a SubID element, and/or a SubDuration element.

FIG. (c) shows an ATSCCS_WSSubMessage element in which the type of a message is a subscription renewal request (Renew). The ATSCCS_WSSubMessage element may include a ServiceName element, a MessageType element, a SubID element, and/or a SubDuration element.

FIG. (d) shows an ATSCCS_WSSubMessage element in which the type of a message is a subscription renewal response (RenewRsp). The ATSCCS_WSSubMessage element may include a ServiceName element, a MessageType element, a SubID element, and/or a SubDuration element.

FIG. (e) shows an ATSCCS_WSMessage element including a message for notification. The ATSCCS_WSMessage element may include a ServiceName element, a SubID element, and/or a MesseageBody element.

FIG. (f) shows an ATSCCS_WSSubMessage element in which the type of a message is a subscription cancel request (Cancel). The ATSCCS_WSSubMessage element may include a ServiceName element, a MessageType element, and/or a SubID element.

FIG. (g) shows an ATSCCS_WSSubMessage element in which the type of a message is a subscription cancel response (CancelRsp). The ATSCCS_WSSubMessage element may include a ServiceName element, a MessageType element, and/or a SubID element.

FIG. 58 is a diagram illustrating a WebSocket subscription message format and a WebSocket notification message format according to another embodiment of the present invention.

In this figure, the WebSocket message format is divided into a WebSocket subscription message format for subscription and a WebSocket notification message format for notification.

FIG. (a) shows a WebSocket subscription message format according to an embodiment of the present invention. A message related to subscription delivered between a broadcast reception device (PD) and a companion device (CD) may use a WebSocket subscription message format (or structure).

The WebSocket subscription message may include an ATSCCS_WSMessage element including a message for subscription. The ATSCCS_WSMessage element may include a ServiceName element, a MessageType element, a RespCode element, and/or a SubDuration element. The ATSCCS_WSMessage element may further include a MessageVersion element.

The ServiceName element may indicate a service name for identifying a service. For example, the ServiceName element may indicate "atsc3:csservices:eam:1" indicating an Emergency Alert Service (EAS), "atsc3:csservices:esg:1" indicating an Electronic Service Guide (ESG), "atsc3:csservices:mps:1" indicating a Media Playback State, and/or "atsc3.csservices.mt.1" indicating a Media Timeline. A broadcast reception device (PD) and/or companion device (CD) may ignore a message including a ServiceName element which does not indicate the name of the above-described service.

The MessageType element may identify the type of the message. The type of the message may be classified into two categories. The type of the message may be classified into request message types and response message types. Depending on the type of the message identified by the MessageType element, the remaining parts of the message structure may include other types of message elements.

The request message type identifies the type of the message delivered from a companion device to a broadcast reception device. The request message type may include a subscription request (sub) indicating a message for requesting subscription, a subscription cancel request (Cancel) indicating a message for cancelling subscription, and/or a subscription renewal request (Renew) indicating a message for renewing subscription.

The response message type identifies the type of the message delivered from a broadcast reception device to a companion device. The response message type may include a subscription response (SubRsp) indicating a response message to the subscription request (sub), a subscription cancel response (CancelRsp) indicating a response message to the subscription cancel request (Cancel) and/or a subscription renewal response (RenewRsp) indicating a response message to the subscription renewal request (Renew).

The RespCode element may indicate a success status code or a failure status code of the corresponding request. The RespCode element may perform the same function as the above-described StatusCode element.

The SubDuration element may indicate a Subscription duration. When a message is delivered from a companion screen to a broadcast reception device, the SubDuration element indicates a requested subscription duration. When a message is delivered from a broadcast reception device to a companion device, the SubDuration element indicates an active subscription duration.

The MessageVersion element may indicate the version of a subscription message structure (or format). Upper 6 bits of the MessageVersion element may indicate a major version and upper 2 bits of the MessageVersion element may indicate a minor version.

Only when the MessageType element indicates one of a subscription response (SubRsp), a subscription renewal response (RenewRsp), and a subscription cancel response (CancelRsp), the ATSCCS_WSMessage element may include a RespCode element.

All ATSCCS_WSMessage elements may include a SubDuration element, except that the MessageType element is a subscription cancel request (Cancel) and/or a subscription cancel response (CancelRsp).

The above description is on the assumption that WebSocket connection is established through a URL (e.g., ATSCCS_PDWSURL) given in a previous discovery procedure.

Subscription related messages delivered from a broadcast reception device (PD) to a companion device (CD) and subscription related messages delivered from a companion device to a broadcast reception device may have a JSON format or an XML format.

FIG. (b) shows a WebSocket notification message format according to an embodiment of the present invention. A notification related message delivered from a broadcast reception device (PD) to a companion device (CD) uses a WebSocket notification message format (or structure).

The WebSocket notification message may include an ATSCCS_Message element including a message for notification. The ATSCCS_Message element may include a ServiceName element and/or a MessageBody element. In addition, the ATSCCS_Message element may further include a MessageVersion element.

The ServiceName element may include a service name for identifying a service.

The MessageBody element may include message specific data elements. For example, the MessageBody element may include at least one of Message Content for Service and Content Identification Communication, Message Content for Current Service Information, Message Content for ESG Communication, Message Content for Service, Show and Segment Data Communication, Message Content for Media Timeline Communication, Message Content for Media Playback State Communication, and/or Message Content for Emergency Alert Messages Communication.

The MessageVersion element may indicate the version of a notification message structure. Upper 6 bits of the MessageVersion element may indicate a major version and upper 2 bits of the MessageVersion element may indicate a minor version.

The WebSocket notification message format may be similar to an HTTP response message format.

The above description is on the assumption that WebSocket connection is established through a URL (e.g., ATSCCS_PDWSURL) given in a previous discovery procedure.

The WebSocket notification messages may be only delivered from a broadcast reception device (PD) to a companion device (CD). The WebSocket notification messages may have a JSON format or an XML format.

FIG. 59 is a diagram illustrating an ATSCCS_WSSubMessage element and an ATSCCS_WSMessage message with a JSON format according to an embodiment of the present invention.

FIG. (a) shows an ATSCCS_WSMessage element in which the type of a message is a subscription request (sub). The ATSCCS_WSMessage element may include a ServiceName element, a MessageType element, and/or a SubDuration element.

FIG. (b) shows an ATSCCS_WSMessage element in which the type of a message is a subscription response (SubRsp). The ATSCCS_WSMessage element may include a ServiceName element, a MessageType element, a RespCode element, and/or a SubDuration element.

FIG. (c) shows an ATSCCS_WSMessage element in which the type of a message is a subscription renewal request (Renew). The ATSCCS_WSMessage element may include a ServiceName element, a MessageType element, and/or a SubDuration element.

FIG. (d) shows an ATSCCS_WSMessage element in which the type of a message is a subscription renewal response (RenewRsp). The ATSCCS_WSMessage element may include a ServiceName element, a MessageType element, a RespCode element, and/or a SubDuration element.

FIG. (e) shows an ATSCCS_Message element including a message for notification. The ATSCCS_Message element may include a ServiceName element, and/or a MesseageBody element.

FIG. (f) shows an ATSCCS_WSMessage element in which the type of a message is a subscription cancel request (Cancel). The ATSCCS_WSMessage element may include a ServiceName element and/or a MessageType element.

FIG. (g) shows an ATSCCS_WSMessage element in which the type of a message is a subscription cancel response (CancelRsp). The ATSCCS_WSMessage element may include a ServiceName element, a MessageType element, and/or a RespCode element.

FIG. 60 is a diagram illustrating a WebSocket subscription message format and a WebSocket notification message format for media playback state communication according to another embodiment of the present invention.

FIG. (a) shows a WebSocket subscription message format for media playback state communication. The WebSocket subscription message may include an ATSCCS_WSMessage element including a message for subscription. The ATSCCS_WSMessage element may include a ServiceName element, a MessageType element, a RespCode element, and/or a SubDuration element. The ATSCCS_WSMessage element may further include a MessageVersion element.

The ServiceName element may indicate "atsc3:csservices:mps:1" indicating a Media Playback State.

The details of the ATSCCS_WSMessage element of FIG. (a) may include all the details of the above-described ATSCCS_WSMessage element.

FIG. (b) shows a WebSocket notification message format for media playback state communication.

The WebSocket notification message may include an ATSCCS_Message element including a message for notification. The ATSCCS_Message element may include a ServiceName element and/or a MessageBody element.

The ServiceName element may indicate "atsc3:csservices:mps:1" indicating a Media Playback State.

The MessageBody element may include at least one of an MPState element, an MPSpeed element, a MediaURL element, a MediaID element, a PDDevID element, and/or a PDVersion element.

The MPState element may indicate a mediaURL element related to media playback state information subscription (identified by the SubID element) and/or a current media playback state for a mediaID element (or a media identified by a mediaURL element and/or a mediaID element). For example, the media playback state may include at least one of "PLAYING", "PAUSED", "STOPPED", "FFORWARD", "FBACKWARD", BUFFERING", and/or "UNKNOWN".

The "STOPPED" state may indicate the last of a media stream for a mediaURL element related to media playback state information and/or a mediaID element (or a media identified by a mediaURL element and/or a mediaID element).

The MPSpeed element may indicate the current speed of the media (playback) state relative to a normal speed. The MPSpeed element may be present only when the MPState element indicates "PLAYING".

The value of the MPSpeed element may be an integer value. For example, the value of the MPSpeed element relative to the normal speed may be "1". When the MPState element indicates one of "PLAYING", "FFORWARD", and/or "FBACKWARD", the MPSpeed element is applicable.

When the MPState element indicates "FFORWARD" and/or "FBACKWARD", the MPSpeed element may indicate the speed of a media timeline moving forward and/or backward relative to the normal speed.

When the MPState element indicates "PLAYING", the MPSpeed element may indicate a media playback speed relative to the normal speed.

More specifically, an MPSpeed element having a positive value (Positive MPSpeed values) may indicate "forward playback". "Forward playback" may mean that a media timeline position is increased by increase in wall-clock time.

In addition, an MPSpeed element having a negative value (Negative MPSpeed values) may indicate "backward playback". "Backward playback" may mean that a media timeline position is decreased by decrease in wall-clock time.

When the value of the MPSpeed element is "1", the MPSpeed element may indicate "forward playback" at the normal speed. In the case of "forward playback" at the normal speed, the media timeline may be increased by the wall-clock time. When the value of the MPSpeed element is "4", the MPSpeed element may indicate "backward playback" at the normal speed. In the case of "backward playback" at the normal speed, the media timeline may be decreased by the wall-clock time.

When the value of the MPSpeed element is "X", the MPSpeed element may indicate playback at "X" times of the normal speed. In the case of playback at "X" times the normal speed, the media timeline may be increased (for positive "X" value) or decreased (for negative "X" value) by "X" times of the wall-clock time. For example, "X" may not be "0" and/or "1".

When the current MPState element indicates "PLAYING", an MPSpeed element having a value of "0" may be reserved to indicate a "UNKNOWN" playback speed.

When the MPState element indicates a state other than "PLAYING", the MPSpeed element may have a value of "0".

When the MPState element indicates "PLAYING", it may be estimated that an absent MPSpeed element has a value of "1".

When the MPState element indicates a state other than "PLAYING", it may be estimated that an absent MPSpeed element has a value of "0".

The MPSpeed element may be present when the broadcast reception device (PD) supports a PVR (Personal Video Recorder) function including trick play.

The MediaURL element may indicate a URL for a media, media playback state information subscription of which is requested. When the MediaURL element is not present, information on a media currently played back on the broadcast reception device may be selectively notified.

The MediaID element may indicate an identifier for a media, media playback state information subscription of which is requested. This identifier may uniquely identify the media of the broadcast reception device, media playback state information subscription of which is requested.

For example, the MediaID element having a value of "CURRENT" may indicate that information on a main media currently played back on the broadcast reception device is requested.

The PDDevID element may indicate a device identifier of the broadcast reception device.

The PDVersion element may indicate version information of the broadcast reception device.

Additionally, the companion device (CD) may transmit a response message to a notification message to the broadcast reception device. For example, when a media playback state information notification message is received from the broadcast reception device, the companion device may transmit a response message to the media playback state information notification message to the broadcast reception device.

The response message to the media playback state information notification message may include at least one of a StatusCode element, a StatusString element, and/or, a SubscriptionID element.

The StatusCode element may indicate a success/failure status code indicating a reception status of a notification message. For example, when the StatusCode element has a predetermined value (e.g., "aaa"), this may indicate that the notification message has been successfully received. In addition, when the StatusCode element has a predetermined value (e.g., "yyy"), this may indicate that the notification message cannot be received.

The StatusString element may indicate a success/failure indication status string of the request.

The SubscriptionID element may indicate a subscription identifier for current media playback state information subscription. The SubscriptionID element may be used to uniquely identify subscription from the companion screen device to the broadcast reception device.

Figure 61:
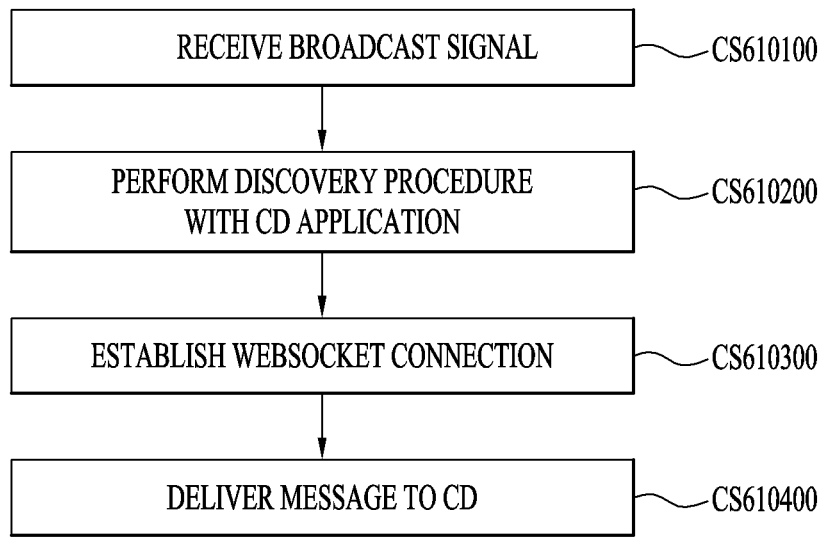
FIG. 61 is a diagram showing a method of receiving a broadcast signal according to an embodiment of the present invention.

FIG. 61 is a diagram showing a method of receiving a broadcast signal according to an embodiment of the present invention.

A broadcast signal reception apparatus (hereinafter, receiver) may receive a broadcast signal using a reception unit (CS610100).

The reception unit may include a broadcast interface, a reception module and/or a tuner. The broadcast signal may include a service data and signaling data for a service. The signaling data may include physical layer signaling, link layer signaling, Low Level Signaling, and/or Service Layer Signaling.

The receiver may perform a discovery procedure with a CD application using a network interface (CS610200).

The network interface may include a companion module and may include all devices capable of performing communication with the companion device. In addition, the discovery procedure may include all operations related to the above-described discovery.

The receiver may deliver first URL information and second URL information to a companion device (CD) application of the companion device in response to device discovery of the companion device using the network interface.

Here, the first URL information may be used as a web server endpoint (or an endpoint of a web server) of a primary device. In addition, the web server endpoint may be used in an HTTP protocol for asynchronous communication. In addition, the second URL information may be used as a WebSocket server endpoint (or an endpoint of a WebSocket server) of the primary device. In addition, the endpoint of the WebSocket server may be used in a WebSocket protocol for synchronous communication. In addition, the first URL information may be used by the primary device or the companion device for delivery of the second URL information.

The receiver may establish WebSocket connection between the WebSocket server and the CD application based on the second URL using the WebSocket sever (CS610300).

The receiver may deliver a message to the CD application using the network interface (CS610400).

Here, the network interface may communicate with the CD application using the message. In addition, the message may include a WebSocket message for the WebSocket protocol. In addition, the WebSocket message may include a WebSocket subscription message for subscription and a WebSocket notification message for notification. For example, the WebSocket subscription message includes an ATSCCS_WSMessage element, and the WebSocket notification message may include an ATSCCS_Message element. In addition, the WebSocket subscription message may be bidirectionally delivered between the primary device and the companion device. In addition, the WebSocket notification message may be unidirectionally delivered from the primary device to the companion device.

In addition, the message may further include an HTTP message for the HTTP protocol. In addition, the HTTP message may include an HTTP request message for a request and an HTTP response message for a response. For example, the HTTP request message may include a CDRequest element and the HTTP response message may include a CDResponse element. In addition, the header of the HTTP request message may include Request URL information. In addition, the Request URL information may include the URL information, ServiceName information indicating the name of the service, and at least one parameter. For example, the first URL information may include a host URL and/or an ATSCCS_PDURL. In addition, the header of the HTTP response message may include status code information indicating whether the request has been successfully made. In addition, the body of the HTTP response message may include ServiceName information indicating the name of the service and MessageBody information including data of the message body. In addition, the MessageBody information may include one of Message Content for Service Information, Message Content for ESG Communication, Message Content for Service, Show and Segment Data Communication, and Message Content for Media Timeline Communication.

In addition, the WebSocket subscription message may include at least one of ServiceName information for identifying the service, RespCode information indicating a success status code or a failure status code of the corresponding request, and SubDuration information indicating a subscription duration.

In addition, the WebSocket subscription message may further include MessageType information for identifying the type of the WebSocket subscription message. In addition, the type may include a request message type for a request from the companion device to the primary device and a response message type for a response from the primary device to the companion device. In addition, depending on the type of the WebSocket subscription message identified by the MessageType, message information included in the WebSocket subscription message may be determined.

In addition, the request message type may include a subscription request indicating a message for requesting subscription, a subscription cancel request indicating a message for cancelling subscription, and a subscription renewal request indicating a message for renewing subscription. In addition, the response message type may include a subscription response indicating a response message to the subscription request, a subscription cancel response indicating a response message to the subscription cancel request, and a subscription renewal response indicating a response message to the subscription renewal request.

In addition, the WebSocket notification message may include ServiceName information for identifying the service and MessageBody information including message specific data. In addition, the MessageBody information may include one of Message Content for Service and Content Identification Communication, Message Content for Media Timeline Communication, and Message Content for Media Playback State Communication.

In addition, the ServiceName information may indicate one of "atsc3.csservices.esg.1" indicating an Electronic Service Guide (ESG), "atsc3.csservices.mps.1" indicating a Media Playback State, and "atsc3.csservices.mt.1" indicating a media timeline.

Figure 62:
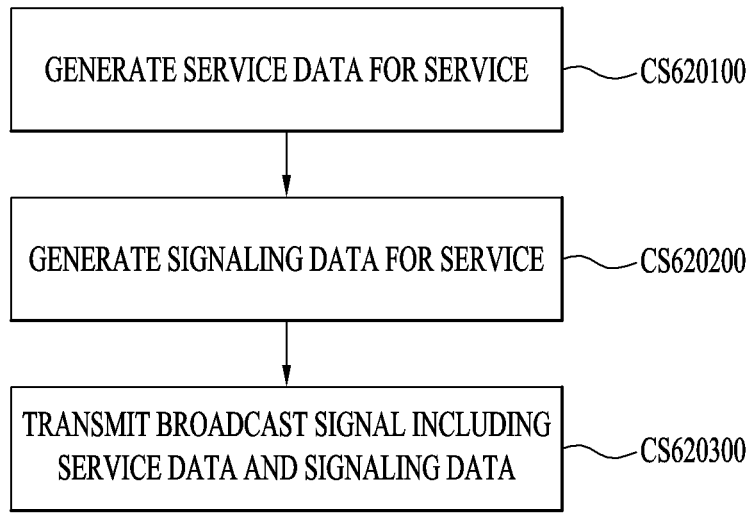
FIG. 62 is a diagram showing a method of transmitting a broadcast signal according to an embodiment of the present invention.

FIG. 62 is a diagram showing a method of transmitting a broadcast signal according to an embodiment of the present invention.

A broadcast signal transmission apparatus may generate service data for a service using a controller (CS620100).

The broadcast signal transmission apparatus may generate signaling data for a service using the controller (CS620200).

The broadcast signal transmission apparatus may transmit a broadcast signal including the service data and the signaling data using a transmission unit (CS620300).

Details of the service data and the signaling data may include the above-described details of the service data and the signaling data. In addition, the broadcast signal transmission apparatus may perform all operations for enabling the broadcast signal reception apparatus to receive the service data and the signaling data.

Modules or units may be processors executing consecutive processes stored in a memory (or a storage unit). The steps described in the aforementioned embodiments can be performed by hardware/processors. Modules/blocks/units described in the above embodiments can operate as hardware/processors. The methods proposed by the present invention can be executed as code. Such code can be written on a processor-readable storage medium and thus can be read by a processor provided by an apparatus.

While the embodiments have been described with reference to respective drawings for convenience, embodiments may be combined to implement a new embodiment. In addition, designing computer-readable recording media storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The methods proposed by the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, not by the above description, and all changes coming within the meaning and equivalency range of the appended claims are intended to be embraced therein.

In the specification, both the apparatus invention and the method invention are mentioned and description of both the apparatus invention and the method invention can be applied complementarily.

MODE FOR INVENTION

Various embodiments have been described in the best mode for carrying out the invention.

INDUSTRIAL APPLICABILITY

The present invention is applicable to broadcast signal providing fields.

Various equivalent modifications are possible within the spirit and scope of the present invention, as those skilled in the relevant art will recognize and appreciate. Accordingly, it is intended that the present invention cover the modifications and variations of this invention provided they come within the scope of the appended claims and their equivalents.

The invention claimed is:

1. A method for providing a broadcast service in a Primary Device (PD), the method comprising:
   performing a discovery process with a Companion Device (CD) application resided in a CD,
   wherein the performing the discovery process includes receiving an application information request from the CD application, and sending an application information response, and
   wherein the application information response includes a first location information used for an endpoint of a websocket server resided in the PD;
   establishing a websocket connection between the CD application and the websocket server based on the first location information; and
   communicating at least one message with the CD application via the websocket connection,
   wherein the at least one message includes a notification message for websocket,
   wherein the notification message for websocket includes media playback state information,
   wherein the at least one message further includes a subscription message for websocket, and
   wherein the subscription message for websocket includes message type information, further the subscription message for websocket contains different types of message fields depending on the message type information.

2. The method according to claim 1,
   wherein the subscription message for websocket is bidirectionally delivered between the PD and the CD application.

3. The method according to claim 2, wherein the subscription message for websocket includes servicename information identifying a service.

4. The method according to claim 3, wherein the servicename information indicates the service being for one of Electronic Service Guide (ESG), media playback state, and media time line.

5. The method according to claim 1, wherein the media playback state information includes a media identifier identifying a media, media state information indicating a current playback state of the media, and speed information indicating a current speed of the media relative to a normal speed.

6. The method according to claim 5, wherein the media playback state information indicates one of states including playing, paused, stopped, and buffering.

7. The method according to claim 5, wherein the speed information indicates a forward playback when a value of the speed information is positive, and the speed information indicates a backward playback when the value of the speed information is negative.

8. The method according to claim 1, wherein the performing the discovery process further includes receiving a device description request from the CD application, and sending a device description response, and
   wherein the device description response includes a first Uniform Resource Locator (URL) for the application information request.

9. The method according to claim 8, wherein the performing the discovery process further includes receiving a device discovery request from the CD application, and sending a device discovery response, and
   wherein the device discovery response includes a second Uniform Resource Locator (URL) for the device description request.

10. The method according to claim 9, wherein the device discovery request is performed by M-SEARCH using Simple Service Discovery Protocol (SSDP) with Search Target (ST) information that has a value matched with Search Target (ST) information of the PD.

11. A broadcast signal reception apparatus as a Primary Device (PD), the broadcast signal reception apparatus comprising:
   a companion module configured to perform a discovery process with a Companion Device (CD) application resided in CD,
   wherein the companion module is further configured to receive an application information request from the CD application, and send an application information response,
   wherein the application information response includes a first location information used for an endpoint of a websocket server resided in the PD, and
   wherein the companion module is further configured to establish a websocket connection between the CD application and the websocket server based on the first location information; and
   a websocket server configured to communicate at least one message with the CD application via the websocket connection,
   wherein the at least one message includes a notification message for websocket,
   wherein the notification message for websocket includes media playback state information,
   wherein the at least one message further includes a subscription message for websocket, and
   wherein the subscription message for websocket includes message type information, further the subscription message for websocket contains different types of message fields depending on the message type information.

12. The broadcast signal reception apparatus according to claim 11,
   wherein the subscription message, for websocket is bidirectionally delivered between the PD and the CD application.

13. The broadcast signal reception apparatus according to claim 12, wherein the subscription message for websocket includes servicename information identifying a service.

14. The broadcast signal reception apparatus according to claim 13, wherein the servicename information indicates the service being for one of Electronic Service Guide (ESG), media playback state, and media time line.

15. The broadcast signal reception apparatus according to claim 11, wherein the media playback state information includes a media identifier identifying a media, media state information indicating a current playback state of the media, and speed information indicating a current speed of the media relative to a normal speed.

16. The broadcast signal reception apparatus according to claim 15, wherein the media playback state information indicates one of states including playing, paused, stopped, and buffering.

17. The broadcast signal reception apparatus according to claim 15, wherein the speed information indicates a forward playback when a value of the speed information is positive, and the speed information indicates a backward playback when the value of the speed information is negative.

18. The broadcast signal reception apparatus according to claim 11, wherein the companion module is further configured to receive a device description request from the CD application, and send a device description response, and
   wherein the device description response includes a first Uniform Resource Locator (URL) for the application information request.

19. The broadcast signal reception apparatus according to claim 18, wherein the companion module is further configured to receive a device discovery request from the CD application, and send a device discovery response, and
   wherein the device discovery response includes a second Uniform Resource Locator (URL) for the device description request.

20. The broadcast signal reception apparatus according to claim 19, wherein the device discovery request is performed by M-SEARCH using Simple Service Discovery Protocol (SSDP) with Search Target (ST) information that has a value matched with Search Target (ST) information of the PD.

* * * * *